US011615280B2

(12) United States Patent
Smith et al.

(10) Patent No.: US 11,615,280 B2
(45) Date of Patent: Mar. 28, 2023

(54) BARCODES WITH SECURITY MATERIAL AND READERS FOR SAME

(71) Applicant: Temptime Corporation, Morris Plains, NJ (US)

(72) Inventors: Marielle K. Smith, Parlin, NJ (US); Jessica Bicek, Chicago, IL (US); Mohannad Abdo, Clifton, NJ (US); Gene A. Hofer, Lake Zurich, IL (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 387 days.

(21) Appl. No.: 17/007,795

(22) Filed: Aug. 31, 2020

(65) Prior Publication Data

US 2022/0067468 A1 Mar. 3, 2022

(51) Int. Cl.
 *G06K 19/06* (2006.01)

(52) U.S. Cl.
 CPC . *G06K 19/06075* (2013.01); *G06K 19/06028* (2013.01); *G06K 19/06037* (2013.01)

(58) Field of Classification Search
 None
 See application file for complete search history.

(56) References Cited

U.S. PATENT DOCUMENTS

| | | |
|---|---|---|
| 3,999,946 A | 12/1976 | Patel et al. |
| 4,189,399 A | 2/1980 | Patel |
| 4,384,980 A | 5/1983 | Patel |
| 4,788,151 A | 11/1988 | Preziosi et al. |
| 4,789,637 A | 12/1988 | Preziosi |
| 5,045,283 A | 9/1991 | Patel |
| 5,053,339 A | 10/1991 | Patel |
| 5,057,434 A | 10/1991 | Prusik et al. |
| 5,254,473 A | 10/1993 | Patel |
| 5,667,303 A | 9/1997 | Arens et al. |
| 5,709,472 A | 1/1998 | Prusik et al. |
| 6,042,264 A | 3/2000 | Prusik et al. |
| 6,070,805 A | 6/2000 | Kaufman et al. |
| 6,614,728 B2 | 9/2003 | Spevacek |
| 6,741,523 B1 | 5/2004 | Bommarito et al. |
| 6,832,729 B1 | 12/2004 | Perry et al. |
| 7,517,146 B2 | 4/2009 | Smith et al. |
| 8,671,871 B2 | 3/2014 | Huffman et al. |
| 8,757,503 B2 * | 6/2014 | Conzelmann ........ G01K 15/007 235/487 |
| 9,546,911 B2 | 1/2017 | Huffman et al. |
| 9,563,798 B1 | 2/2017 | Laser et al. |
| 2016/0154939 A1 | 6/2016 | Grabiner et al. |

(Continued)

FOREIGN PATENT DOCUMENTS

| | | | |
|---|---|---|---|
| CN | 108256607 | 7/2018 | |
| CN | 108682283 | 10/2018 | |
| WO | WO-2018175281 A1 * | 9/2018 | ....... G06K 19/06037 |

*Primary Examiner* — Kristy A Haupt
(74) *Attorney, Agent, or Firm* — K&L Gates LLP

(57) ABSTRACT

A secure indicator includes a substrate, a barcode symbol that has a plurality of barcode modules provided on the substrate, and a security material positioned proximate the barcode symbol on the substrate. The security material is configured to be activated by irradiation at one or more predetermined activation wavelengths. Additionally, the barcode symbol is configured to be read (i) before the security material is activated and (ii) while the security material is activated.

43 Claims, 17 Drawing Sheets

(56) References Cited

U.S. PATENT DOCUMENTS

2016/0292486 A1\* 10/2016 Prusik .............. G06K 19/06046
2017/0193260 A1\* 7/2017 Prusik ................ G06K 19/0614
2019/0197377 A1 6/2019 Studnicka \* cited by examiner

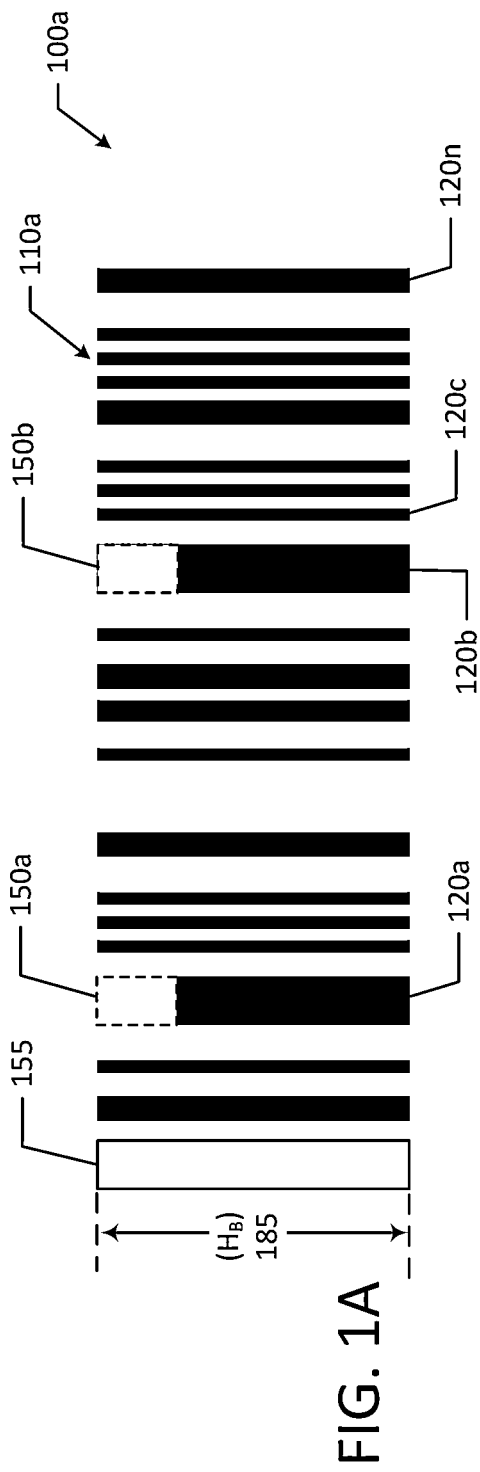
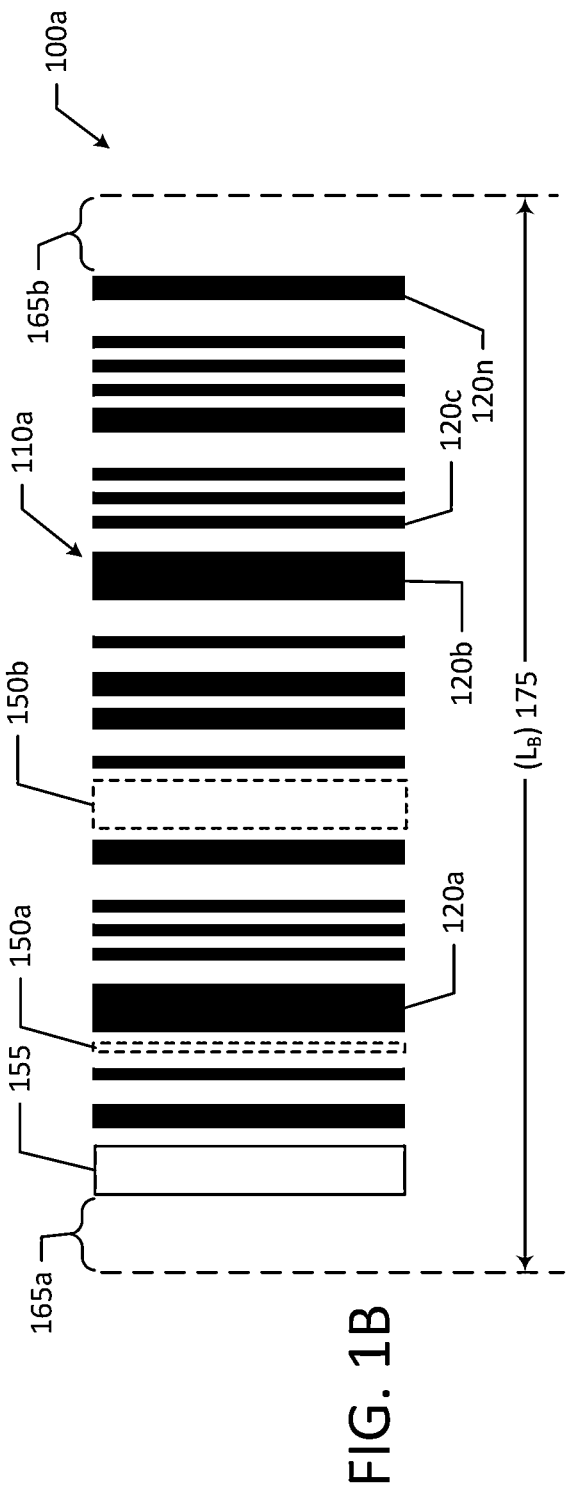
FIG. 1A
FIG. 1B

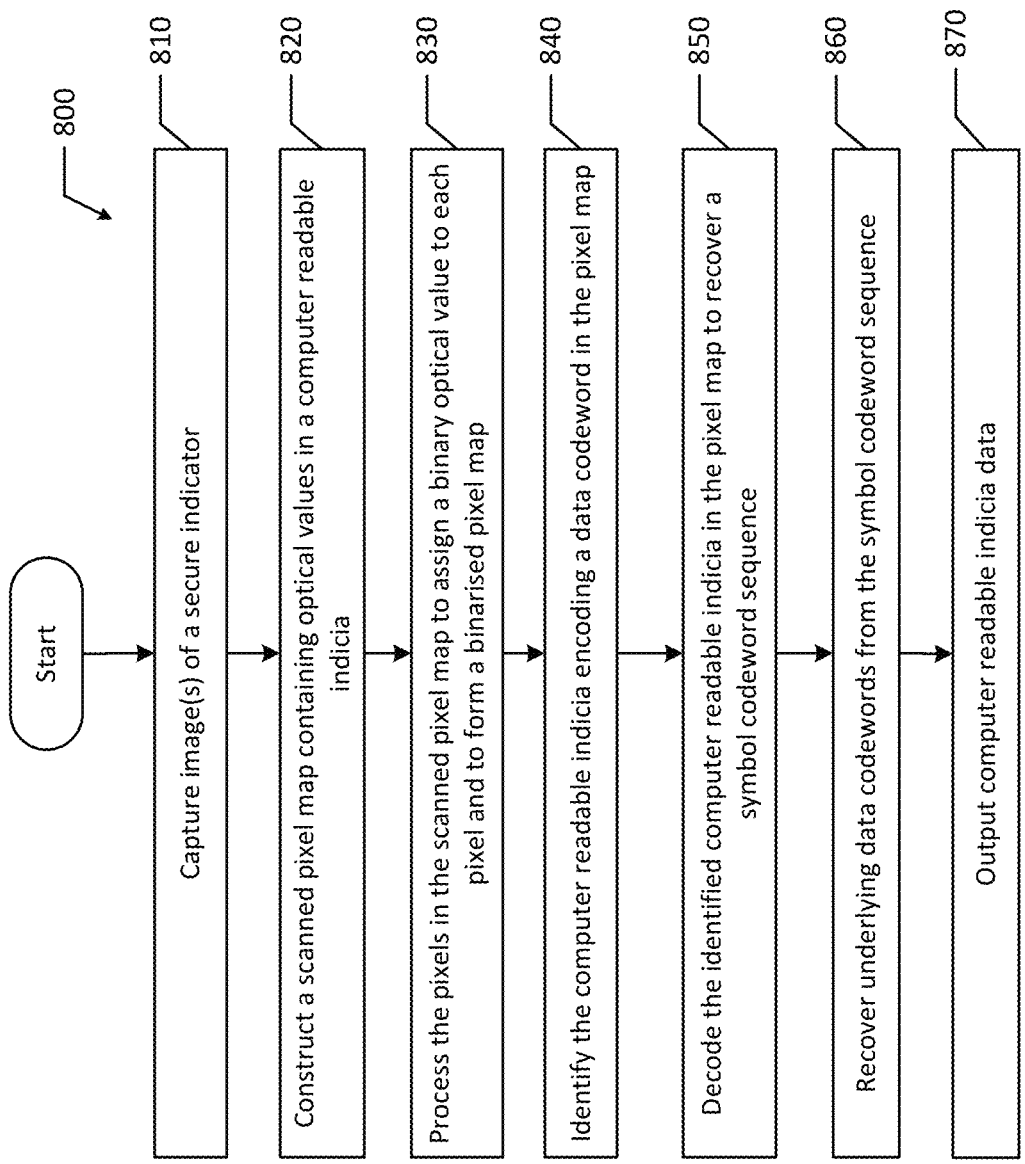
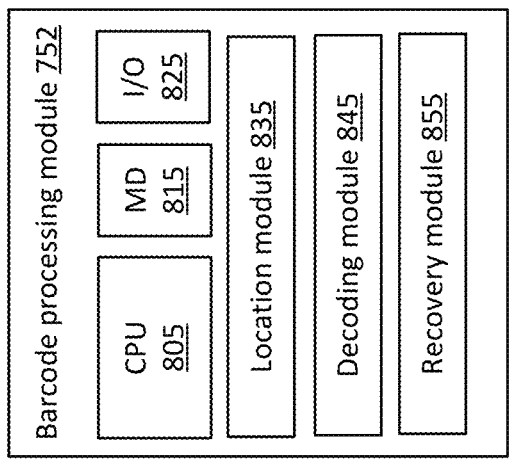
FIG. 8B
FIG. 8A

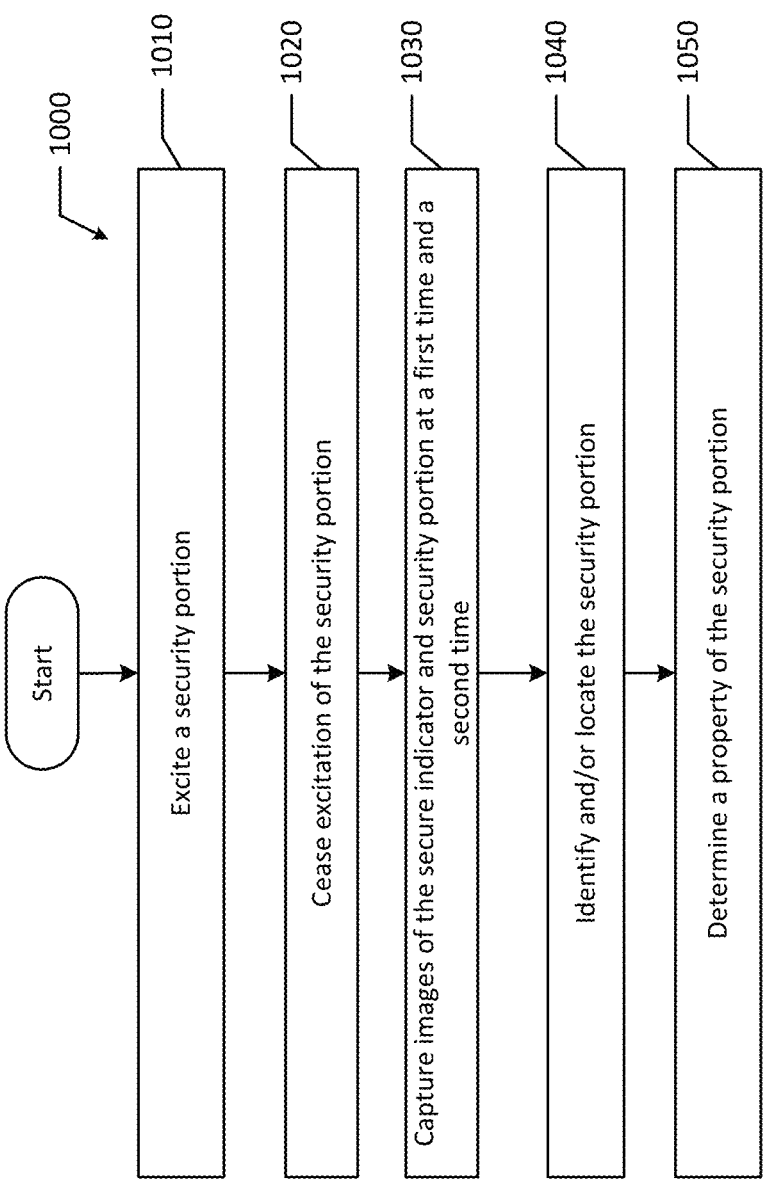
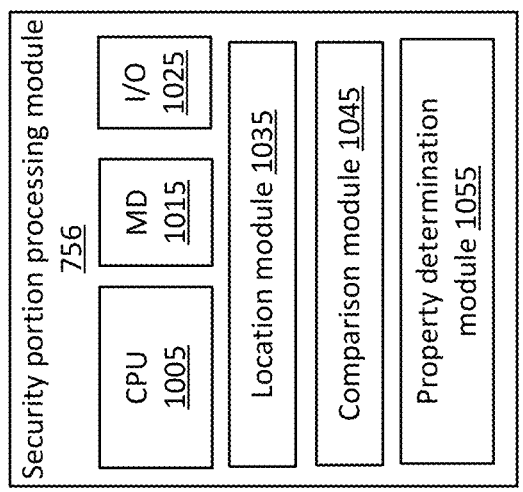
FIG. 10A
FIG. 10B

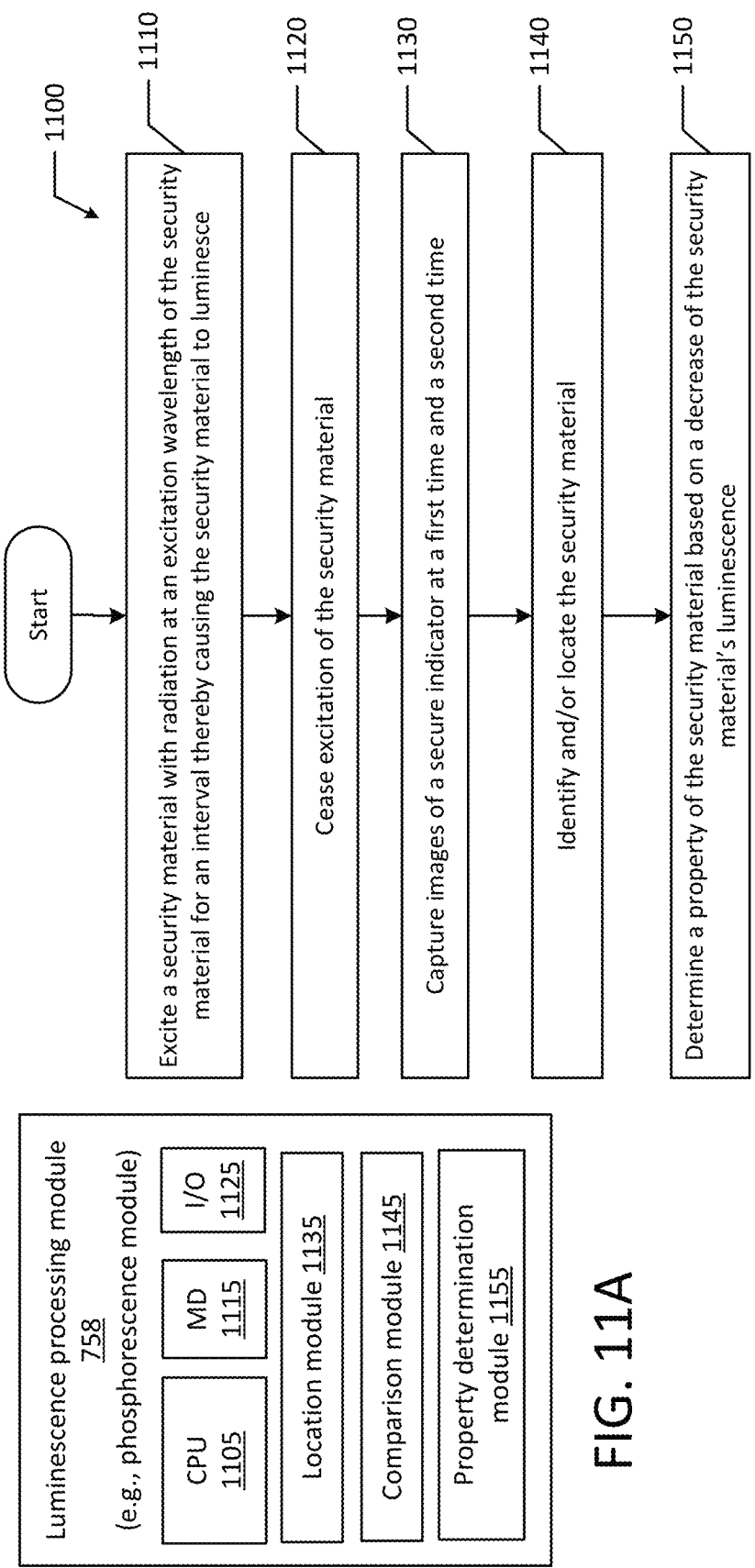

BARCODES WITH SECURITY MATERIAL AND READERS FOR SAME

BACKGROUND

A barcode is an optical machine-readable representation of data. One-dimensional (1D) barcodes (e.g. Code 128, Code 39, UPC-E, POSTAL) represent data in bars, modules or elements comprising a series of separated bars of varying width or height. Two-dimensional (2D) barcodes (e.g., PDF417, Data Matrix or QR Code) represent data in an array or matrix of modules or elements in a rectangular arrangement. Barcodes may be displayed on a screen. Barcodes may be printed onto documents or media such as tags, labels, packaging, cards, or wristbands using substances such as ink, dye, paint, toner, or wax. Data recovery from barcodes may be system critical and many barcode technologies provide robust error correction capabilities. Using multiple linked barcodes or barcodes with more modules or elements may further increase data recovery capabilities. The current barcode technology may be improved upon by confirming authenticity as presently disclosed.

SUMMARY

The present disclosure provides a new and innovative barcodes with security material and systems, methods and apparatus for reading barcodes with security material. Aspects of the subject matter described herein may be useful alone or in combination with one or more other aspects described herein. In an aspect of the present disclosure, a secure indicator includes a substrate, a barcode symbol, and a security material. The barcode symbol has a plurality of barcode elements provided on the substrate. The security material is positioned proximate the barcode symbol on the substrate. Additionally, the security material is configured to be activated by irradiation at one or more predetermined activation wavelengths. The barcode symbol is configured to be read (i) before the security material is activated and (ii) while the security material is activated. Additionally, the security material has a chemistry that is configured, responsive to irradiation at the one or more predetermined activation wavelengths, to undergo a chemical or physical state change between an initial state and a successive state, causing a change in an optical property of the security material. The optical property indicates exposure to the irradiation.

In another aspect of the present disclosure, which may be used in combination with any other aspect or combination of aspects listed herein, the barcode symbol is valid when (i) the security material is in the initial state, (ii) the security material is in the successive state, (iii) the security material is in a fully excited state, and (iv) the security material is undergoing a state change between the initial state and the fully excited state.

In another aspect of the present disclosure, which may be used in combination with any other aspect or combination of aspects listed herein, the barcode symbol is configured to be read (iii) after a predetermined time interval after the security material is activated.

In another aspect of the present disclosure, which may be used in combination with any other aspect or combination of aspects listed herein, the barcode symbol is configured to be read (iii) after a predetermined time interval after the security material activation ceases.

In another aspect of the present disclosure, which may be used in combination with any other aspect or combination of aspects listed herein, the security material is mixed with, positioned under, or positioned over one or more of the plurality of barcode elements.

In another aspect of the present disclosure, which may be used in combination with any other aspect or combination of aspects listed herein, the security material is positioned beyond an outside edge of the barcode symbol.

In another aspect of the present disclosure, which may be used in combination with any other aspect or combination of aspects listed herein, the security material includes at least one phosphor material.

In another aspect of the present disclosure, which may be used in combination with any other aspect or combination of aspects listed herein, the security material includes at least one of Strontium Aluminate, CaS, ZnS and $SiO_2$.

Aspects of the subject matter described herein may be useful alone or in combination with one or more other aspects described herein. In an aspect of the present disclosure, a method of scanning a dataform comprising a barcode symbol includes receiving light from the dataform during a time period. The dataform may be the secure indicator described in any of the preceding aspects. The method also includes capturing at least one image from the received light, analyzing one of the at least one image to decode data from the barcode symbol, analyzing one of the at least one image to detect emission light within the received light, associating a characteristic of the dataform with the detected emission light, and outputting the associated characteristic with the decoded data.

In another aspect of the present disclosure, which may be used in combination with any other aspect or combination of aspects listed herein, the method further includes activating the security material of the secure indicator.

In another aspect of the present disclosure, which may be used in combination with any other aspect or combination of aspects listed herein, capturing the at least one image occurs after a predetermined time interval after the security material is activated.

In another aspect of the present disclosure, which may be used in combination with any other aspect or combination of aspects listed herein, the method further includes ceasing activation of the security material of the secure indicator.

In another aspect of the present disclosure, which may be used in combination with any other aspect or combination of aspects listed herein, analyzing the one of the at least one image to detect emission light is performed after a predetermined time interval after the security material activation ceases.

Aspects of the subject matter described herein may be useful alone or in combination with one or more other aspects described herein. In an aspect of the present disclosure, a system for reading a dataform comprising a barcode symbol includes a housing, an irradiation module, an image capture module, and a controller. The irradiation module is mounted to the housing, and the irradiation module has an irradiation source configured to irradiate the dataform at one or more excitation wavelengths of the dataform. The image capture module is mounted to the housing, and the image capture module has a two-dimensional detector and configured to capture image data. Additionally, the image capture module is configured to receive light from the dataform during a time period. The dataform may be the secure indicator described in any of the preceding aspects. The image capture module is also configured to capture at least one image from the received light. The controller is configured to analyze one of the at least one image to decode data from the barcode symbol, analyze one of the at least one image to detect emission light within the received light, associate a characteristic of the dataform with the detected emission light, and output the associated characteristic with the decoded data.

In another aspect of the present disclosure, which may be used in combination with any other aspect or combination of aspects listed herein, the irradiation module is configured to activate the security material of the secure indicator.

In another aspect of the present disclosure, which may be used in combination with any other aspect or combination of aspects listed herein, the image capture module is configured to capture the at least one image after a predetermined time interval after the security material is activated.

In another aspect of the present disclosure, which may be used in combination with any other aspect or combination of aspects listed herein, the irradiation module is further configured to cease activation of the security material of the secure indicator.

In another aspect of the present disclosure, which may be used in combination with any other aspect or combination of aspects listed herein, the controller is configured to analyze the one of the at least one image to detect emission light after a predetermined time interval after the security material activation ceases.

Aspects of the subject matter described herein may be useful alone or in combination with one or more other aspects described herein. In an aspect of the present disclosure, a non-transitory machine readable medium stores code, which when executed by at least one processor is configured to receive light from a dataform during a time period. The dataform may be the secure indicator described in any of the preceding aspects. The non-transitory machine readable medium is also configured to capture at least one image from the received light, analyze one of the at least one image to decode data from the barcode symbol, analyze one of the at least one image to detect emission light within the received light, associate a characteristic of the dataform with the detected emission light, and output the associated characteristic with the decoded data.

In another aspect of the present disclosure, which may be used in combination with any other aspect or combination of aspects listed herein, the non-transitory machine readable medium is further configured to activate the security material of the secure indicator.

In another aspect of the present disclosure, which may be used in combination with any other aspect or combination of aspects listed herein, capturing the at least one image occurs after a predetermined time interval after the security material is activated.

In another aspect of the present disclosure, which may be used in combination with any other aspect or combination of aspects listed herein, the non-transitory machine readable medium is further configured to cease activation of the security material of the secure indicator.

In another aspect of the present disclosure, which may be used in combination with any other aspect or combination of aspects listed herein, analyzing the one of the at least one image to detect emission light is performed after a predetermined time interval after the security material activation ceases.

Aspects of the subject matter described herein may be useful alone or in combination with one or more other aspects described herein. In an aspect of the present disclosure, a secure indicator includes a substrate, a barcode symbol, and a security material. The barcode symbol has a plurality of barcode elements provided on the substrate. The security material is positioned proximate the barcode symbol on the substrate. Additionally, the security material is configured to be activated by irradiation at one or more predetermined activation wavelengths. The barcode symbol is configured to be read (i) before the security material is activated and (ii) while the security material is activated. Additionally, a property of the security material is based at least in part on a change of the security material's luminescence between an initial state and a successive state.

In another aspect of the present disclosure, which may be used in combination with any other aspect or combination of aspects listed herein, the barcode symbol is configured to be read in a first wavelength and the security material is configured to luminesce in a second wavelength that does not affect the reading of the barcode.

In another aspect of the present disclosure, which may be used in combination with any other aspect or combination of aspects listed herein, the barcode symbol is configured to be read in a first wavelength and the security material is configured to luminesce in the first wavelength.

In another aspect of the present disclosure, which may be used in combination with any other aspect or combination of aspects listed herein, the security material is invisible to a naked eye before the security material is activated.

In another aspect of the present disclosure, which may be used in combination with any other aspect or combination of aspects listed herein, the security material luminesces in visible spectrum.

In another aspect of the present disclosure, which may be used in combination with any other aspect or combination of aspects listed herein, the security material luminesces outside visible spectrum.

In another aspect of the present disclosure, which may be used in combination with any other aspect or combination of aspects listed herein, the security material is in the initial state prior to luminescing and transitions to an activated state while the security material is luminescing.

In another aspect of the present disclosure, which may be used in combination with any other aspect or combination of aspects listed herein, the security material transitions from the activated state to the initial state after the security material is irradiated at the one or more predetermined activation wavelengths.

Aspects of the subject matter described herein may be useful alone or in combination with one or more other aspects described herein. In an aspect of the present disclosure, a system for reading an indicator that includes a luminescent indicia includes a housing, an irradiation module, an image capture module, and a controller. The irradiation module is mounted to the housing, and the irradiation module has an irradiation source configured to irradiate the indicator at one or more excitation wavelengths of the luminescent indicia. The image capture module is mounted to the housing, and the image capture module has a two-dimensional detector and configured to capture image data from radiation emitted by the luminescent indicia. The controller is configured to cause the irradiation module to illuminate for at least a first time interval having a first duration, cause the image capture module to capture at least one first image of the luminescent indicia at a first time after the first duration and at least one second image of the luminescent indicia at a second time after the first time, and determine a property of the indicator based at least in part on a comparison of the luminescent indicia's luminescence between the at least one second image and the at least one first image.

In another aspect of the present disclosure, which may be used in combination with any other aspect or combination of aspects listed herein, the comparison is one of a measured decrease of the luminescent indicia's luminescence between the at least one first image and the at least one second image, a measured increase of the luminescent indicia's luminescence between the at least one second image and the at least one first image, a rate of decrease of the luminescent indicia's luminescence between the at least one first image and the at least one second image, a rate of increase of the luminescent indicia's luminescence between the at least one first image and the at least one second image, a comparison between the luminescent indicia's luminescence at the first time to a first known threshold value, and a comparison between the luminescent indicia's luminescence at the second time to a second known threshold value.

In another aspect of the present disclosure, which may be used in combination with any other aspect or combination of aspects listed herein, the indicator is an environmental history indicator.

In another aspect of the present disclosure, which may be used in combination with any other aspect or combination of aspects listed herein, the luminescent indicia includes one of photochromic material and a phosphorescent material.

In another aspect of the present disclosure, which may be used in combination with any other aspect or combination of aspects listed herein, the system is a handheld device.

In another aspect of the present disclosure, which may be used in combination with any other aspect or combination of aspects listed herein, the system further includes a processing module configured to decode representations of a barcode symbol in the image data captured by the image capture module.

In another aspect of the present disclosure, which may be used in combination with any other aspect or combination of aspects listed herein, one of the controller and the processing module is configured to determine pixels in the image data corresponding to the luminescent indicia, and process pixels of the image data corresponding to the luminescent indicia to determine at least one optical property of the luminescent indicia at the first time and the second time.

In another aspect of the present disclosure, which may be used in combination with any other aspect or combination of aspects listed herein, one of the controller and the processing module is configured to determine the at least one optical property for each pixel of the image data corresponding to the luminescent indicia, combine the values for each of the first time and the second time for each of the multiple pixels, and determine an average value of the combined values of each pixel.

In another aspect of the present disclosure, which may be used in combination with any other aspect or combination of aspects listed herein, the indicator includes a barcode symbol, and one of the controller and the processing module is configured to compare first data of pixels associated with the luminescent indicator with second data associated with other portions of the barcode symbol.

In another aspect of the present disclosure, which may be used in combination with any other aspect or combination of aspects listed herein, one of the controller and the processing module is configured to locate the pixels associated with the luminescent indicator based on information encoded in and read from the barcode symbol.

In another aspect of the present disclosure, which may be used in combination with any other aspect or combination of aspects listed herein, one of the controller and the processing module is configured to process or locate the pixels based on information encoded in and read from the barcode symbol.

In another aspect of the present disclosure, which may be used in combination with any other aspect or combination of aspects listed herein, one of the controller and the processing module is configured provide an output for the indicator based on the property of the indicator, and a first output is provided when the luminescent indicia is in an initial state and a second output is provided when the luminescent indicia is in a subsequent state.

In another aspect of the present disclosure, which may be used in combination with any other aspect or combination of aspects listed herein, the output is based on data obtained from the barcode symbol.

In another aspect of the present disclosure, which may be used in combination with any other aspect or combination of aspects listed herein, the data obtained from the barcode symbol is dependent on the luminescent indicia's luminescence.

Aspects of the subject matter described herein may be useful alone or in combination with one or more other aspects described herein. In an aspect of the present disclosure, a method of scanning a dataform comprising a barcode symbol, the method includes receiving light from the dataform during a time period. The dataform may be the secure indicator described in any of the preceding aspects. The method also includes capturing at least one image from the received light, analyzing one of the at least one image to decode data from the barcode symbol, analyzing one of the at least one image to detect emission light within the received light, associating a characteristic of the dataform with the detected emission light, and outputting the associated characteristic with the decoded data.

Aspects of the subject matter described herein may be useful alone or in combination with one or more other aspects described herein. In an aspect of the present disclosure, a non-transitory machine readable medium stores code, which when executed by at least one processor is configured to receive light from a dataform during a time period. The dataform may be the secure indicator described in any of the preceding aspects. The non-transitory machine readable medium is also configured to capture at least one image from the received light, analyze one of the at least one image to decode data from the barcode symbol, analyze one of the at least one image to detect emission light within the received light, associate a characteristic of the dataform with the detected emission light, and output the associated characteristic with the decoded data.

Aspects of the subject matter described herein may be useful alone or in combination with one or more other aspects described herein. In an aspect of the present disclosure, a secure indicator scanner includes a processor, a memory coupled to the processor, and an optical input device coupled to the processor. The processor is configured to cause the optical input device to capture an image of a field of view, and the field of view includes a secure indicator that includes a barcode symbol and a security portion. The processor is also configured to store the image in the memory, process the image to identify the barcode symbol within the captured image, analyze the barcode symbol to determine or identify elements of the barcode symbol, and process the image to identify a security portion and a reference region within the image. Additionally, the processor is configured to determine an optical property associated with the security portion through a comparison with the reference region, decode barcode data from the identified barcode symbol, associate the barcode data with the determined optical property of the security portion, and output the associated data.

In another aspect of the present disclosure, which may be used in combination with any other aspect or combination of aspects listed herein, the processor is further configured to cause an irradiation module to illuminate the secure indicator for at least a first time interval having a first duration.

In another aspect of the present disclosure, which may be used in combination with any other aspect or combination of aspects listed herein, the irradiation module illuminates the secure indicator at an excitation wavelength of the security material for the first time interval thereby causing the security material to luminesce.

In another aspect of the present disclosure, which may be used in combination with any other aspect or combination of aspects listed herein, the processor is further configured to cause the irradiation module to cease excitation.

In another aspect of the present disclosure, which may be used in combination with any other aspect or combination of aspects listed herein, capturing the image of the field of view includes capturing at least one first image of the field of view at a first time after the first time interval and at least one second image of the field of view at a second time after the first time.

In another aspect of the present disclosure, which may be used in combination with any other aspect or combination of aspects listed herein, determining the optical property includes comparing the at least one second image to the at least one first image.

In another aspect of the present disclosure, which may be used in combination with any other aspect or combination of aspects listed herein, the at least one first image is associated with an initial optical property and the at least one second image is associated with a subsequent optical property.

In another aspect of the present disclosure, which may be used in combination with any other aspect or combination of aspects listed herein, the processor is further configured to compare the initial optical property to the subsequent optical property. Additionally, the processor is configured to determine one of a rate of increase, a rate of decrease, a rate of decay, an increase, a decrease, or a presence of decay between the initial optical property and the subsequent optical property.

In another aspect of the present disclosure, which may be used in combination with any other aspect or combination of aspects listed herein, determining the optical property of security portion includes at least one of comparing an initial optical property to a subsequent optical property, comparing the optical property to a threshold value, and determining one of a rate of increase, a rate of decrease, a rate of decay, an increase, a decrease, or a presence of decay of the optical property.

In another aspect of the present disclosure, which may be used in combination with any other aspect or combination of aspects listed herein, the optical property includes at least one of an initial optical property and a subsequent optical property associated with the security portion. The at least one of the initial optical property and the subsequent optical property is determined based at least partially on data decoded from the barcode symbol.

In another aspect of the present disclosure, which may be used in combination with any other aspect or combination of aspects listed herein, the processor is further configured to compare the optical property of the security portion to the decoded barcode data.

In another aspect of the present disclosure, which may be used in combination with any other aspect or combination of aspects listed herein, the processor is further configured to determine the optical property of the security portion after decoding the barcode data.

In another aspect of the present disclosure, which may be used in combination with any other aspect or combination of aspects listed herein, the decoded barcode data provides information related to at least one of the security portion and the reference region.

Aspects of the subject matter described herein may be useful alone or in combination with one or more other aspects described herein. In an aspect of the present disclosure, a secure indicator includes a substrate, a barcode symbol having a plurality of barcode elements provided on the substrate, a security material, and a reference material. The security material is positioned proximate the barcode symbol on the substrate. Additionally, the reference material is positioned in or adjacent to the barcode symbol. The reference material is configured to provide a reference threshold value for the security material. The security material is configured to be activated by irradiation at one or more predetermined activation wavelengths. Additionally, the barcode symbol is configured to be read (i) before the security material is activated and (ii) while the security material is activated.

In another aspect of the present disclosure, which may be used in combination with any other aspect or combination of aspects listed herein, the reference material is located adjacent to the barcode.

In another aspect of the present disclosure, which may be used in combination with any other aspect or combination of aspects listed herein, the reference material is positioned within an invariant area of the barcode.

In another aspect of the present disclosure, which may be used in combination with any other aspect or combination of aspects listed herein, the plurality of barcode elements are printed in the reference material.

Aspects of the subject matter described herein may be useful alone or in combination with one or more other aspects described herein. In an aspect of the present disclosure, a method of scanning a dataform comprising a barcode symbol includes receiving light from the dataform during a time period, capturing at least one image from the received light, and analyzing one of the at least one image to decode data from the barcode symbol The dataform may be the secure indicator described in any of the preceding aspects. The method also includes analyzing one of the at least one image to detect emission light within the received light, associating a characteristic of the dataform with the detected emission light, and outputting the associated characteristic with the decoded data.

In another aspect of the present disclosure, which may be used in combination with any other aspect or combination of aspects listed herein, analyzing the one of the at least one image to detect emission light within the received light is based on information obtained from the reference material.

In another aspect of the present disclosure, which may be used in combination with any other aspect or combination of aspects listed herein, the characteristic of the dataform is determined based at least partially on data decoded from the barcode symbol.

Aspects of the subject matter described herein may be useful alone or in combination with one or more other aspects described herein. In an aspect of the present disclosure, a non-transitory machine readable medium stores code, which when executed by at least one processor is configured to receive light from a dataform during a time period. The dataform may be the secure indicator described in any of the preceding aspects. The non-transitory machine readable medium is also configured to capture at least one image from the received light, analyze one of the at least one image to decode data from the barcode symbol, analyze one of the at least one image to detect emission light within the received light, associate a characteristic of the dataform with the detected emission light, and output the associated characteristic with the decoded data.

Aspects of the subject matter described herein may be useful alone or in combination with one or more other aspects described herein. In an aspect of the present disclosure, a secure indicator includes a substrate, a barcode symbol, and a security material. The barcode symbol has a plurality of barcode elements provided on the substrate. The security material is positioned proximate the barcode symbol on the substrate. The security material is configured to be activated by irradiation at one or more predetermined activation wavelengths. Additionally, the barcode symbol is configured to be read (i) before the security material is activated and (ii) while the security material is activated. The barcode symbol encodes data that is configured to be used in locating, reading, determining the state of, interpreting, or evaluating a security portion containing the security material.

In another aspect of the present disclosure, which may be used in combination with any other aspect or combination of aspects listed herein, the barcode symbol includes at least one encoded data identifier. The at least one encoded data identifier includes a first data identifier that indicates at least one of a time, a rate, a threshold, a type of luminescent present, a state, or an expected rate of decrease associated with the security material's luminescence.

In another aspect of the present disclosure, which may be used in combination with any other aspect or combination of aspects listed herein, the barcode symbol includes a second encoded data identifier, and the second encoded data identifier indicates at least one of size and location of the security material.

In another aspect of the present disclosure, which may be used in combination with any other aspect or combination of aspects listed herein, the rate of decrease is a constant rate.

In another aspect of the present disclosure, which may be used in combination with any other aspect or combination of aspects listed herein, the rate of decrease is a variable rate.

Aspects of the subject matter described herein may be useful alone or in combination with one or more other aspects described herein. In an aspect of the present disclosure, a method of scanning a dataform comprising a barcode symbol includes receiving light from the dataform during a time period. The dataform may be the secure indicator described in any of the preceding aspects. The method also includes capturing at least one image from the received light, analyzing one of the at least one image to decode data from the barcode symbol, analyzing one of the at least one image to detect emission light within the received light, associating a characteristic of the dataform with the detected emission light, and outputting the associated characteristic with the decoded data.

In another aspect of the present disclosure, which may be used in combination with any other aspect or combination of aspects listed herein, analyzing one of the at least one image to decode data from the barcode includes decoding at least one encoded data identifier associated with the barcode symbol.

In another aspect of the present disclosure, which may be used in combination with any other aspect or combination of aspects listed herein, the at least one encoded data identifier includes a first data identifier that indicates at least one of a time, a rate, a threshold, a type of luminescent present, a state, or an expected rate of decrease associated with the security material's luminescence.

In another aspect of the present disclosure, which may be used in combination with any other aspect or combination of aspects listed herein, the barcode symbol includes a second encoded data identifier, and the second encoded data identifier indicates at least one of size and location of the security material.

Aspects of the subject matter described herein may be useful alone or in combination with one or more other aspects described herein. In an aspect of the present disclosure, a non-transitory machine readable medium stores code, which when executed by at least one processor is configured to receive light from a dataform during a time period. The dataform may be the secure indicator described in any of the preceding aspects. The non-transitory machine readable medium is also configured to capture at least one image from the received light, analyze one of the at least one image to decode data from the barcode symbol, analyze one of the at least one image to detect emission light within the received light, associate a characteristic of the dataform with the detected emission light, and output the associated characteristic with the decoded data.

In another aspect of the present disclosure, which may be used in combination with any other aspect or combination of aspects listed herein, analyzing one of the at least one image to decode data from the barcode includes decoding at least one encoded data identifier associated with the barcode symbol.

In another aspect of the present disclosure, which may be used in combination with any other aspect or combination of aspects listed herein, the at least one encoded data identifier includes a first data identifier that indicates at least one of a time, a rate, a threshold, a type of luminescent present, a state, or an expected rate of decrease associated with the security material's luminescence.

In another aspect of the present disclosure, which may be used in combination with any other aspect or combination of aspects listed herein, the barcode symbol includes a second encoded data identifier, and the second encoded data identifier indicating at least one of size and location of the security material.

Aspects of the subject matter described herein may be useful alone or in combination with one or more other aspects described herein. In an aspect of the present disclosure, a secure indicator scanner includes a processor, a memory coupled to the processor, and an optical input device coupled to the processor. The processor is configured to cause the optical input device to capture an image of a field of view. The field of view includes a secure indicator including a barcode symbol and a security portion. The processor is also configured to store the image in the memory, process the image to identify the barcode symbol within the captured image, and analyze the barcode symbol to determine or identify elements of the barcode symbol. The barcode symbol encodes data that is configured to be used in locating, reading, determining the state of, interpreting, or evaluating a security portion containing the security material. The processor is also configured to process the image to identify the security portion, determine an optical property of the security portion, decode barcode data from the identified barcode symbol, associate the barcode data with the determined optical property of the security portion, and output the associated data.

In another aspect of the present disclosure, which may be used in combination with any other aspect or combination of aspects listed herein, the encoded data includes at least a first encoded data identifier. The first encoded data identifiers includes a first data identifier that indicates at least one of a time, a rate, a threshold, a type of luminescent present, a state, or an expected rate of decrease associated with the security material's luminescence.

In another aspect of the present disclosure, which may be used in combination with any other aspect or combination of aspects listed herein, the encoded data includes a second encoded data identifier, and the second encoded data identifier indicating at least one of size and location of the security material.

Aspects of the subject matter described herein may be useful alone or in combination with one or more other aspects described herein. In an aspect of the present disclosure, a system for reading a dataform comprising a barcode symbol includes a housing, an irradiation module, an image capture module, and a controller. The irradiation module is mounted to the housing, and the irradiation module having an irradiation source configured to irradiate the dataform at one or more excitation wavelengths of the dataform. The image capture module is mounted to the housing, and the image capture module has a two-dimensional detector and configured to capture image data. The image capture module is configured to receive light from the dataform during a time period, and capture at least one image from the received light. The dataform may be the secure indicator described in any of the preceding aspects. The controller is configured to analyze one of the at least one image to decode data from the barcode symbol, analyze one of the at least one image to detect emission light within the received light, associate a characteristic of the dataform with the detected emission light, and output the associated characteristic with the decoded data.

In another aspect of the present disclosure, which may be used in combination with any other aspect or combination of aspects listed herein, the controller is configured to analyze one of the at least one image to decode data, and the decoded data includes data from at least one encoded data identifier associated with the barcode symbol.

In another aspect of the present disclosure, which may be used in combination with any other aspect or combination of aspects listed herein, the at least one encoded data identifier includes a first data identifier that indicates at least one of a time, a rate, a threshold, a type of luminescent present, a state, or an expected rate of decrease associated with the security material's luminescence.

In another aspect of the present disclosure, which may be used in combination with any other aspect or combination of aspects listed herein, the barcode symbol includes a second encoded data identifier, and the second encoded data identifier indicating at least one of size and location of the security material.

Aspects of the subject matter described herein may be useful alone or in combination with one or more other aspects described herein. In an aspect of the present disclosure, a secure indicator includes a substrate, a barcode symbol having a plurality of barcode elements provided on the substrate, and a security material positioned proximate the barcode symbol on the substrate. The security material is configured to be activated by irradiation at one or more predetermined activation wavelengths. Additionally, the barcode symbol is configured to be read (i) before the security material is activated and (ii) while the security material is activated. One or more of the plurality of barcode elements with the security material are dynamic elements and the barcode elements without security material are static elements. Additionally, the static elements are configured to be read at the same wavelength as the dynamic elements when the security material is luminescing.

In another aspect of the present disclosure, which may be used in combination with any other aspect or combination of aspects listed herein, the barcode symbol is an error correcting barcode symbol, and information about the security material is obtained prior to an error correction process when the secure indicator is read.

In another aspect of the present disclosure, which may be used in combination with any other aspect or combination of aspects listed herein, the barcode symbol is configured to produce a first value when read during (i) and a second value when read during (ii).

In another aspect of the present disclosure, which may be used in combination with any other aspect or combination of aspects listed herein, the security material includes at least one phosphor material.

In another aspect of the present disclosure, which may be used in combination with any other aspect or combination of aspects listed herein, the security material includes at least one of Strontium Aluminate, CaS, ZnS and $SiO_2$.

In another aspect of the present disclosure, which may be used in combination with any other aspect or combination of aspects listed herein, the security material is invisible to a naked eye before the security material is activated.

In another aspect of the present disclosure, which may be used in combination with any other aspect or combination of aspects listed herein, the security material transitions from an activated state to an initial state after the security material is irradiated at the one or more predetermined activation wavelengths.

In another aspect of the present disclosure, which may be used in combination with any other aspect or combination of aspects listed herein, the security material has a chemistry that is configured, responsive to irradiation at the one or more predetermined activation wavelengths, to undergo a chemical or physical state change between an initial state and a successive state, causing a change in an optical property of the security material. The optical property indicates exposure to the irradiation.

In another aspect of the present disclosure, which may be used in combination with any other aspect or combination of aspects listed herein, the change between the initial state and the successive state occurs for an interval after irradiation at the one or more predetermined activation wavelengths ceases.

In another aspect of the present disclosure, which may be used in combination with any other aspect or combination of aspects listed herein, the barcode symbol is printed in a naked eye visible wavelength.

Aspects of the subject matter described herein may be useful alone or in combination with one or more other aspects described herein. In an aspect of the present disclosure, a method of scanning a dataform comprising a barcode symbol includes receiving light from the dataform during a time period. The dataform may be the secure indicator described in any of the preceding aspects. The method also includes capturing at least one image from the received light, analyzing one of the at least one image to decode data from the barcode symbol, analyzing one of the at least one image to detect emission light within the received light, associating a characteristic of the dataform with the detected emission light, and outputting the associated characteristic with the decoded data.

Aspects of the subject matter described herein may be useful alone or in combination with one or more other aspects described herein. In an aspect of the present disclosure, a non-transitory machine readable medium stores code, which when executed by at least one processor is configured to receive light from a dataform during a time period. The dataform may be the secure indicator described in any of the preceding aspects. The non-transitory machine readable medium is also configured to capture at least one image from the received light, analyze one of the at least one image to decode data from the barcode symbol, analyze one of the at least one image to detect emission light within the received light, associate a characteristic of the dataform with the detected emission light, and output the associated characteristic with the decoded data.

Aspects of the subject matter described herein may be useful alone or in combination with one or more other aspects described herein. In an aspect of the present disclosure, a method of scanning a dataform comprising a barcode symbol includes receiving light from the dataform during a time period, and capturing at least one image from the received light. The dataform may be the secure indicator described in any of the preceding aspects. The method also includes analyzing one of the at least one image to decode data from the barcode symbol, analyzing one of the at least one image to detect emission light within the received light, associating a characteristic of the dataform with the detected emission light, and outputting the associated characteristic with the decoded data.

Aspects of the subject matter described herein may be useful alone or in combination with one or more other aspects described herein. In an aspect of the present disclosure, a method of reading a secure indicator including a barcode symbol that has a plurality of barcode elements and a security material positioned in one or more of the plurality of barcode elements includes exciting the security material with radiation at an excitation wavelength of the security material for an interval thereby causing the security material to luminesce, ceasing excitation, and capturing at least one first image of the secure indicator at a first time after the interval and at least one second image of the secure indicator at a second time after the first time. The method also includes scanning the images of the indicator to obtain optical values for pixels in the images, constructing a scanned pixel map containing the optical values in the barcode symbol, processing the pixels in the scanned pixel map to assign a binary optical value to each pixel and to form a binarised pixel map, and identifying the barcode symbol in the binarised pixel map. Additionally, the method includes decoding the identified barcode symbol in the binarised pixel map to recover a symbol codeword sequence, recovering underlying data codewords from the symbol codeword sequence-by utilizing an error correction process on the symbol codeword sequence, processing the data codewords for identification of the security material, and determining a property of the security material based at least in part on a decrease of the security material's luminescence between the at least one second image and the at least one first image and the data codewords.

In another aspect of the present disclosure, which may be used in combination with any other aspect or combination of aspects listed herein, processing the pixels in the scanned pixel map to assign a binary optical value to each pixel and to form a binarised pixel map includes classifying each pixel as one of a black pixel, a white pixel, and a luminescent pixel.

In another aspect of the present disclosure, which may be used in combination with any other aspect or combination of aspects listed herein, the black pixels, the white pixels, and the luminescent pixels are used to form a ternarised pixel map, and the black and white pixels in the ternarised pixel map are used to identify the barcode symbol in the ternarised pixel map.

In another aspect of the present disclosure, which may be used in combination with any other aspect or combination of aspects listed herein, the optical value is one of a color value, an average color value, a luminescence value, a luminescence decay value, an average luminescence value, a phosphorescence value, and an average phosphorescence value, a fluorescence value, a fluorescence decay value, an average fluorescence value, a reflectance value, an average reflectance value, an emission value, an intensity value, a rate of decay value, a color density value, an average color density value, and an RGB value.

In another aspect of the present disclosure, which may be used in combination with any other aspect or combination of aspects listed herein, the method further includes associating barcode data with the property of the security material, and outputting the associated data.

In another aspect of the present disclosure, which may be used in combination with any other aspect or combination of aspects listed herein, the associated data indicates at least one of a time, a rate, a first threshold, a time to hit a predetermined threshold, a second threshold associated with a predetermined time, a time-threshold pair, an identifier of a type of luminescent present, a color state, an intensity state, an absorption state, and an emission state.

In another aspect of the present disclosure, which may be used in combination with any other aspect or combination of aspects listed herein, the at least one first image is associated with an initial optical property and the at least one second image is associated with a subsequent optical property.

In another aspect of the present disclosure, which may be used in combination with any other aspect or combination of aspects listed herein, outputting the associated data includes one of outputting initial associated data and outputting subsequent associated data. The respective output data differs based on the respective optical property of the security material.

In another aspect of the present disclosure, which may be used in combination with any other aspect or combination of aspects listed herein, determining a property of the security material includes comparing the at least one second image to the at least one first image, and determining a difference between the at least one second image and the at least one first image.

Aspects of the subject matter described herein may be useful alone or in combination with one or more other aspects described herein. In an aspect of the present disclosure, a non-transitory machine readable medium stores code, which when executed by at least one processor is configured to excite a security material of a secure indicator with radiation at an excitation wavelength of the security material for an interval thereby causing the security material to luminesce. The secure indicator includes a barcode symbol having a plurality of barcode elements and a security material positioned in one or more of the plurality of barcode elements. The non-transitory machine readable medium is also configured to cease excitation, capture at least one first image of the secure indicator at a first time after the interval and at least one second image of the secure indicator at a second time after the first time, scan the images of the indicator to obtain optical values for pixels in the images, and construct a scanned pixel map containing the optical values in the barcode symbol. Additionally, the non-transitory machine readable medium is configured to process the pixels in the scanned pixel map to assign a binary optical value to each pixel and to form a binarised pixel map, identify the barcode symbol in the binarised pixel map, decode the identified barcode symbol in the binarised pixel map to recover a symbol codeword sequence, and recover underlying data codewords from the symbol codeword sequence-by utilizing an error correction process on the symbol codeword sequence. The non-transitory machine readable medium is also configured to process the data codewords for identification of the security material and determine a property of the security material based at least in part on a decrease of the security material's luminescence between the at least one second image and the at least one first image and the data codewords.

Aspects of the subject matter described herein may be useful alone or in combination with one or more other aspects described herein. In an aspect of the present disclosure, a method of auto-calibrating a scanner includes capturing an image of a secure indicator. The image includes a computer readable indicia encoding a data codeword, preferably a barcode symbol, a security portion of the secure indicator, and a reference region having a known optical property, preferably a known reflectivity. The security portion includes a security material, and the security material is at least one of a photochromic material, a luminescent material, a phosphor material, a phosphorescent material, a fluorescent material, a UV-reactive material, and an IR-reactive material. The method also includes decoding data from at least one of the computer readable indicia and the reference region and calibrating the scanner based on the data and the known optical property.

In another aspect of the present disclosure, which may be used in combination with any other aspect or combination of aspects listed herein, the method further includes decoding data from the security portion of the secure indicator.

In another aspect of the present disclosure, which may be used in combination with any other aspect or combination of aspects listed herein, the method further includes prior to capturing the image, irradiating the security material. Additionally, the method includes prior to calibrating the scanner, confirming that the security material luminesces.

In another aspect of the present disclosure, which may be used in combination with any other aspect or combination of aspects listed herein, the method further includes prior to capturing the image, irradiating the security material, and determining an optical property, preferably an average color value, of the security material. Additionally, the method includes prior to calibrating the scanner, confirming that the optical property matches an expected value.

In another aspect of the present disclosure, which may be used in combination with any other aspect or combination of aspects listed herein, the optical property is one of a color value, an average color value, a luminescence value, a luminescence decay value, an average luminescence value, a phosphorescence value, an average phosphorescence value, a fluorescence value, a fluorescence decay value, an average fluorescence value, a reflectance value, an average reflectance value, an emission value, an intensity value, a rate of decay value, a color density value, an average color density value, and an RGB value.

In another aspect of the present disclosure, which may be used in combination with any other aspect or combination of aspects listed herein, determining the optical property of the security material includes determining a first optical property at a first time, and determining a second optical property at a second time.

In another aspect of the present disclosure, which may be used in combination with any other aspect or combination of aspects listed herein, determining the optical property further includes comparing the second optical property to the first optical property.

In another aspect of the present disclosure, which may be used in combination with any other aspect or combination of aspects listed herein, determining the optical property further includes determining a difference between the second optical property and the first optical property.

In another aspect of the present disclosure, which may be used in combination with any other aspect or combination of aspects listed herein, calibrating the scanner is further based on the first optical property and the second optical property.

In another aspect of the present disclosure, which may be used in combination with any other aspect or combination of aspects listed herein, the image is a first image, and the method further includes capturing a second image of the secure indicator.

In another aspect of the present disclosure, which may be used in combination with any other aspect or combination of aspects listed herein, the method further includes analyzing the first image and the second image, providing a first calibration point based on the first image, and providing a second calibration point based on the second image.

In another aspect of the present disclosure, which may be used in combination with any other aspect or combination of aspects listed herein, calibrating the scanner is additionally based on a difference between the first image and the second image.

Aspects of the subject matter described herein may be useful alone or in combination with one or more other aspects described herein. In an aspect of the present disclosure, an auto-calibration system includes a scanner, an illumination module, an image capture module, and a controller. The image capture module is configured to capture an image of a secure indicator. The image includes a computer readable indicia encoding a data codeword, preferably a barcode symbol. The image also includes a security portion of the secure indicator and a reference region having a known optical property, preferably a known reflectivity. The security portion includes a security material, and the security material is at least one of a photochromic material, a luminescent material, a phosphor material, a phosphorescent material, a fluorescent material, a UV-reactive material, and an IR-reactive material. The controller is configured to decode data from at least one of the computer readable indicia and the reference region, and calibrate the scanner based on the data and the known optical property.

In another aspect of the present disclosure, which may be used in combination with any other aspect or combination of aspects listed herein, the controller is further configured to decode data from the security portion of the secure indicator.

In another aspect of the present disclosure, which may be used in combination with any other aspect or combination of aspects listed herein, the illumination module is an irradiation module. The irradiation module is configured to irradiate the security material prior to the image capture module capturing the image.

In another aspect of the present disclosure, which may be used in combination with any other aspect or combination of aspects listed herein, the controller is configured to determine an optical property, preferably an average color value, of the security material, and confirm that the optical property matches an expected value prior to calibrating the scanner.

In another aspect of the present disclosure, which may be used in combination with any other aspect or combination of aspects listed herein, the optical property is one of a color value, an average color value, a luminescence value, a luminescence decay value, an average luminescence value, a phosphorescence value, an average phosphorescence value, a fluorescence value, a fluorescence decay value, an average fluorescence value, a reflectance value, an average reflectance value, an emission value, an intensity value, a rate of decay value, a color density value, an average color density value, and an RGB value.

In another aspect of the present disclosure, which may be used in combination with any other aspect or combination of aspects listed herein, the image is a first image, and the image capture module is configured to capture a second image of the secure indicator.

In another aspect of the present disclosure, which may be used in combination with any other aspect or combination of aspects listed herein, the controller is further configured to analyze the first image and the second image, provide a first calibration point based on the first image, and provide a second calibration point based on the second image.

Aspects of the subject matter described herein may be useful alone or in combination with one or more other aspects described herein. In an aspect of the present disclosure, a non-transitory machine readable medium stores code, which when executed by at least one processor is configured to capture an image of a secure indicator. The image includes a computer readable indicia encoding a data codeword, preferably a barcode symbol. The image also includes a security portion of the secure indicator, and a reference region having a known optical property, preferably a known reflectivity. The security portion includes a security material, and the security material is at least one of a photochromic material, a luminescent material, a phosphor material, a phosphorescent material, a fluorescent material, a UV-reactive material, and an IR-reactive material. The non-transitory machine readable medium is also configured to decode data from at least one of the computer readable indicia and the reference region, and calibrate a scanner based on the data and the known optical property.

Additional features and advantages of the disclosed system, method, and apparatus are described in, and will be apparent from, the following Detailed Description and the Figures.

BRIEF DESCRIPTION OF THE FIGURES

FIG. 1A is a representation of a secure indicator according to an example embodiment of the present disclosure.

FIG. 1B is a representation of a secure indicator according to an example embodiment of the present disclosure.

FIG. 8A is a block diagram of an example barcode module according to an example embodiment of the present disclosure.

FIG. 8B is flowchart illustrating example processes performed by the barcode module according to an example embodiment of the present disclosure.

FIG. 10A is a block diagram of an example security portion module according to an example embodiment of the present disclosure.

FIG. 10B is flowchart illustrating example processes performed by the security portion module according to an example embodiment of the present disclosure.

FIG. 11A is a block diagram of an example phosphorescence module according to an example embodiment of the present disclosure.

FIG. 11B is flowchart illustrating example processes performed by the phosphorescence module according to an example embodiment of the present disclosure.

DETAILED DESCRIPTION OF EXAMPLE EMBODIMENTS

Figure 2A:
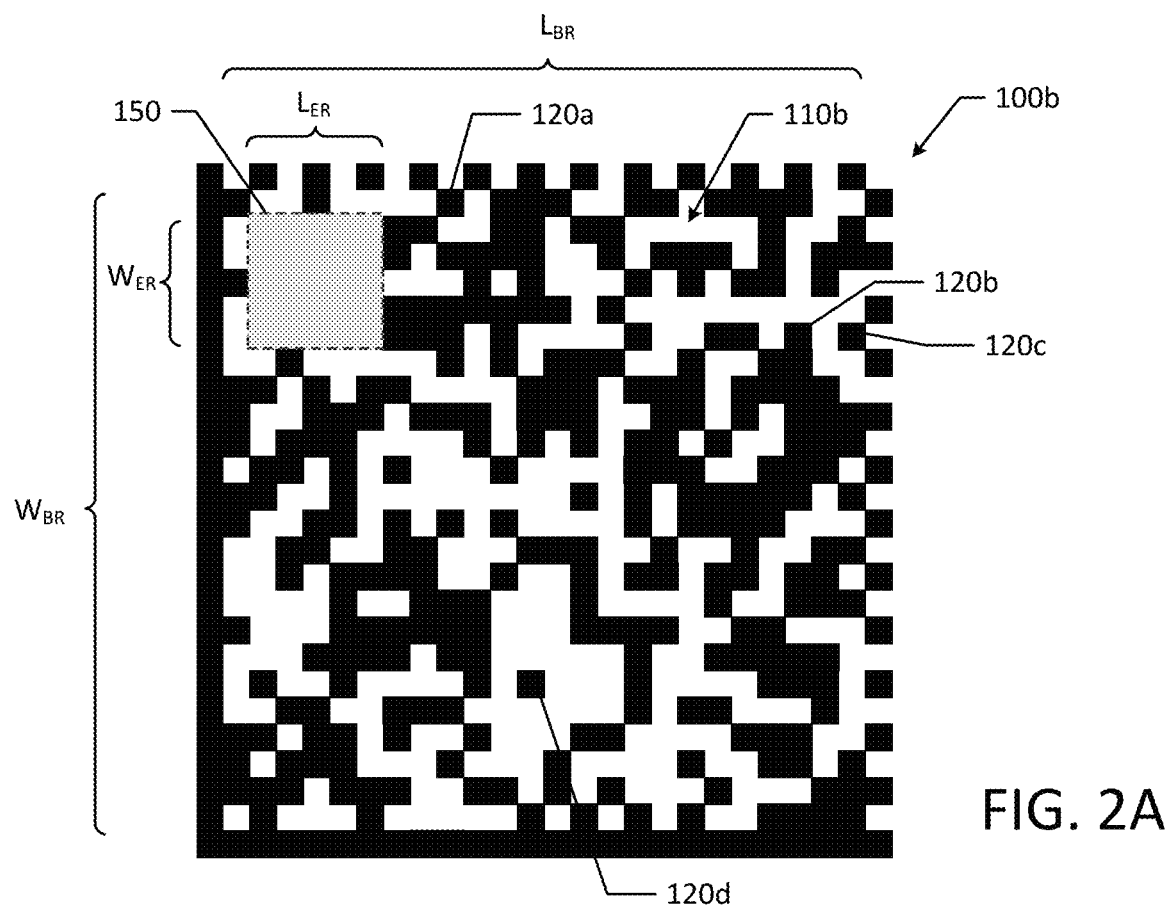
FIG. 2A is a representation of a secure indicator (e.g., a 26×26 Data Matrix) according to an example embodiment of the present disclosure.

Security materials, such as inks, toners, dyes, paints and waxes, may be provided on products, packaging, and labels due to the increasing need for securely monitoring products and for anti-counterfeiting protection. The security material may change state, e.g., by either changing color, or luminescing when exposed to particular light wavelengths. The security materials may be covert, both before they are exposed, and in some cases, even after they are exposed to the particular light wavelengths. The wavelengths required to trigger the state change, color change or luminescence may vary. The security materials may be an ultraviolet ("UV")-reactive material that changes state when exposed to UV light or an infrared ("IR")-reactive material that changes state when exposed to IR light. Similarly, the bright emission of a luminescent security material or the color state, which a photochromic security indicator changes to when exposed to the particular triggering wavelengths, may also be covert, and not visible to the human eye under normal lighting conditions, although visible indicators may also be used. The security materials may be provided on security tags or barcodes to securely monitor items and protect against counterfeiting. External irradiation sources, such as light sources, may also be provided to users who or devices which need to authenticate the security materials. Security materials may require an external source (e.g., a flashlight emitting the correct wavelength) to activate the security material. In one example, a 365 nm wavelength flashlight may be used in conjunction with UV-reactive materials.

Upon illumination with the external radiation or irradiation source (e.g., a light source, such as a UV light source), the invisible materials appear brightly colored. The brightly colored material (e.g., ink, toner, dye, paint or wax) provides confirmation that the indicator, and the associated host product, is authentic. However, the external light sources (e.g., flashlights) must be carried with personnel at all times in order to identify the presence of the security material, and the flashlights may cost approximately $10 to $40. Alternatively, the bright color of the invisible material may also be invisible to the naked eye, and detectable only by using a suitable reader, such as a UV or infrared camera or scanner. For example, the security material may emit or radiate in the infrared radiation ("IR") spectrum. In another example, the security material may be excited or activated by light in the IR range while also emitting in the IR spectrum. As used herein, the "naked eye" means a person's vision or what can be seen without the help of equipment, such as a telescope, microscope, prism, filter, camera, and the like.

The systems and method described herein discuss incorporation of secure indicators, such as luminescent, (or more particularly, phosphorescent or fluorescent) material or photochromic materials with labels, barcodes, etc. The security material may form a security indicia, such as a luminescent indicia, (or more particularly, phosphorescent indicia) and may be positioned in a security portion of a secure indicator. As used herein, the luminescent indicia may be provided as a phosphorescent compound, a fluorescent compound, or a combination, which may be an ink, toner, dye, paint or wax with luminescent pigments, or a photochromic material, each of which may be generally referred to as a "security material". In an example, the security material may be a sensor dye. The sensor dye may be a luminescent substance that chemically bonds to the substrate to which it is being applied. The sensor dye may be a luminescent dye or a fluorescent dye. As discussed above, the security material may be a photochromic material, a luminescent material or a phosphor material, such as phosphorescent material or a fluorescent material, a UV-reactive material, an IR-reactive material, an inorganic material, or a combination thereof. In another example, the security material may include a sensor dye that reacts by changing state (e.g., changes colors) in response to other forms of environmental stimuli, e.g., temperature exposure, along with other compounds or ingredients that form the security material. The security material may also referred to as an active material (e.g., active ink) or a dynamic material (e.g., dynamic ink).

The security material may be used in conjunction with labels, barcodes, etc. For example, media such as tags, labels, cards, wristbands, and/or ribbons containing this security material can be used in conjunction with printers, displays, vision systems, hand-held devices (e.g., for reading and verification), and data services (e.g., for data management and communication). The security material may be utilized for anti-counterfeiting or to provide authentication on data carrying labels and barcodes, such as 2D barcodes, to enhance security.

As described in the example embodiments herein, the security material is provided as part of a secure indicator. For example, security material may be provided proximate to the barcode symbol, such that the security material is within a barcode or in an area outside of the barcode, but near the barcode. The proximity of the security material to the barcode symbol may be up to a few bars or modules from an outside edge of dark regions of the barcode symbol, which is described in more detail with reference to FIGS. 4A and 4B. In some examples, the security material may partially or completely surround the barcode. By providing the security material in a region outside of the barcode, more of the security material (e.g., the entire security portion of the indicator) may be read by a reader to determine the properties of the security material. Additionally, since each portion of the security material (e.g., the entire security portion of the secure indicator) may be read and utilized for analysis, less security material may be needed for the same measuring accuracy as barcodes with overprinted or underprinted security portions positioned within the barcode (e.g., in an invariant area), thereby further reducing waste and cost. In some embodiments, providing the security material proximate to the barcode symbol may assist a user in presenting the security material to a reader or scanner because the barcode symbol may be visible to the user while the security material is not.

As used herein, a barcode symbol is a machine-readable pattern encoding data. The barcode symbol is one type of dataform. Other types or examples of dataforms include text, numbers, graphics, etc. Text is a dataform representing written language, numbers are dataforms representing arithmetical values, and graphics are dataforms representing images.

A barcode symbol may be made up of one or more barcode elements, which may be referred to as a barcode module. An element or module is a set of contrasting patterns that are arranged on a substrate to facilitate decoding data by a barcode reader or scanner. A barcode element or module may describe both a "black" box and a "white" box, or a "light absorbing" box and a "light reflective" box. In other examples, a barcode element or module may also describe a "light emitting" element. Some barcode symbols include quiet space(s), a region surrounding a set of elements or modules, which is free of contrasting marks, to enable the barcode reader to detect the barcode symbol in a captured image. Some barcode symbols include elements or modules, called finder patterns, that provide a consistent pattern to enable the barcode reader to detect the barcode symbol in a captured image.

The way in which data is encoded in the barcode symbol, the arrangement of the barcode elements or modules within the barcode symbol, and any requirements for elements or modules and quiet space are defined by a set of rules, known as a barcode symbology. Data may be encoded into the contrasting patterns by software, such as a computer application or printer firmware.

Barcode symbols, which may be generally referred to herein as barcodes, may be displayed on a screen or marked on a substrate. Barcode elements or modules may be marked on a substrate in a variety of ways. Black bars (rectangles, squares, circles, or triangles, or other shapes are generally called bars, or elements, in a barcode) may be printed on a white or mirrored substrate to create the contrasting pattern of an element or module. Similarly, white patterns may be printed on a black or transparent substrate to create the contrasting pattern of an element or module. In either case, a barcode reader would capture an image of the barcode by receiving light reflected from the white portions of the element or module at a greater intensity than light reflected from the black portions of the element or module. The contrasting intensity pattern of the captured image is then processed by the barcode reader to decode the data carried by the barcode. In some embodiments, a reflective or mirrored surface may provide the contrasting pattern. Barcode elements or modules may also be marked on a substrate by etching or denting a smooth surface; in this case light is received at different intensities from a smooth surface than the textured surface.

In some embodiments, the contrasting pattern comprises two different visible colors. The two different visible colors reflect light of different frequencies. Barcode readers receive and filter the light then process the captured image to decode the data carried by the barcode. Either or both intensity and frequency of the received light may be processed to decode the data. In some embodiments, the contrasting pattern received by the barcode reader comprises at least one light emitted by the barcode. For instance, an electronic screen may display a barcode element or module using at least two different visible colors to create the contrasting pattern; the barcode reader receives and filters the light then processes the captured image to decode the data. An electronic screen may flash a rendition of an element or module, a barcode, or of multiple barcodes to exchange data with the barcode reader. In some applications a barcode symbol is printed on a substrate using a luminescent ink, then exposed to light of a first frequency, causing the luminescent ink to emit light at a particular frequency that may differ from the first frequency; the barcode receiver receives and filters the emitted light then processes the captured image to decode the data, analyzing either or both intensity and frequency of the received light. In an embodiment, black bars (rectangles, squares, circles, or triangles, etc.) may be marked on a white substrate comprising luminescent material, known as an optical brightener, such that the intensity of the received light at the barcode reader is influenced by both reflective properties and luminescing properties of the substrate.

Certain molecules may emit light in a process known as luminescence. When luminescent molecules are exposed to light (photons) of an appropriate wavelength, an electron of the molecule absorbs energy of the photon and moves to a higher orbit. When the electron returns to a lower orbit it emits light. Luminescent materials are comprised of luminescent molecules that are activated by activation light having an activation wavelength and emit emission light having an emission wavelength. Generally, in fluorescent materials the electron does not change its direction of spin and returns to a singlet excited state almost immediately, while in phosphorescent materials (phosphors) the electron transitions to an excited triplet state and takes somewhat longer to return to the low energy state. Fluorescent materials or phosphorescent materials may emit light at a lower energy than the absorbed photon, so either type of luminescent material would emit light (photons) with an emission wavelength longer than the activation wavelength. Generally, the emission wavelength of a phosphorescent material is longer than the emission wavelength of a fluorescent material.

Luminescent materials may be activated with a light source of an appropriate activation wavelength. Emission light from the luminescent material may be detected with a sensor configured to receive light of an appropriate emission wavelength. The time interval from the moment the light source is exposed to the luminescing material until the sensor can no longer detect emission light from the luminescing material is called the radiation period. As used herein, "activated" or in the activated state may be when the security material has receives light of sufficient intensity at an appropriate wavelength. Additionally, "activated" may be when the security material has received sufficient light to begin to luminesce.

Visible color(s) generally refers to the portion of the electromagnetic spectrum that is visible to a human eye, typically comprised of light (photons) with wavelengths from 380 to 740 nanometers. White describes a mixture of these colors, while black describes the absence of these colors. Infrared light, the portion of the electromagnetic spectrum with wavelengths longer than this range, is typically not visible to humans. Ultraviolet light, a portion of the electromagnetic spectrum with wavelengths shorter than this range, are also not typically visible to humans, e.g., invisible to the naked eye. The human eye senses color from a mixture of light (photons) of various wavelengths and intensities. For instance, orange light (600 nm wavelength photons) may be seen as orange, or a mixture of red light (700 nm wavelength photons) and yellow light (570 nm wavelength photons) may be seen as orange. Red light of high intensity mixed with yellow light of low intensity may be seen as red, orange, or vermillion based on the relative intensities. An absence of light may be seen as black, while a combination of infrared and ultraviolet light may be also be seen as black since the received light (photons) in the visible range are of low intensity. Barcode readers may be able to sense light of various wavelength and intensity differently than do human eyes. For instance, a barcode reader may be optimized to detect contrast in the infrared light pattern reflected from a thermal transfer printed barcode label while a human would see the contrasting pattern of black bars on a white background because of different intensities in the visible spectrum. In an embodiment, a barcode reader may be optimized to activate and detect a barcode symbol printed on packaging with ink that luminesces in the ultraviolet spectrum while a human would not see the contrasting pattern at all.

Labels may be printed on a substrate that has fluorescing properties. For example, the security indicators disclosed herein may be printed on a paper substrate that has fluorescing properties such that there is a high contrast between the darker and lighter barcode elements or modules 120. It should be appreciated that the fluorescing properties of the substrate, such as a paper with fluorescing properties to provide excellent contrast and print quality, are separate from the luminescent properties (or more particularly, phosphorescent properties of fluorescent properties) exhibited by the security material described herein.

Figure 2B:
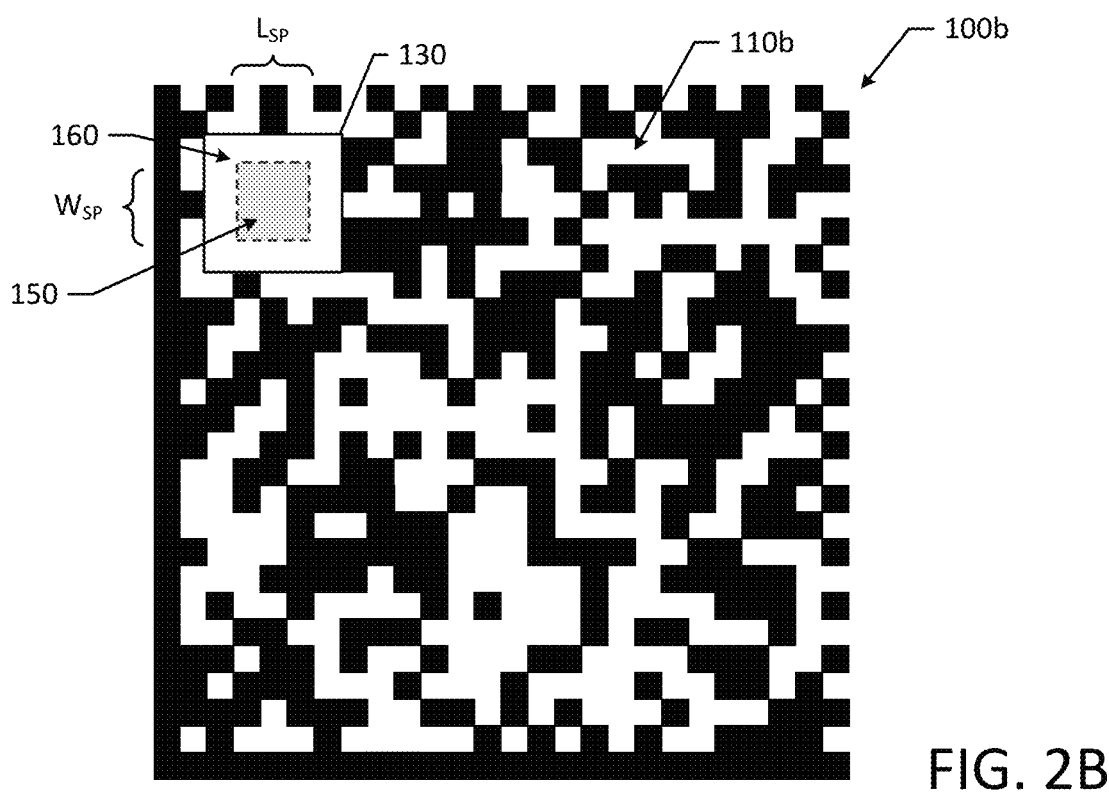
FIG. 2B is a representation of a secure indicator (e.g., a 26×26 Data Matrix) according to an example embodiment of the present disclosure.

As discussed above, the security material may be implemented as part of a secure indicator. The secure indicator may be a one-dimensional indicator (e.g., 1D barcode as illustrated in FIGS. 1A and 1B) or a two-dimensional indicator (e.g., 2D barcode as illustrated in FIGS. 2A and 2B). FIGS. 1A and 1B illustrate a representation of a secure indicator 100*a*, which includes a one-dimensional barcode symbol 110 with security portion 150. As illustrated in FIG. 1A, the security portions 150*a* and 150*b*, hereinafter referred to generally as security portion 150 includes a security material in a portion of the bars, modules or elements 120*a* and 120*b* of the barcode symbol 110. FIG. 1B illustrates another example where the security portions 150*a* and 150*b* fill an entire bar, module or element 120. In another example, the entire barcode symbol 110*a* may be made of the security material. For example, all of the encoded data in the barcode may be provided by security material. Specifically, each of the bars, modules or elements may be printed in the security material. As illustrated in FIGS. 1A and 1B, the barcode symbol 110 may include quiet zones 165*a* and 165*b*, which are included in the length of the barcode ($L_B$) 175. The barcode symbol 110 may also have a height ($H_B$) 185, which may be the height of the tallest bar, module or element. The length ($L_B$) 175 and height ($H_B$) 185 may define a barcode area.

The barcode may optionally include one or more reference region(s) 155, such as a calibration patch having a known property or characteristic. The reference regions(s) 155 may be a color reference patch of a known optical property to be used in auto-reference of the barcode scanner at a reading color of interest. The reference region(s) 155 (e.g., color calibration patches) may be positioned adjacent or proximate to the barcode 110 and security portion(s) 150. The reference region(s) 155 may be adapted to be read or scanned along with the barcode symbol 110, but prior to reading or scanning the security portion(s) 150. In another example, the reference region(s) 155 may be adapted to be read or scanned after reading the barcode symbol 110. For example, the barcode symbol 110 may provide guidance and information regarding the size, location, position, properties, characteristics, etc. of the reference region(s) 155. Additionally, the barcode symbol 110 may provide guidance and information regarding the reading or scanning of the security portion(s) 150. Optical properties of the reference region(s) 155 may be compared to the optical properties of the security portion(s). In some implementations, the bar code symbol 110 itself may be used for calibration, for reference, or for location. For example, optical properties of the barcode 110 may be compared as a reference to values of the security portion(s) 150. Alternatively, the security portion(s) 150 may be in a known location, e.g., at a particular position with respect to the barcode, or with respect to location elements in the barcode, such as guard bars or a quiet zone (e.g., quiet zones 165*a* and 165*b*) of a UPC-A barcode or the position detection patterns, alignment patterns, and/or quiet zone of a QR code. It should be appreciated that the quiet zones 165*a* and 165*b* may include security material that emits in a wavelength other than the barcode symbol 110. For example, the quiet spaces or quiet zone (e.g., quiet zones 165*a* and 165*b*) may appear to be free of contrasting marks because those marks (e.g., security material) emit in a wavelength other than the barcode symbol 110. The security material may initially appear invisible until activated.

As discussed above, the security material may be incorporated on a data carrying labels or tag, such as a barcode. It should be appreciated that the illustrative barcode examples disclosed herein may extend to other data carrying labels or tags. For example, the security material may be applied to other text or graphics in a similar fashion. The systems and methods disclosed herein may apply to computer readable indicia, and more specifically the computer readable indicia that encode a data codeword(s). In an example, the computer readable indicia is a barcode symbol 110.

FIGS. 2A and 2B illustrate another representation of a secure indicator 100*b*, which includes a two-dimensional error-correcting barcode symbol 110*b*, which may be referred to herein generally as a 2D barcode 110*b*, (e.g., a 26×26 Data Matrix) with a security portion 150, according to an example embodiment of the present disclosure. The secure indicator 100*b* includes a barcode 110*b* or barcode region 110 that includes a plurality of modules or elements 120*a-n* in a permanent or static color state (e.g., black elements). As illustrated in FIG. 2A, the barcode region 110 has a length (LBR) and a width (WBR). The secure indicator 100*b* may also include an empty region(s) 130, which is void of elements or modules in a permanent or static color state (e.g., black elements) which advantageously further separates the security portion 150 from the static portion to prevent degradation of any security material within the security portion 150. The empty region 130 has a length (LER) and a width (WER). In an example, the security portion 150 may entirely occupy the empty region 130 (as illustrated in FIG. 2A) or partially occupy the empty region 130 (as illustrated in FIG. 2B). The security portion 150 has a length (Lsp) and a width (Wsp).

The empty region 130 is void of modules or elements 120 in the permanent or static color state. For example, the barcode region 110 is provided with an empty space, such as a gap or cutout that forms the empty region 130. The empty region 130 is empty with respect to the static barcode symbol, but includes a security portion 150 that includes a security material. In another example, the empty region 130 may alternatively or additionally include a reference region(s) 155. The barcode region 110 may be printed first while forming a gap or area void of modules or elements 120 to create the empty region 130. Then, a security portion 150 or a reference region 155 may be provided within the empty region 130 such that the secure indicator includes the barcode region 110 with a plurality of modules or elements 120*a-n* in a permanent or static color state and a secure portion 150 with a security ink or a reference region 155 printed with a reference material (e.g., a reference ink, toner, dye, paint, wax, etc.). In another example, the barcode region 110, the security portion 150 and/or the reference region 155 may be printed at the same time such that during the printing process an empty region 130 is not created and then filled with a security material, but instead the barcode region 110, security portion 150 and/or reference region 155 are printed together. In this scenario, the empty region 130 identifies the portion of the 2D barcode that is void of modules or elements 120 printed in a static material, such as a static ink.

Figure 3A:
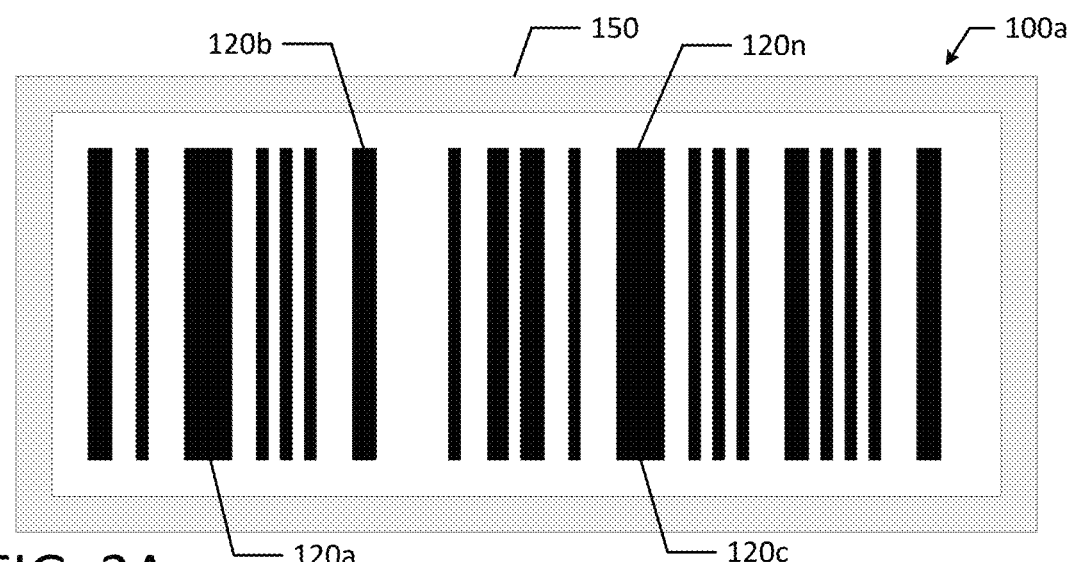
FIG. 3A is a representation of a secure indicator surrounded by a security portion according to an example embodiment of the present disclosure.
Figure 3B:
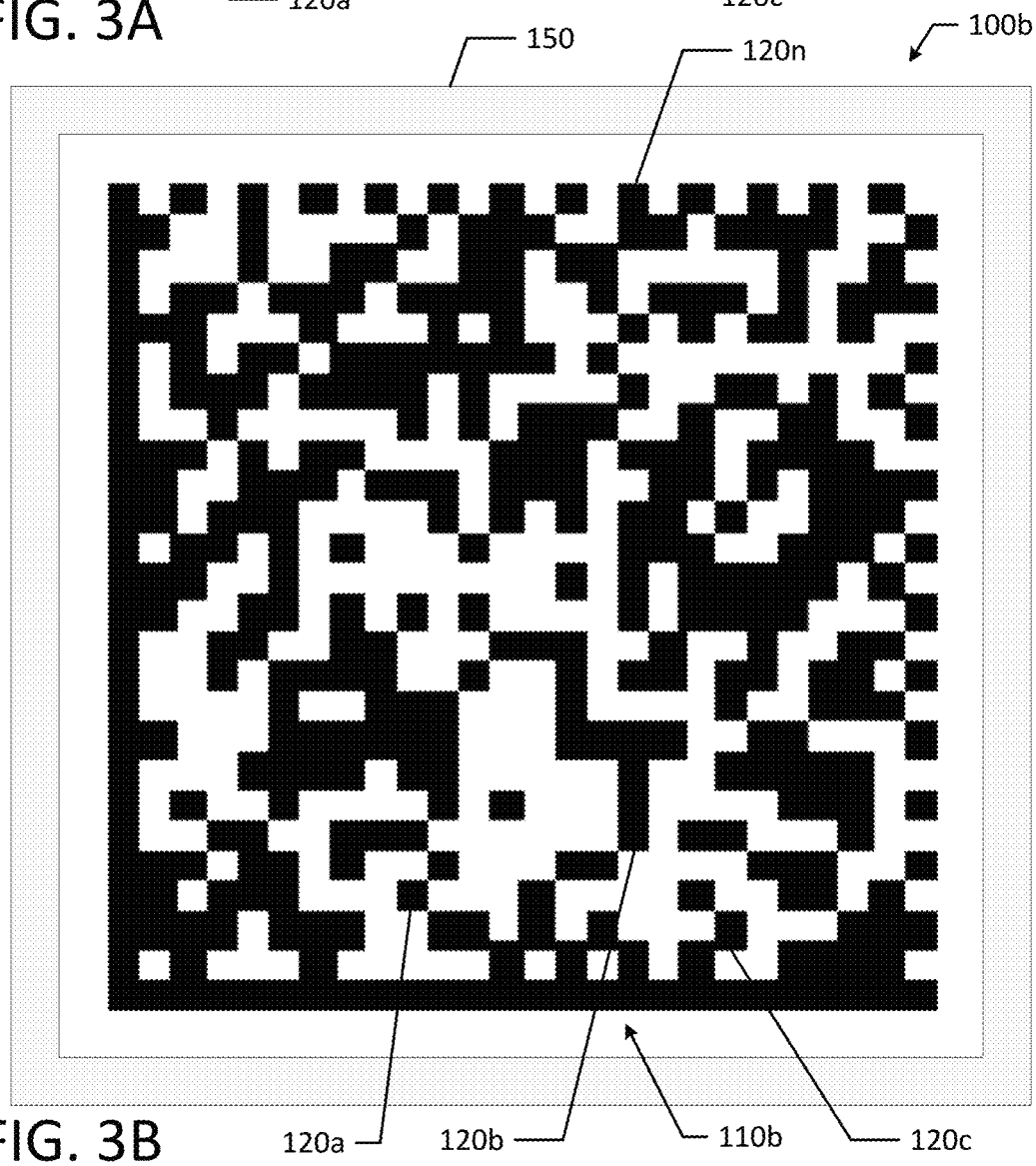
FIG. 3B is a representation of a secure indicator (e.g., a 26×26 Data Matrix) surrounded by a security portion according to an example embodiment of the present disclosure.

In another example, the security portion 150 and/or the reference region 155 of a secure indicator 100 may be positioned outside of the barcode symbol or barcode portion 110. For example, the secure indicators 100*a* and 100*b* illustrated in FIGS. 3A and 3B, hereinafter generally referred to as secure indicator 100 may include a substrate with the barcode 110 and security material provided on the substrate near the barcode 110. As illustrated in FIGS. 3A and 3B, the security material (applied to security portion 150) is provided outside and spaced from the barcode 110. By providing the security material (applied to security portion 150) outside and spaced from the barcode 110, the security material is unaffected by the printing process of the barcode 110. As discussed in more detail below, a reference region(s) 155 may also be provided outside and spaced from the barcode 110, which similarly ensures that the reference region(s) 155 are unaffected by the printing process of the barcode 110. The security material may be applied to various products and/or their packaging, such as food products, pharmaceutical products, biologics, or any other product that may benefit from environmental, physical, or biological monitoring. For example, the barcode 110, the security material of the security portion(s) 150 and/or the reference material of the reference region(s) 155 may be printed on or applied to a container for such a product.

FIG. 3A illustrates a representation of a one-dimensional secure indicator 100a and FIG. 3B illustrates a representation of a two-dimensional secure indicator 100b. In an example, the secure indicator 100b may be a two-dimensional error-correcting indicator. The 2D secure indicator 100b may include a barcode 110 (e.g., a 26×26 Data Matrix) and a security portion 150. Additionally, the secure indicator may include a reference region(s) 155, which are described in more detail below.

It should be appreciated that a 26×26 Data Matrix is provided for illustration purposes only. A 26×26 Data Matrix contains 72 codewords, each formed of eight modules corresponding to the eight bits of the codeword, referred to as a "utah." The 24×24 bitmap matrix shows the layout of all the 72 codewords in a 26×26 Data Matrix. A "utah" is an arrangement of 8 modules to encode one codeword. It may be arranged either as a single connected group with a pattern frequently in the shape of the State of Utah in Data Matrix, or formed as two subgroups of connected modules split across two or more utah patterns. The systems and methods described herein may apply to other Data Matrix sizes and other styles of 1D and 2D barcodes. For example, the Data Matrix may be 10×10, 12×12, 14×14, 40×40, up to 144×144 and may have 8, 12, 18, 162 or 2178 codewords respectively. Additionally, it should be appreciated that the example embodiments disclosed herein may translate to various 2D barcodes including an Aztec Code, Code 1, CrontoSign, CyberCode, DataGlyphs, Data Matrix, Datastrip code, EZcode, High Capacity Color Barcode, InterCode, MaxiCode, MMCC, NexCode, PDF417, QR code, ShotCode, SPARQCode, and the like.

Figure 4A:
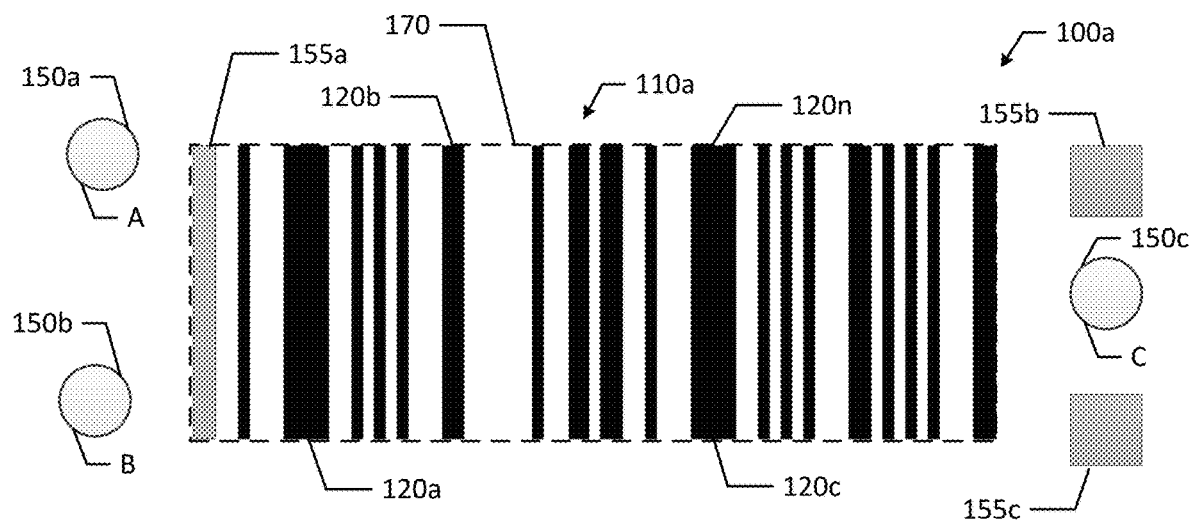
FIG. 4A is a representation of a secure indicator surrounded by a security portion according to an example embodiment of the present disclosure.
Figure 4B:
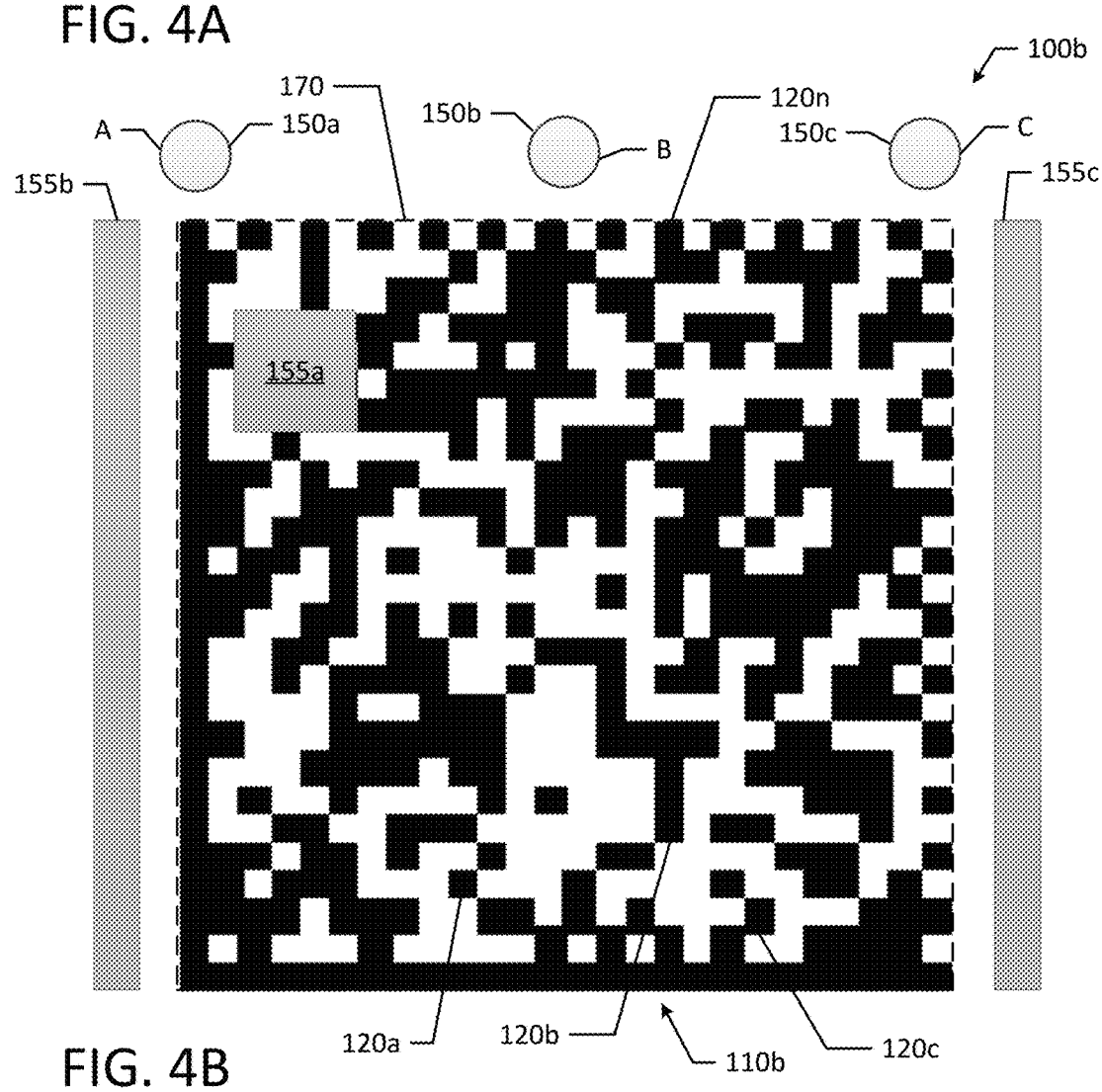
FIG. 4B is a representation of a secure indicator (e.g., a 26×26 Data Matrix) surrounded by a security portion according to an example embodiment of the present disclosure.

The 1D and 2D barcodes 110 include a plurality of modules or elements 120a-n in a permanent or static color state (e.g., black elements). As illustrated in FIGS. 3A and 3B, the security portion(s) 150 may occupy a hollow rectangular or square region surrounding the barcode 110. Additionally, the security portion(s) 150 may be positioned in different spaces surrounding the barcode 110, as illustrated in FIGS. 4A and 4B. The security portion 150 may be a continuous region surrounding the barcode 110 (as illustrated in FIGS. 3A and 3B) or may partially occupy the space around the barcode 110 in different regions (as illustrated in FIGS. 4A and 4B). Reference region(s) 155 may be positioned within or about the secure indicators 100 in a similar fashion as the security portion(s) 150.

As illustrated in FIG. 2B, the security portion 150 is provided with a gap or border 160 such that the security portion 150 occupies less area than the empty region 130. The gap or border 160 may provide a buffer between the printing process of the barcode region 110 and printing of the dynamic indicator. In an example of FIG. 2B, the gap 160 is a single module-wide or single element-wide border (e.g., as wide as an element 120) around the security portion 150.

In some examples, the secure indicator 100 may include multiple security portions 150. Each security portion may include a different security material. In another example, a security portion 150 may include multiple security materials. For example, the security portion 150 may include two different security materials that are adjacent to each other in the security portion 150. Each of the security materials may change in response to or exposure to different external radiation or irradiation sources (e.g., different excitation wavelengths) or different environmental conditions. The security material may include various components that are triggered or react at different exposure levels or to different exposure events. For example, the security material may include phosphors that luminesce at different wavelengths or luminesce at different response times after exposure. A portion of the security material may start to luminesce for a first period of time after exposure to a first wavelength of light while another portion of the security material starts to luminesce for a second period of time after exposure to a second wavelength of light. The portions of the security material may also start to luminesce after exposure to the same wavelength of light, but one portion may luminesce for different time periods. Additionally, the barcode region 110 may include multiple empty regions and multiple security portions. For example, the upper left hand portion of the 2D barcode 110 may include a first empty region 130 and first security portion 150 and the bottom right hand portion of the 2D barcode may include a second empty region 130 and second security portion 150. Additionally, one or more of the security portions 150 may be smaller than the empty regions 130 to form a gap or border 160.

As illustrated in FIGS. 2A and 2B, the empty region 130 is provided within the invariant bitmap of the 2D barcode 100 (e.g., Data Matrix) corresponding to the 5×5 (e.g., five-modules by five-modules) area of empty space. There empty region 130 may be produced by modifying the Data Matrix encoding and symbol generation software for the underlying symbol. For example, the Data Matrix's encoded bitmap may be altered to ensure that all bit positions in the empty region 130 are set to '0' or 'empty' prior to conversion to black and empty modules, or alternatively setting all modules to 'empty' in the 5×5 area (e.g., empty region 130) prior to printing the 2D barcode 100. Thus, no modules or elements 120a-n in a permanent or static color state (e.g., black elements) are printed in the empty region 130.

The gap 160 may make the security portion 150 more visually distinguishable to a user. For example, when the security material is activated, the security portion 150 has adequate contrast compared to the empty or colorless gap 160. In another example, the gap or border 160 may be a solid color (e.g., black) similar to the color of the static material (e.g., static ink) to provide additional contrast between the security portion 150 (e.g., activated security material) and the barcode region 110. Additionally, a black border may be used around the gap 160 and the barcode region 110 and/or the security region 150 to provide contrast between each region (e.g., black, empty space or white, black, and security material color).

The empty region 130 of the barcode 100 may be aligned with the security portion 150 before printing to ensure that the security portion 150 and the corresponding security material is properly positioned within the empty region 130 of the barcode 100 (e.g., positioned within the invariant area). For example, the security portion 150 may be positioned within the invariant area of the 2D barcode 100 such that the upper left corner ("ULC") of the Data Matrix is aligned with the ULC of the security portion 150. It should be appreciated that the security portion 150 can be positioned in other regions or positions within the 2D barcode 100. Additionally, the security portion 150 may be positioned outside but near the 2D barcode 100 such that it is still associated with the barcode during scanning.

Reference or Calibration Region

As discussed above, the barcode 110 may optionally include one or more reference region(s) 155, such as color reference patches of a known optical property (e.g., reflectivity) to be used in auto-reference of the barcode scanner. The one or more reference region(s) 155 may be provided as a reference or calibration for the barcode scanner when reading the security portion(s) 150. The reference region(s) 155 (e.g., color calibration patches) may be positioned adjacent or proximate to the barcode 110. In an example, the reference region(s) 155 may be positioned adjacent the security portion(s) 150. In the examples illustrated in FIGS. 1A and 1B, the reference region(s) 155 is positioned adjacent the barcode 110. In another example, the reference region 155 may be positioned within the barcode 110.

Similar to the position of the security portion(s) 150 in FIGS. 2A and 2B, a reference region 155 may be positioned within the barcode 110. For example, a reference region 155 may be positioned within an invariant area and may be surrounded by a gap 160. Additionally, similar to the position of the security portion(s) 150 in FIGS. 3A and 3B, a reference region 155 may be provided outside and spaced from the barcode 110. For example, the reference region(s) 155 may occupy a hollow rectangular or square region surrounding the barcode 110. The reference region(s) 155 may be positioned outside of the security region(s) 150 or inside of the security region(s) 150. Additionally, the reference region(s) 155 may be positioned in different spaces surrounding the barcode 110, as illustrated in FIGS. 4A and 4B. The reference region(s) 155 (e.g., reference regions 155a, 155b and 155c) may occupy space around the barcode 110 in different regions. The reference region(s) 155 may be a continuous region surrounding the barcode 110 or may partially occupy the space around the barcode 110 in different regions (as illustrated in FIGS. 4A-4C).

Figure 4C:
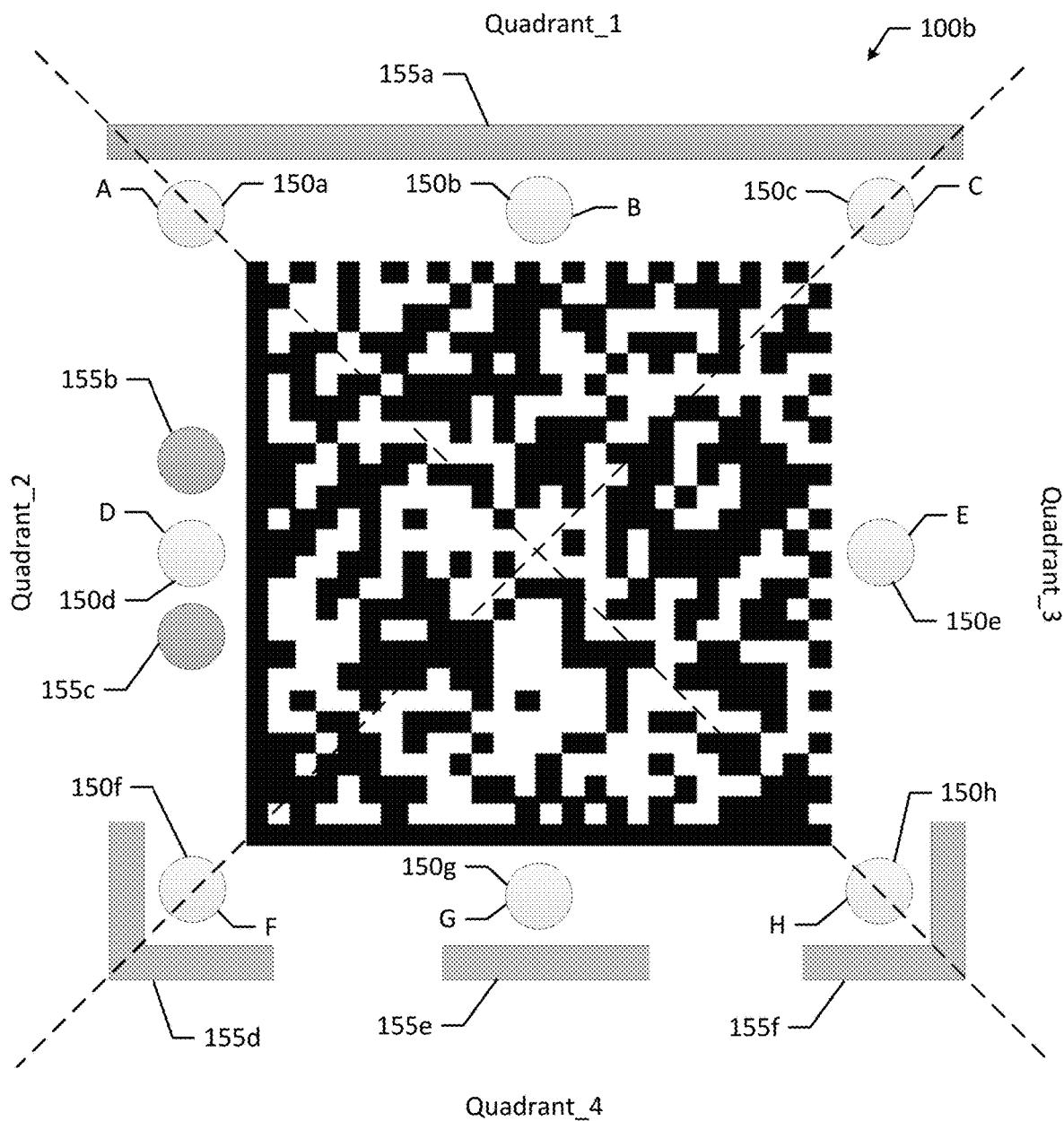
FIG. 4C is a representation of a secure indicator (e.g., a 26×26 Data Matrix) surrounded by a security portion according to an example embodiment of the present disclosure.

FIG. 4C illustrates that the space surrounding the barcode 110 on the substrate has four quadrants (e.g., quadrant_1, quadrant_2, quadrant_3 and quadrant_4). Each quadrant may be associated with an edge or side boundary of the barcode 110. In the example illustrated in FIG. 4C, quadrant_1 is associated with the top edge of the barcode 110, quadrant_2 is associated with the left edge of the barcode 110, quadrant_3 is associated with the right edge of the barcode 110 and quadrant_4 is associated with the bottom edge of the barcode 110. One or more security portions(s) 150 and reference region(s) 155 may be positioned within each respective quadrant. In an example, the security portion(s) 150 and reference region(s) 155 are positioned as close to the barcode 110 as possible while remaining outside of the dark elements of the barcode 110 to improve detection and readability. In an example, each of the security portion(s) 150 and/or reference regions(s) 155 may be spaced apart from the barcode 110 by a gap or width of approximately one barcode module or element 120. Additionally, the security portion(s) 150 and/or reference regions(s) 155 may be spaced from each other by a gap or width of approximately one barcode module or element 120. In another example, the spacing between the barcode 110, the security portion(s) 150 and/or reference region(s) 155 may be half the width of a barcode module or element 120. For example, referring to FIG. 3B, the security portion 150 may be a rectangular section that is spaced from the barcode 110 by a spacing with a width of a barcode module or element 120, and the rectangular security portion 150 may have the width of one or more barcode modules or elements 120. Additionally, a reference region 155 may be spaced from the security portion 150 by another spacing with a width of a barcode module or element 120. Similar to the security portion 150, the reference region 155 may be a rectangular section with a width of one or more barcode modules or elements 120.

A reader may first locate the barcode 110 and then move outward from the edges until the reader locates the security portion(s) 150 and/or reference region(s) 155. By positioning the security portion(s) 150 and reference region(s) 155 adjacent the edges of the barcode 110 or nearly adjacent the edges of the barcode 110 (e.g., with a spacing or separation of one module or element), then the reader may advantageously perform faster reading and decoding operations due to a smaller image capture window.

The reference region 155 may surround each of the security portion(s) 150a-h in a rectangular or square shape similar to that of the shape of the security portion 150 illustrated in FIGS. 3A and 3B. In another example, the reference region(s) 155 may form a band adjacent to several dynamic indicators 150 (e.g., reference region 155a in the shape of a band positioned near and adjacent to indicators 150a-c). The reference region(s) 155 may also be shaped similar to and surround associated security portion(s) 150 (e.g., reference regions 155b-c associated with security portion 150d). FIG. 4C illustrates reference regions(s) 155d-f positioned near the bottom of quadrant_2 and quadrant_3 and along the bottom edge of the barcode 110 in quadrant_4 of the indicator 100, which may correspond to security portion(s) 150f-h respectively. The indicator 100 may also include one or more reference regions 155a-f. It should be appreciated that the shape of the reference region(s) 155 may be different than that illustrated in FIG. 4C. For example, the reference region(s) 144 may be square (see FIG. 4A), rectangular (see FIGS. 4A and 4B), or circular, etc. Additionally, there may be one reference region 155 associated with a barcode 110, one reference region 160 per quadrant or multiple reference regions 160 per quadrant. Additionally, the reference region(s) 155 may have a one-to-one relationship with the dynamic indicator(s) 150.

In FIG. 4C, the security portion 150 may have established reading areas (e.g., areas "A", "B", "C", "D", "E", "F", "G" and "H"). For example, when taking a reading of the security portion 150, the reader may take an average or mean value of multiple readings from different portions of the security portion 150. Some of the reading areas or read points may include one or more of, or a combination of reading areas (e.g., areas "A", "B", "C", "D", "E", "F", "G" and "H"). As described in more detail below, the indicator reader may select which reading points to measure (and perhaps average, compare, weigh, etc.) based on the orientation of the indicator 100. For example, the reader may measure and average optical property values (e.g., color values) of the three reading areas that are closest to the reader.

Indicators 100 may include a security portion 150 positioned within the barcode 110 (see FIGS. 1A, 1B, 2A, 2B) or positioned outside of the barcode 110 (see FIGS. 3A, 3B, 4A, 4B and 4C). Similarly, the indicators 100 may include a reference region(s) 155 positioned within the barcode 110 (see FIG. 4B) or outside of the barcode 110 (see FIGS. 4A, 4B and 4C). It should be appreciated that the location of the security portion(s) 150 and the reference region(s) 155 may be interchangeable such that any description of the size or location of the security portion(s) 150 may similarly correspond to the reference region(s) 155 and vice versa. Specifically, each of the examples in FIGS. 1A to 4C may have the orientation of the security portion(s) 150 and reference region(s) 155 flipped.

Referring back to FIGS. 4A and 4B, the security material may be provided proximate to the barcode symbol 110, such that the security material is within the barcode or in an area outside of the barcode, but near the barcode. For example, the security material may be mixed with, positioned under, or positioned over static materials defining the barcode modules or elements 120. In another example, the security material may be adjacent to a barcode module or element 120, a start or stop marker, a start or stop markers or locator patterns, such as the solid L-shaped "Finder Pattern" and the two other borders of alternating dark and light modules that make up the "Timing Pattern" in FIG. 4B, a reference region(s) 155, or any other dynamic indicator (e.g., environmental indicator) associated with the barcode. For example, for a 1D barcode, such as a Code 128 barcode, may include a quiet zone, followed by a start character, a string of data, a check character (e.g., a Modula or Mod 103 check digit, a stop character, and another quiet zone. The security material may be provided proximate to or within one of quiet zones. Similarly, a UPC barcode, such as a UPC-A barcode may include a quiet zone that is free of all printing, followed by a guard bar(s), a string of data, another guard bar(s), and another quiet zone. At the bottom of a UPC-A code, the character string may start with a number system character, followed by a manufacturer code, a product code, and ending with the check digit.

The proximity of the security material to the barcode symbol 110 may be up to a few bars, modules or elements 120 from an outside edge 170 of the barcode symbol. The outside edge 170 may be the boundary of the encoded features such as the bars 120 in FIG. 4A or the modules 120 in FIG. 4B. Additionally, referring back to FIGS. 1A and 1B, the outside edge 170 may refer to an outside edge of the barcode area defined by the length ($L_B$) 175 of the barcode symbol 110 and the height ($H_B$) 185 of the barcode symbol 110. As noted above, the barcode area may include the quiet zones (e.g., quiet zones 165a and 165b of FIG. 1B). For example, the outside edge 170 of a POSTNET code may be the boundary created from the overall height of the full-height bars between the left-most edge of the first bar to the right-most edge of the last bar. In another example, the outside edge 170 may be the boundary of the encoded features including any other start or stop markers or locator patterns, such as the solid L-shaped "Finder Pattern" and the two other borders of alternating dark and light modules or elements that make up the "Timing Pattern" in FIG. 4B. In yet another example, the outside edge 170 may be the boundary of the encoded features including all of or a portion of the quiet zone (e.g., quiet zones 165a and 165b of FIG. 1B).

Barcode Elements/Modules

In the barcode region 110, a one-dimensional barcode symbol may be employed (See FIGS. 1A, 1B, 3A and 4A). Additionally, a two-dimensional error-correcting barcode symbol may be provided in the barcode region 110. Barcode modules, bars or elements 120 may be used to encode barcode data. For example, each module or element (e.g., modules 120a-n) of the Data Matrix symbol may be used to encode one bit of data.

The barcode region may be provided in a permanent or static color state, and the modules or elements 120 may optionally be square, rectangular, or circular. Each module or element in the barcode region 110 is colored either nominally colored (e.g., black) or nominally empty or reflective (e.g., white). Nominally colored modules or elements may be black when printed on a light substrate or may be a lighter color when printed on a dark substrate. The nominally empty or reflective modules may not require any printing and may instead allow the substrate to show through. It will be appreciated that the example approaches disclosed herein may be extended to multi-color barcodes. The modules or elements 120 may form a module matrix, which is the visual manifestation of the binary bitmap matrix contained with the area of the symbol bounded by the Finder Pattern. The Finder Pattern may be an 'L' formed by connected solid lines along two edges of the symbol module matrix, with a Clock Track formed by an alternating pattern of white and black modules or elements along the opposite edges of the symbol (See FIGS. 2A, 2B, 3B, 4B and 4C). It will be appreciated that in other bar code symbologies, other finder patterns may be employed.

Printer and Printing

The example secure indicators 100 described herein advantageously reduce waste of both security material and permanent or static materials, improve color accuracy, reduce the quantity of error correction codewords needed for barcode correction, eliminate the need for error correction codewords to correct a security region within a 2D barcode, and allow for a variety of printing technologies and security materials to be used for the secure indicators 100.

First, as compared with overprinting techniques, example secure indicators 100 described herein advantageously reduce waste of both security material and permanent or static materials (e.g., static inks). In some examples, the security material may be the most costly component in the secure indicator. Typically, portions of the security material may be damaged or made unusable by static material (e.g., static ink) that is either printed under or printed over the active material. For example, the secure indicator 100 may include a substrate with a layer provided with a barcode or barcode region 110. The layer may be an overlayer that is printed on the substrate or an underlayer that is injected within or formed within the substrate. Similarly, the security portion 150 or the security material and/or the reference region 155 or reference material may also be provided as an overlayer that is printed on the substrate or an underlayer that is injected within or formed within the substrate. The barcode 110, the security portion 150 and the reference region 155 may be printed in any order, so that any of the security material, the reference material or the static material of the barcode 110 may be the first layer printed on the substrate, the other(s) being printed after the first layer, but neither overlapping the other.

For example, the static material of the barcode 110, the security material of the security portion(s) 150, and the reference material of the reference region(s) 155 may be printed in any order, so that the security material of the security portion 150, the reference material of the reference region 155 or the static material of the barcode 110 may be the first layer printed on the substrate, the other(s) being printed after the first layer, but none of the overlapping the other. Printing is used as one illustrative example of an application process, it should be appreciated that other processes for applying the barcode 110, reference material and security material of the security portion 150 to the substrate may be used, such as laser etching, dying, etc. As mentioned above, the barcode 110 may be printed first followed by one or more printing steps to print the security material(s) and reference material(s). In another example, the barcode 110, the reference material(s) and the security material(s) may be printed at the same time.

In the scenario where the static barcode modules or elements 120 overlap a security portion 150 positioned within the barcode, typically, 50 percent of the security ink modules or elements may be altered or made unusable by the static ink (e.g., approximately 50 percent of the security material is underprinted or overprinted with static material). For example, with the approach described in the present disclosure, instead of overprinting the black and white static barcode on a 5 module by 5 module patch of security material within the barcode 110, with approximately 12 to 13 modules being unusable, a smaller security portion 150 (e.g., a security portion 150 with less area than a 5 by 5 module patch of security material) may be printed outside of the barcode 110 that requires less security material while maintaining the same accuracy as previous implementations. Applying security material to smaller regions outside of the barcode may advantageously reduce consumption or waste of security material for secure indicators 100. For example, by selectively printing security material in regions outside, but associated with the barcode 110, smaller printing operations may be achieved without wasting ink, toner, dye, paint or wax while still ensuring the barcode provides sufficient accuracy for the secure indicator. It should be appreciated, that the same advantages apply to the application of reference material(s).

As discussed above, the secure indicator 100 may be printed in such a way that the security portion 150 is spaced apart from other barcode modules or elements 120. For example, as illustrated in FIG. 2B, the security portion 150 may occupy less than the 5×5 empty region 130. Here, the security portion 150 is shown with a gap 160 between the security portion 150 and the barcode region 110. The gap 160 may prevent damage to the security material or active material when the barcode region 110 is printed. For example, during thermal or thermal transfer printing, heat from a thermal print head may degrade neighboring modules or elements of dynamic indicator. Printing the permanent or static color state modules or elements 120a-n in a static or permanent material (e.g., permanent ink) near the security material may affect the security material chemistry (e.g., printing process may involve the application of light or heat that may affect the security material). In an example, a reference region(s) 155 may occupy similar positions as the security portion(s) 150 illustrated in FIGS. 2A and 2B.

Additionally, security portion(s) 150 printed outside of the barcode 110 are unaffected by a subsequent printing process. For example, in previous techniques that overprinted part of a security portion 150 (e.g., positioned within the barcode 110) with static material, those overprinted modules or elements are unusable for optical property (e.g., color/reflectance) analysis. With the security portion(s) 150 provided outside of the barcode 110, the entirety of the security portion 150 may be used when reading the secure indicator 100 thereby providing more readable modules or elements for optical property (e.g., color/reflectance) analysis in the same sized area. The additional security portion 150 area may also advantageously provide more accuracy for the reader.

Furthermore, providing the security portion(s) 150 outside of the barcode 110 allows different technologies to be used for printing either the underlying barcode (e.g., Data Matrix) or the security portion(s) 150. For example, preventing either the static material or the security material from contacting one another, being upon each other, or being overprinted allows different kinds of security material chemistries to be used on a previously printed barcode 110 without that security material chemistry being known at the time the barcode 110 was printed. The security portion(s) 150 and corresponding security material can be applied around preprinted barcodes 110, e.g., on a web of labels having such preprinted codes. Providing the security portion(s) 150 outside of the barcode 110 may be especially advantageous when the barcode 110 is laser etched. With laser etching, a colored material (e.g., black ink) is etched away (e.g., burned off), which is problematic when overprinting or underprinting because the security portion(s) 150 and corresponding security material may also be removed during the process when creating white modules or elements. The ability to use different kinds of security material chemistries and different printing or application techniques provides additional manufacturing flexibility and costs savings. The reference region(s) 155 may be similarly positioned to provide the same advantages and abilities to use different kinds of reference materials and different printing or application techniques.

In an example, the barcode 110 may be aligned with the security portion(s) 150 and/or reference region(s) 155 before printing to ensure that the security portion(s) 150 and/or reference region(s) 155 are properly positioned around the barcode 110. The security portions(s) 150 and/or reference region(s) 155 may be positioned near the barcode 110 such that the security portion 150 and/or reference region 155 is still associated with the barcode 110 during scanning. Additionally, the security portion 150 and/or reference region 155 may be positioned in other regions or positions within the barcode 110 (e.g., in the invariant area illustrated in FIGS. 2A and 2B).

Error Correction

It should be appreciated that by using error correction, a secure indicator 100 may include a 2D barcode with a security portion 150 positioned within the 2D barcode. For example, the security portion(s) 150 may be positioned within the invariant area of the barcode 110, without affecting the readability of the barcode 110. Through the use of error correction, such as ISO 16022 Reed-Solomon Error Correction process, which corrects any erroneously identified modules or elements, included in the modules or elements in the security portion(s) 150 (e.g., in the invariant area), the underlying Data Matrix is recovered. Thus, data from the underlying Data Matrix is advantageously processed in the standard manner without being corrupted by the changing state of the security portion(s) 150. Therefore, static product data can be read from the barcode region of the secure indicator while dynamic product data, such as information regarding the security portion(s) 150, embedded within the barcode 110 changes due to exposure from an external radiation or irradiation source (e.g., light source) or other environmental exposure.

Positioning the security portion(s) 150 and/or reference regions(s) 155 outside of the barcode 110 eliminates error correction for intentionally damaged barcode regions. For example, when printing a secure indicator 100 with a security portion 150 within the barcode 110, modules or elements may be intentionally overwritten or damaged by the security material (e.g., these intentionally damaged modules require error correction codewords to correct the non-existent static modules that have been replaced with the dynamic indicator). For example, overprinting or underprinting with security material in a five-module by five-module patch may require error correction from five "utahs" where each utah contains 8 modules or elements, each of which forms one bit of either a data or error correction codeword. In contrast, barcodes 110 with similar accuracy may be printed with a security portion 150 outside of the barcode 110 such that no error correction for the security portion is required. As mentioned above, applying security material to security portion(s) 150 outside of the barcode, without overprinting or underprinting on portions of the active material, advantageously reduces consumption or waste of security material for barcodes 110 while ensuring the barcode 110 provides sufficient area and accuracy for the indicator while also leaving additional unused error correction codewords for use elsewhere in recovering the barcode data.

Security Material and Security Indicia

Security material, such as luminescent material (or more particularly, phosphorescent material) may form a security indicia such as a luminescent indicia (or more particularly, a phosphorescent indicia) and may be positioned in a security portion 150 of a secure indicator 100. As used herein, the luminescent indicia may be provided as a luminescent material or compound (such as a phosphorescent compound), ink, toner, dye, paint or wax with phosphorescent pigments, which each may be generally referred to as a "security material". Security materials may include photochromic material, a luminescent material, such as a phosphorescent material or a fluorescent material, a UV-reactive material, an IR-reactive material, an inorganic material, or a combination thereof. The luminescent material or compound may include Strontium Aluminate, CaS, ZnS, and/or $SiO_2$. Additionally, the luminescent material may include activators or dopants, such as Eu, Dy and Cu. For example, Eu and Dy may be used to form a co-doped strontium oxide aluminate. The luminescent or phosphor materials may be organic phosphors or inorganic phosphors that include the activators or dopants. A photochromic material may contain a colored pigment that appears colorless under normal lighting conditions. However, upon exposure to UV light, the colored pigment may appear brightly colored (e.g., brightly colored red). After the UV light source is removed or the photochromic material is removed from the UV exposure, the colored pigment continues to appear brightly colored for a short time (e.g., a minute or less) before returning to its colorless state. In an example, a photochromic material may change color when exposed to radiation having a specific wavelength or range of wavelengths, the material may effectively be colorless indoors and then may turn into a vibrant color when exposed to radiation at an associated activation wavelength. When exposure at the activation wavelength ceases, the photochromic material may return to its colorless state. A luminescent material may be activated using a camera flash, such as a smartphone camera flash. Additionally, material containing an inorganic pigment may be configured to reflect a camera flash back to the image sensor during image capture, but otherwise appear invisible without a flash.

The corresponding security portion(s) 150 of the secure indicator 100 may comprise a security material that has a chemistry that is predictably responsive to a specified environmental condition, undergoing a chemical or physical state change between an initial state and an end state. The chemical or physical state change may be a continuous state change, causing a continuous change in an optical property (e.g., a color state) of the security portion 150 and corresponding security material or a binary optical property state change once the measured environmental parameter crosses a predefined threshold.

The security material may have a specific activation or excitation wavelength or wavelength range. For example, the security material may have a chemistry that is configured, responsive to irradiation (e.g., illumination) by ultraviolet light of an excitation wavelength(s) of the luminescent compound, to undergo a chemical or physical state change between an initial state and an end state, causing a change in a characteristic or property (e.g., the color state) of the security material. The characteristic or property changes of the material may be a state or value related to color, average color, luminescence or average luminescence (e.g., phosphorescence, average phosphorescence, fluorescence, and average fluorescence), emission value, average emission value, absorption value, or average absorption value. A luminescence value may be an intensity value, an emission wavelength ($\lambda$) value, a decay value, an absorption value or a value associated with the spectral signature of the luminescence. The luminescence (e.g., phosphorescence) decay value may be from non-radiative decay through vibrational relaxation or from radiative decay where energy is emitted as electromagnetic radiation or photons. For example, different phosphors lead to different color and spectral emissions. The change in state of the security material may occur for an interval or finite duration after excitation by a radiation or irradiation source ceases. After activation, the security material may be read at a first wavelength while the static material is read at a second wavelength. In another example, both the security material and the static material may be read at the same wavelength. The security material may be activated by exposing the material to an external radiation or irradiation source (e.g., camera flash) for a brief activation time.

The security material may be excited or activated by UV light (e.g., a 254 nm wavelength light or a 365 nm wavelength light) and may emit light having a wavelength of approximately 200 nm to 450 nm, which may alternatively be stated as the security material having an absorption frequency of 254 nm or 365 nm and an emission frequency between 200 nm to 450 nm. For example, Luminova (Strontium Oxide Aluminate) may be excited or activated by light within the range of 200 nm to 450 nm and may have emissions at 520 nm (green) or 490 nm (blue), or alternatively stated as having an absorption frequency between 200 nm and 450 nm and an emission frequency of 520 nm or 490 nm. Additionally, a conventional phosphorescent pigment, such as ZnS may be excited or activated by light within the range of 200 nm to 450 nm and may have emissions at 530 nm (green). The security material may also be excited or activated by light above 700 nm. For example, IR1 ink from MaxMax has an excitation or absorption frequency of 790 nm and an emission frequency of 840 nm. Additionally IR2 ink from MaxMax has an excitation or absorption frequency of 824 nm and an emission frequency of 885 nm. It should be appreciated that the security material may have an excitation or absorption frequency in the UV, visible or IR frequency range. Additionally, the security material may have an emission frequency in the UV, visible or IR frequency range.

In an example, the secure indicator 100 may be associated with other dynamic indicators(s). For example, the secure indicator 100 may include one or more other dynamic indicators where each dynamic indicator may include one or more dynamic materials (e.g., dynamic inks, toners, dyes, paints or waxes). Alternatively, different dynamic indicators may be designated for different dynamic materials (e.g., dynamic indicators may contain a first dynamic material and a second dynamic material). Each of the dynamic materials may change in response to or exposure to different environmental conditions. For example, an indicator may be used on a product that can spoil based on levels of temperature or UV exposure. The indicator may include a dynamic indicator(s) with two different dynamic materials adjacent to one other (e.g., one dynamic material may monitor UV exposure while another dynamic material may monitor temperature exposure).

In an example embodiment, the dynamic material or dynamic indicator(s) may be sensitive to an environmental factor such as temperature, time, time and temperature, freezing, radiation, toxic chemicals, or a combination of such factors, or the like. In an example embodiment, the material may be a thermochromic material, such as a water-based irreversible thermochromic material designed to change permanently from white to black at 40° C. Additionally, the thermochromic material may be reversible. For example, the reversible thermochromic material may be a liquid crystal material or a leuco dye material (examples include QCR Solutions Reversible Thermochromic Inks and H.W. Sands Corporation inks). The material may also be a photochromic material (e.g., changes based on exposure to UV light). The material may be an ink, toner, dye, paint or wax sensitive to time and temperature (an example includes the OnVu indicator).

The dynamic material may change from a darker color to a lighter color, a lighter color to a darker color, may change levels of transparency or opacity, and/or may change levels of reflectivity or absorptivity, or may change any other suitable characteristic allowing the barcode to be readable in one or more states by a reader. Additionally, the dynamic material may continuously change between a range of an initial color state to an end color state. For example, a dynamic material may change from a lighter color to a dark blue, which may be alternatively transformed by a reader to values on continuous "greyscale". The greyscale (which is not necessary truly grey but is a continuous tone of some hue) is determined reducing the R, G and B values of each pixel to a single greyscale value by a formula of form:

Greyscale value=$(aR+bG+cB)/K$

Where $\{a, b, c\}$ represent the relative contribution of each sRGB color in the pixel, and K is scaling factor. Additionally, a dynamic material or dynamic indicator may continuously change from a white or clear color to a dark red or blue (e.g., changing from white, to a faint red, become less and less opaque until it reaches a solid red color at the end color state). Moreover, any suitable combination of colors may be used for the states of one or more dynamic materials.

Indicators

As mentioned above, the secure indicator 100 may be associated with other dynamic indicators(s). For example, the secure indicator 100 may include one or more other dynamic indicators where each dynamic indicator may include one or more dynamic materials. The dynamic indicator may be adapted to change state, e.g., optical property such as color responsive to an external event or condition. For example, the dynamic indicator may be an environmental indicator or sensor, a medical indicator or sensor, etc. Examples of environmental sensors include temperature monitors, measuring either cumulative heat exposure or passing beyond a set high or low temperature threshold value(s); time, time-temperature product, nuclear radiation exposure monitors; gas or humidity exposure monitors each passing above a cumulative exposure threshold or an instantaneous threshold value. Examples of medical sensors include recording patient thermometers; threshold assays measuring levels to biological toxins such as aflatoxin or botulism toxin; and includes colorimetric immunoassays for sensing of the presence of biological agents such as prions or biological organisms such as infectious bacteria.

Security Material—State Change

The security portion(s) 150 may transition between an initial state and an end state. For example, the security portion(s) 150 may transition to an intermediate state and later transitions to an end state. The security portion(s) 150 and corresponding security material may change state (e.g., a change in an optical property, such as color) from being clear in the initial state, to a plurality of intermediate states where the security portion(s) 150 and corresponding security material changes to a faint color and becomes less and less opaque until it reaches a solid color at the end state. In an example, the security portion(s) 150 may continuously (as contrasted with step-wise) change state in response to environmental conditions.

The state change may be continuous between the initial state and the end state. In another example, the state change may be a step-wise state change with discrete states between the initial state and the end state. Additionally, the state change may be permanent or reversible. For example, the security portion(s) 150 or any other dynamic indicator may permanently change from one state to another state after exposure to an external event or condition. For example, the security portion(s) 150 may include a security material that undergoes a permanent change (e.g., color change) from an initial state to an end state after exposure to UV light. Alternatively, the security portion(s) 150 or any other dynamic indicator may reversibly change from an initial state to another state after exposure to an external event or condition and may revert back to the initial state after exposure to the event or condition is removed. In some examples, the security portion(s) 150 or other dynamic indicators may be reversible up to a threshold level of exposure, and then may exhibit an irreversible state change after exposure to an event or condition that is above the threshold level. For example, the security portion(s) 150 may include a security material that undergoes a permanent change (e.g., color change) from an initial state to an end stat after exposure to UV light for a predetermined time. In one specific example, the security material may permanently change from an initial state to an end state after 1 ms of exposure to UV light at a specified wavelength or wavelength range, however less than 1 ms of exposure may cause the security material to reversibly change back to the initial state.

Methods

In an example, a smartphone and associate rear facing camera (e.g., iPhone 6S Live photo feature) may be used to capture a series of photos automatically at predetermined times or predetermined intervals (e.g., 1.5 seconds before and 1.5 seconds after the shutter button is pressed). For example, the illustrative example of taking photos 1.5 seconds before and after the shutter button is pressed, the resulting 3 second video (e.g., video comprising series of photos starting 1.5 seconds before and 1.5 seconds after the shutter button is pressed) may initially capture the security material in an initial state (e.g., invisible under normal lighting conditions) and then in an intermediate state (e.g., brightly colored immediately after the flash).

A smartphone application may be designed to read and analyze the captured image with the security material in one or more of states, especially when the security material is brightly colored, to determine a property of the captured image based on an instantaneous value or an average value of one or more of the following properties: color, luminescence (e.g., phosphorescence or fluorescence), emission, absorption, intensity, reflectance, color density, and RGB value. In a specific example, a property of the captured image(s) may be based on a decrease or a rate of decrease of the security material's luminescence between second image(s) and the first image(s). Additionally, the property of the captured image may be based in part on a decrease or rate of decrease, which may be a constant or variable rate, of the security material's luminescence after the security material is at a luminescence threshold. The determined property associated with the label may be used to determine authenticity of the host product that the label is attached to. For example, a smart phone and incorporated application may enable the smartphone to see the brightly glowing material (e.g., ink, toner, dye, paint or wax) based on the phone's flash photography. The smartphone's flash may serve as the external radiation or irradiation source (e.g., light source) to excite or activate the security material. In some examples, the flash may be provided by an LED or a dual LED flash. As mentioned above, a luminescent material may glow for seconds after the radiation or irradiation source is removed, and a sequence of photos can be captured using the smartphone and then analyzed by the app, producing an output that allows the user to confirm the secure indicator 100 or label is authentic to protect against counterfeiting.

Specifically, the security material may be present proximate to (e.g., within or near) the barcode 110. The security material may be read using optical or graphical properties of the barcode 110. For example, the barcode may be used as a reference to read the security material. In another example, location elements in the barcode, such as position detection patterns, alignment patterns, etc. may be used to locate the security material. In another example, the security material may be interpreted based on instructions or data obtained from the barcode 110. The security material may be read in the same wavelength as the barcode 110, and in some instances may be located within the barcode modules or elements 120 thereby requiring error correction to extract the barcode data while also obtaining the optical properties of the security material. The security material may also change the values of the barcode 110, such that reading the barcode when the security material is activated creates one output while reading the barcode 110 while the security material is inactive creates a different output. For example, the secure indicator may be read at least twice at different times to analyze the security material (e.g., the decay of the optical properties of the security material after the material has been activated). The output from reading the barcode 110 or the optical properties of the security material may be based on several readings and the decay of the luminescence of the security material. For example, the decay of an optical property (e.g., brightness or intensity) may be monitored or analyzed as the security material transitions from a fully activated state (e.g., brightest coloring) back to a colorless state after exposure to the irradiation source (e.g., UV light) ceases. Specifically, an optical property of the security material may be analyzed and compared to other optical property readings obtained at different times. In some examples, mere detection of luminescence in the appropriate location may establish authenticity of the secure indicator 100 and therefore authenticity of the product the secure indicator 100 is associated with, while other examples may include detecting an appropriate amount or level of luminescence.

Figure 5:
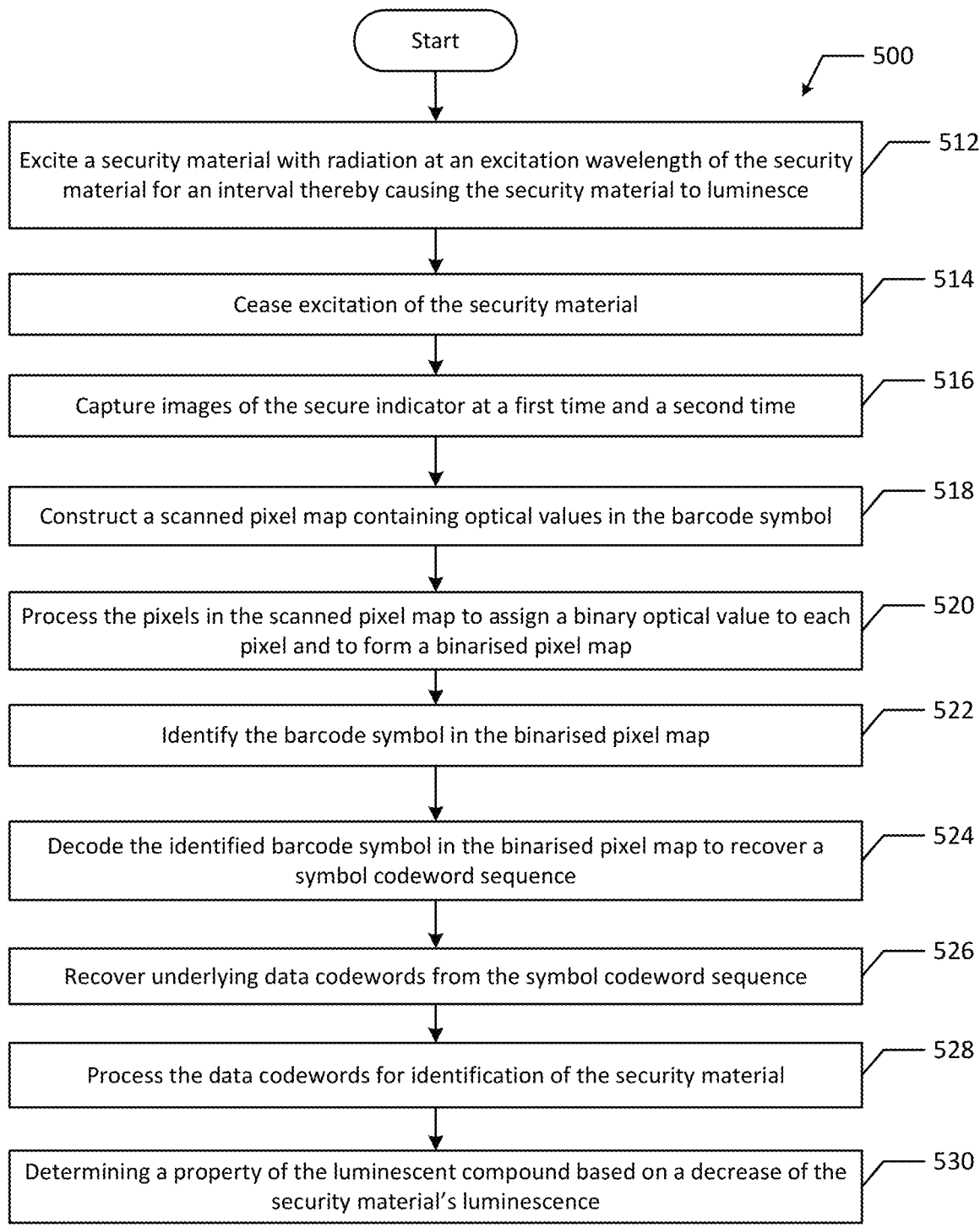
FIG. 5 is a flowchart illustrating an example process for reading a secure indicator, according to an example embodiment of the present disclosure.

FIG. 5 illustrates a flowchart of an example method 500 for reading a secure indicator, according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described are optional. The method 500 may be performed by processing logic that may comprise hardware (circuitry, dedicated logic, etc.), software, or a combination of both.

The example method 500 may include optically scanning an image of an indicator 100 to obtain color values for pixels in the image. The indicator 100 may include barcode 110 with a plurality of barcode modules or elements 120. In an example, the secure indicator 100 may also include a security portion 150 with a security material (e.g., a luminescent compound such as a phosphorescent compound) positioned within the barcode 110 or near the barcode 110. For example, the security material may be positioned in one or more of the plurality of barcode modules or elements 120. The secure indicator 100 may be scanned at any point in the supply chain (e.g., using a smartphone with carrying a security reader App, or other special barcode reader) to ensure that the labeled product is authentic. For example, the secure indicator 100 may be scanned to determine a property of the label or attached host product based on an instantaneous value or an average value of one or more of the following properties: color, luminescence (e.g., phosphorescence or fluorescence), emission, absorption, intensity, reflectance, color density, and RGB value. In another example, the security portion 150 may be provided in an area outside of but surrounding the barcode 110.

Method 500 also includes exciting or irradiating the security material with radiation or an irradiation source (e.g., light source) at an excitation wavelength of the luminescent compound thereby causing the security material to luminesce (block 512). Other radiation or irradiation sources may also be used that include energy sources, UV and IR irradiation sources, an electron beam source, etc. The security material may be at least one of a photochromic material, a luminescent material, a phosphor material, a phosphorescent material, a fluorescent material, a UV-reactive material, an IR-reactive material, and an inorganic material. The security material may be excited or irradiated (e.g., illuminated) for an interval, which may be of a finite duration. Additionally, the interval may be a predetermined interval. Then, method 500 includes ceasing excitation or irradiation of the security material (block 514).

Method 500 also includes capturing images of the secure indicator 100 at a first time and a second time (block 516). For example, the front facing camera of a smartphone may capture a first image(s) of the secure indicator 100 with the security material at a first time and then capture a second image(s) of the secure indicator with the security material at a second time after the first time. The first time and the second time may be spaced apart by an interval. In an example, the second image(s) may be captured during the interval if maximum luminescence is reached during the interval, but before the end of the interval. For example, multiple images may be captured until a fixed threshold of luminescence is reached. In another example, multiple images may be captured until the security material falls below a threshold luminescence. The method may also include scanning the images of the secure indicator 100 to obtain optical values for pixels in the images.

Next, method 500 includes constructing a scanned pixel map containing the optical values in the barcode symbol 110 (block 518). After scanning and optically processing an image of the indicator 100 using a smartphone, a barcode imager or color camera using a pixel color identification system such as preferably sRGB, a scanned pixel map may be constructed, the scanned pixel map containing optical values of the pixels in the scanned modules or elements of the barcode symbol. The sRGB value of the pixels may contain color contributions from both the barcode and the luminescent compound.

Then, method 500 includes processing the pixels in the scanned pixel map to assign a binary optical value to each pixel and form a binarised pixel map (block 520). For example, the pixels of the modules or elements 120 in the scanned pixel map may be processed using thresholding algorithm and/or voting algorithms to assign a binary optical value to each pixel, to form an equal-sized binarised pixel map. Additionally, method 500 includes identifying the barcode symbol in the binarised pixel map (block 522). For example, the barcode symbol 110 may be identified from other graphical objects in the binarised pixel map. Next, the method includes decoding the identified barcode symbol in the binarised pixel map to recover a symbol codeword sequence (block 524). For example, the identified barcode 110 may be decoded to construct a symbol codeword sequence from the binarised pixel map. In an example, the optical value assignment may utilize the IEC 61966-2-1: 1999 standard RGB color space (sRGB). Optical values, especially for portions of the secure indicator 100 with the security material may be an instantaneous value or an average value of one or more of the following properties: color, luminescence (e.g., phosphorescence or fluorescence), emission, absorption, intensity, reflectance, color density, and RGB value.

Method 500 also includes recovering underlying data codewords from the symbol codeword sequence (block 526). Optionally, underlying data codewords may be recovered from the symbol codeword sequence, preferably by utilizing error correction process on the symbol codeword sequence. In an example, the error correction process is Reed-Solomon Error Correction. As mentioned above, error correction may be unnecessary.

Next, the data codewords are processed for identification of the security material (block 528). Processing the data codewords may determine the location, size, and associated equation parameters for processing the information of the security material in the security portion 150. Method 500 also includes determining a property of the security material based on a decrease of the security material's luminescence (block 530). For example, a smartphone application may determine a property of the security material, such as a luminescent compound (e.g., a phosphorescent compound or a fluorescent compound), based at least in part on a decrease or a rate of decrease of the security material's luminescence between the second image(s) and the first image(s). The property of the security material (e.g., luminescent compound) may be based in part on a decrease or rate of decrease of the security material's luminescence after the security material is at a luminescence threshold. The rate of decrease may be a constant rate or a variable rate. Alternatively, the method may continue to measure or determine a property of the security material's luminescence until the luminescence falls below a threshold value.

Determining a property of the security material, such as a phosphorescent compound, to ensure the barcode is authentic may include processing the sRGB color information or emission information of the security material, which may optionally include all or some of the steps of: capturing the incident light emission of pixels included in the security portion 150 (e.g., security material or luminescent compound pixels); creating a colored digital light filter effect on emission data from the pixels to generate filtered colored image sRGB values; reducing the filtered colored image values to greyscale values and creating a greyscale pixel map; correcting the relationship between greyscale and emission percentage; and determining an emission percentage of the incident light at the scanning sample time. As used herein, a pixel map may be a map of binary bits (e.g., a bitmap), ternary bits, etc. For example, a pixel map may include greyscale values or RGB color values. Similar to above, greyscale values may be used in place of color values.

In an example, both the static material of the barcode portion 110 as well as the security material (e.g., luminescent compound) are read at the same time at the same wavelength. In another example, the static material may be read at a first wavelength, which may provide details on where the security portion 150 is located, what type of security material is used, and at what wavelength to analyse the security portion 150. Then, the security material (e.g., luminescent compound) may be analysed at a different second wavelength.

Similarly, the security material, such as a luminescent compound, may be analysed first at a first wavelength to determine barcode authenticity before analysing the barcode data. The barcode data in the static material may be analysed at a different wavelength than the luminescent compound.

In order to obtain authentication data, an image sensor such as a smartphone carrying an App reader, may be used to scan the secure indicator 100. For example, the image(s) may be captured from an image sensor, such as the smartphone camera, using a flash such as a smartphone white flash. The image sensor may capture the white incident light reflectance of the pixels of the barcode 110, including the barcode modules or elements 120 in static material as well as the security portion 150 in security material (e.g., luminescent compound). For example, the secure indicator 100 may be scanned to determine a property of the label or attached host product based on an instantaneous value or an average value of one or more of the following properties: color, luminescence (e.g., phosphorescence or fluorescence), emission, absorption, intensity, reflectance, color density, and RGB value.

In lieu of the incident light being a specified color, a physical color filter may be positioned over the camera lens when the sRGB image is captured. The filter may filter specific wavelengths or ranges of wavelength in the UV, visible, or IR spectrum. Alternatively, a digital filter may be applied over the sRGB image pixel map to create a colored light filter effect on the reflectance data. As an example, the digital filter may be programmed to process the sRGB image based on an appropriate center wavelength and range, as in a bandpass filter. Then, the filtered color image RGB values may be reduced to a greyscale value (e.g., range 0 to 255)

and a greyscale pixel map for the indicator 100 (e.g., Data Matrix barcode with a security portion 150) may be created. In an example, the barcode 110 of the indicator 100 may include encoded data to provide the appropriate inputs and may be used to program a reader for reading an optical property of the security portion 150. For example, through encoded data, data identifiers (DIs) and/or Application Identifiers (AIs), the barcode can automatically program the reader to properly sense an optical property of the security material (e.g., phosphorescent compound) within the security portion 150.

The greyscale pixel map of the Data Matrix barcode may then be processed, e.g., using a standard Data Matrix procedure, such as ISO 16022 Data Matrix with modifications such as replacing the ISO 15415 Global Threshold algorithm with the Ultracode Color barcode Symbology dual-threshold ternary algorithm to separate pixels into black pixels, white pixels, and color pixels (i.e., pixels neither black nor white). Once the color pixels are separated from the black and white pixels, the remaining black pixels and white pixels may be processed according to the methods of ISO 16022. For example, this processing method identifies the square module or element positions and the module or element centers in the Data Matrix pixel map using only the black and white pixels. The ISO 16022 method then decodes the Data Matrix and recovers the AI data (e.g., GS1 AI data).

In an example, the barcode data may be utilized to check on product authenticity as an anti-counterfeiting measure. For example, all or part of the encoded AI (01) for a GTIN, AI (10) batch number, and AI (21) data may used as validation data form this product instance. This validation data is sent by the reader as a query to the manufacturer's database to see if that validation data is associated there, meaning that the product carrying that barcode has already been registered. If the validation data is not matched in manufacturer's database, or is marked there previously seen, already used or expired, then the authenticity of this product instance just scanned is questionable. A warning code may be placed in the manufacturer's database that multiple instances of the same barcode have been seen, to warn others who may receive another identical product instance that at least one of the products instances is counterfeit.

Figure 6A:
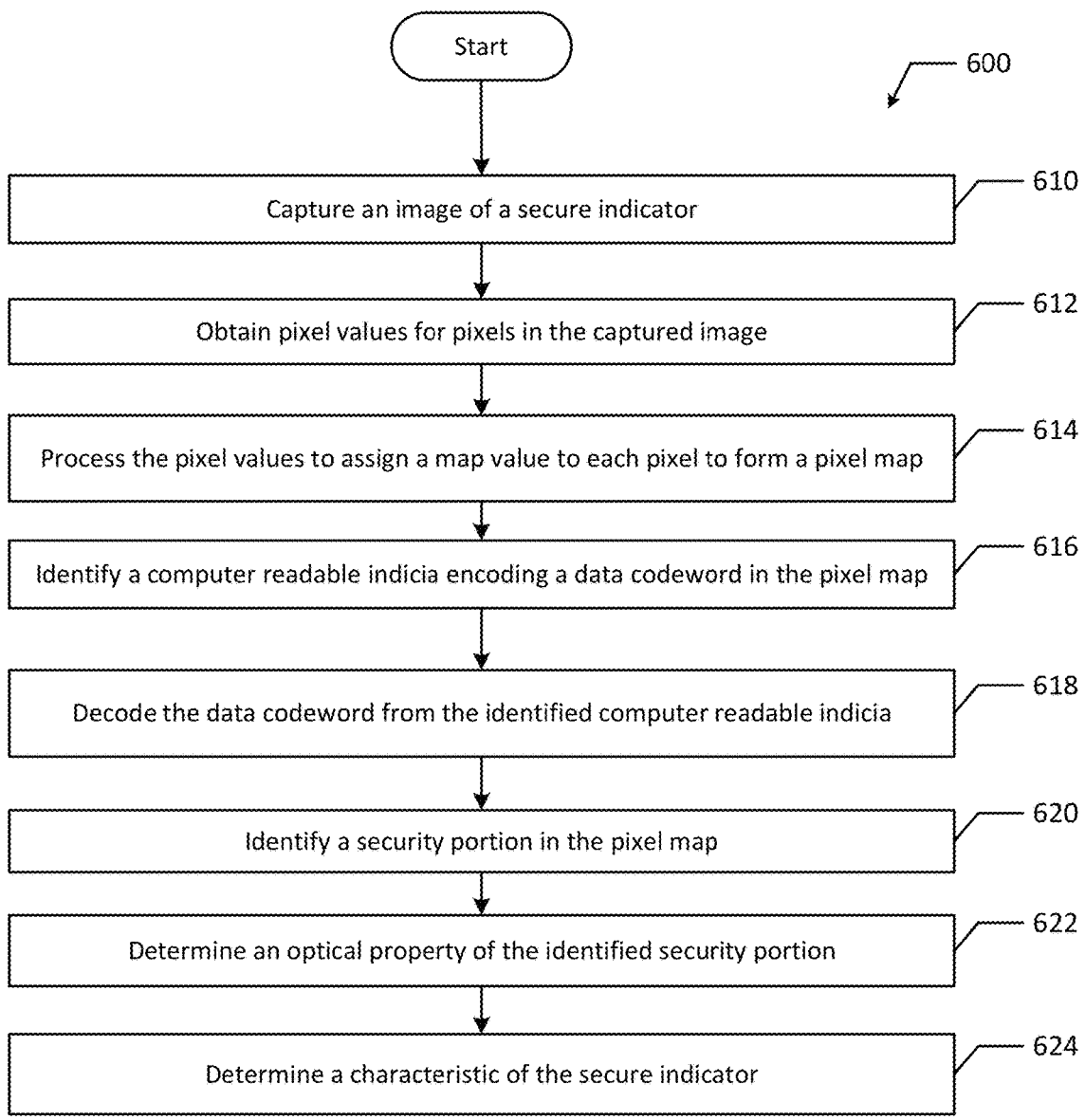
FIG. 6A is a flowchart illustrating an example process for reading a secure indicator, according to an example embodiment of the present disclosure.

FIG. 6A illustrates a flowchart of an example method 600 for reading a secure indicator, according to an example embodiment of the present disclosure. Although the example method 600 is described with reference to the flowchart illustrated in FIG. 6A, it will be appreciated that many other methods of performing the acts associated with the method 600 may be used. For example, the order of some of the blocks may be changed, certain blocks may be combined with other blocks, blocks may be repeated, and some of the blocks described are optional. The method 600 may be performed by processing logic that may comprise hardware (circuitry, dedicated logic, etc.), software, or a combination of both.

Method 600 includes capturing an image of a secure indicator (block 610). Additionally, the method includes obtaining pixel values (e.g. pixel color values) for pixels in the captured image (block 612). Then, the method includes processing the pixel values (e.g., pixel color values) to assign a map value (e.g., map color value) to each pixel to form a pixel map (block 614).

Additionally, the method includes identifying a computer readable indicia encoding a data codeword in the pixel map (block 616). In an example, the computer readable indicia is a barcode symbol 110. Then, the method includes decoding the data codeword from the identified computer readable indicia, such as a barcode symbol 110 (block 618). Depending on the position of a security portion 150 and/or reference region 155, an error correction process may be utilized to recover a symbol codeword sequence. Next, the method includes processing the data codeword to identify a security portion 150 in the pixel map (block 620). For example, the barcode portion 110 may provide reference information to identify and locate the security portion 150. Additionally, the barcode portion 110 may provide instructions for reading or scanning the security portion 150.

The method also includes determining an optical property of the identified security portion (block 622). Next, the method includes determining a characteristic of the secure indicator 100 (block 624). The characteristic of the secure indicator may be based, at least in part, on the optical property and the data codeword. In an example, the security portion 150 may affect the output or result of reading the secure indicator 100.

Figure 6B:
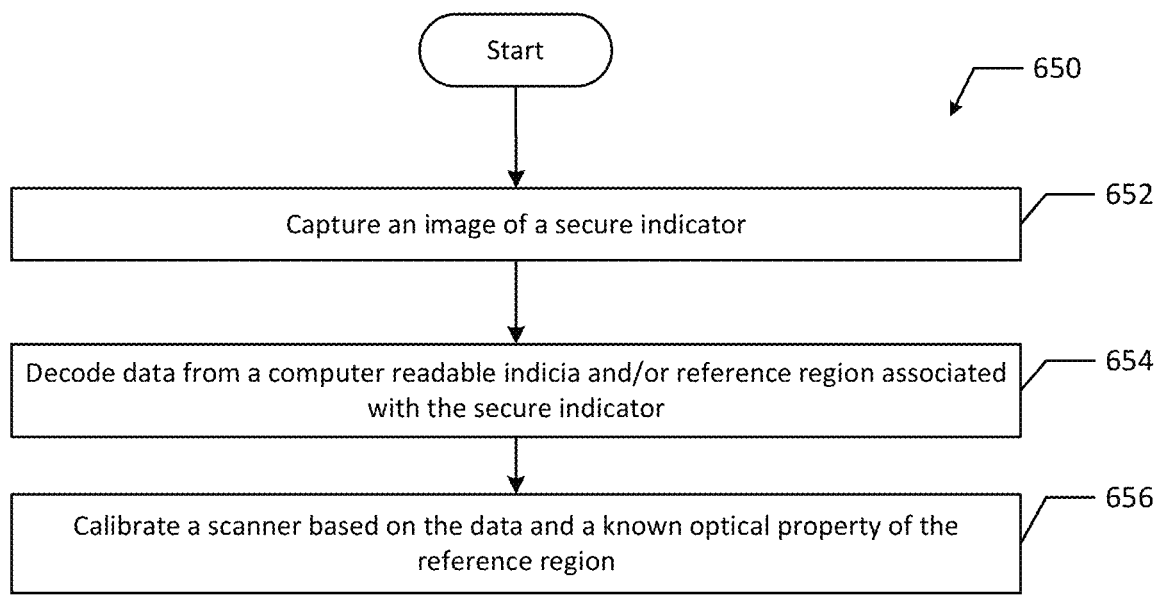
FIG. 6B is a flowchart illustrating an example process for auto-calibrating a scanner, according to an example embodiment of the present disclosure.

FIG. 6B illustrates a flowchart of an example method 650 for auto-calibrating a scanner, according to an example embodiment of the present disclosure. Although the example method 650 is described with reference to the flowchart illustrated in FIG. 6B, it will be appreciated that many other methods of performing the acts associated with the method 650 may be used. For example, the order of some of the blocks may be changed, certain blocks may be combined with other blocks, blocks may be repeated, and some of the blocks described are optional. The method 650 may be performed by processing logic that may comprise hardware (circuitry, dedicated logic, etc.), software, or a combination of both.

Method 650 includes capturing an image of a secure indicator (block 652). The secure indicator 100 may include a barcode and a reference region 155 of a known optical property at a reading property of interest. For example, the known optical property may be based on a reading or scanning wavelength. Prior to capturing the image, the secure indicator 100 may be irradiated. Additionally, the method includes decoding data from a computer readable indicia or the reference region 155 (block 654). The computer readable indicia may be a barcode symbol 110. The method also includes calibrating the scanner based on the data and the known optical property (block 656). Several calibrations may occur, for example, multiple images may be captured and analysed to create various calibration points. The secure indicator may also include a security portion with a security material, such as a luminescent material. Prior to calibrating the scanner, the method may additionally include confirming that the security material luminesces. In another example, the method may include determining an optical property of the security material and confirming that the optical property matches an expected value. After calibrating the scanner, the secure indicator and an associated security portion 150 may be scanned. The optical properties of the reference region 155 and/or security region 150 may include a color value, an average color value, a luminescence value, a luminescence decay value, an average luminescence value, a phosphorescence value, an average phosphorescence value, a fluorescence value, a fluorescence decay value, an average fluorescence value, a reflectance value, an average reflectance value, an emission value, an intensity value, a rate of decay value, a color density value, an average color density value, and an RGB value. Additionally, optical properties may be determined at different times and may be compared to determine a difference between optical properties obtained at different times.

Figure 6C:
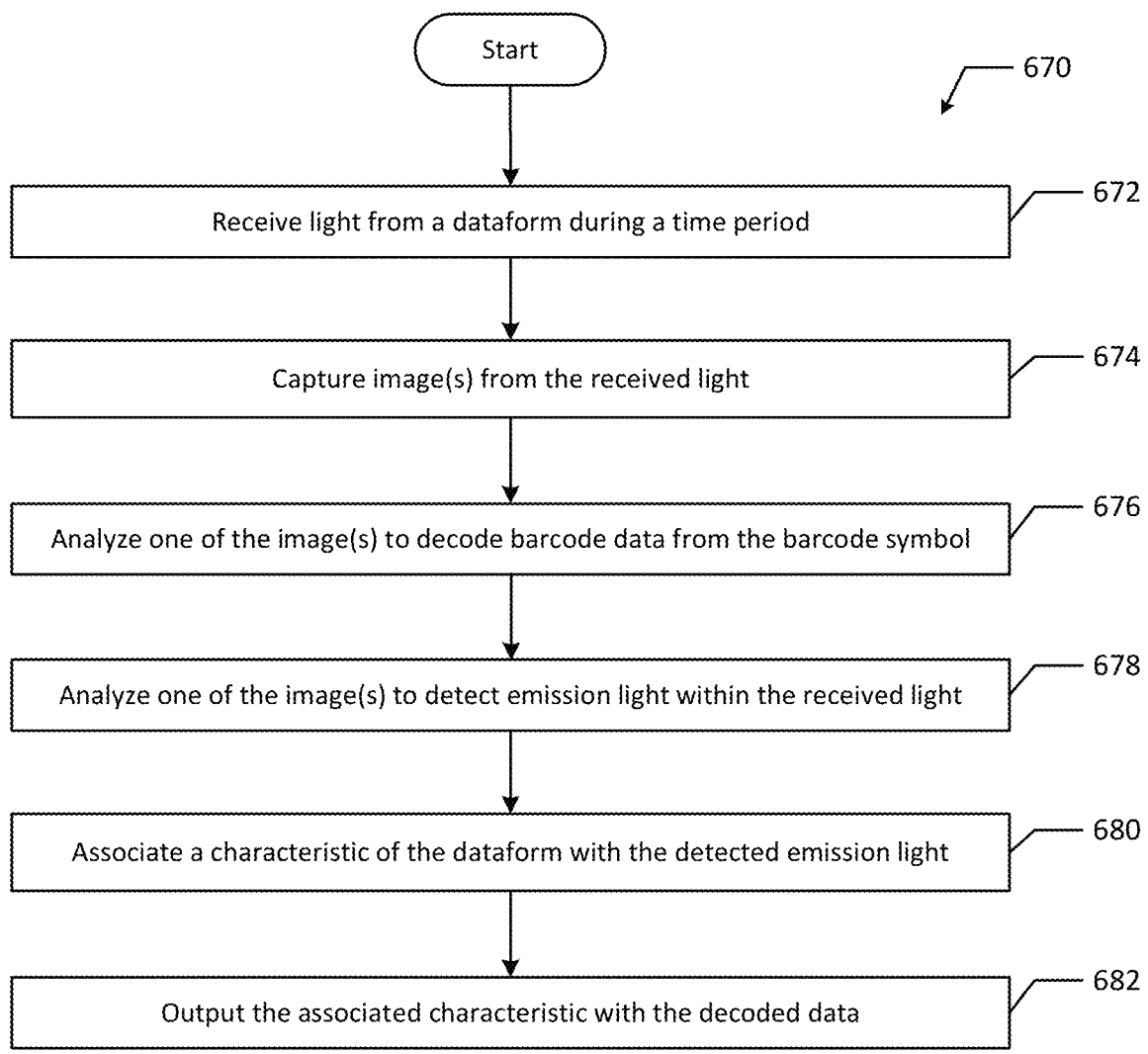
FIG. 6C is a flowchart illustrating an example process for scanning a dataform, according to an example embodiment of the present disclosure.

FIG. 6C illustrates a flowchart of an example method 670 for auto-calibrating a scanner, according to an example embodiment of the present disclosure. Although the example method 670 is described with reference to the flowchart illustrated in FIG. 6C, it will be appreciated that many other methods of performing the acts associated with the method 670 may be used. For example, the order of some of the blocks may be changed, certain blocks may be combined with other blocks, blocks may be repeated, and some of the blocks described are optional. The method 670 may be performed by processing logic that may comprise hardware (circuitry, dedicated logic, etc.), software, or a combination of both.

Method 670 includes receiving light from a dataform during a time period (block 672). The dataform may include a barcode symbol 110. In an example, the dataform may be one of the secure indicators 100 described herein. Additionally, the method includes capturing image(s) from the received light (block 674). For example, a single image may be captured, for example by an image sensor (e.g., image sensor 720). In another example, multiple images may be captured.

Method 670 also includes analyzing one of the image(s) to decode barcode data from the barcode symbol (block 676). When a single image is captured, the single image may be analyzed to decode data from the barcode symbol 110. If multiple images are captured, for example, prior to and after activating the security portion 150, the first image may be analyzed to decode data from the barcode symbol 110. The analysis may be performed by processor 710, image/signal processor 750, or one of the processing modules described herein. For example, the barcode processing module 752, or more specifically the decoding module 845 may decode barcode data from the barcode symbol 110.

Additionally, the method includes analyzing one of the image(s) to detect emission light within the received light (block 678). When a single image is captured, the single image may be analyzed to detect emission light within the received light. For example, the security portion 150 may emit light upon and after activation. If multiple images are captured, for example, prior to and after activating the security portion 150, the second image may be analyzed to detect emission light. The analysis may be performed by processor 710, image/signal processor 750, or one of the processing modules described herein. For example, the security portion processing module 756 or luminescence processing module 758 may analyze and/or detect emission light within the received light.

After analyzing the image(s), the method includes associating a characteristic of the dataform with the detected emission light (block 680). For example, a property or characteristic of the captured image, and thus the dataform, may be determined based on an instantaneous value or an average value of one or more of the following properties: color, luminescence (e.g., phosphorescence or fluorescence), emission, absorption, intensity, reflectance, color density, and RGB value. In a specific example, a property of the captured image(s) may be based on a decrease or a rate of decrease of the security material's luminescence between second image(s) and the first image(s). Additionally, the property or characteristic of the captured image, and thus the dataform, may be based in part on a decrease or rate of decrease, which may be a constant or variable rate, of the security material's luminescence after the security material is at a luminescence threshold. The determined property or characteristic associated with the dataform may be used to determine authenticity of the host product that the label is attached to.

Method 670 also includes outputting the associated characteristic with the decoded data (block 682). For example, the security material of the dataform may also change the values of the barcode 110, such that reading the barcode when the security material is activated creates one output while reading the barcode 110 while the security material is inactive creates a different output. Specifically, the secure indicator 100 may be read at least twice at different times to analyze the security material (e.g., the decay of the optical properties of the security material after the material has been activated). The output from reading the barcode 110 or the optical properties of the security material may be based on several readings and the decay of the luminescence of the security material.

As illustrated in FIG. 8A, the barcode processing module 752 may include a dedicated CPU 805, memory device 815 and input/output device 825. Additionally, the barcode processing module 752 may include a location module 835, a decoding module 845, and a recovery module 855. The location module 835 may locate or identify the barcode symbol. The decoding module 845 may decode the identified barcode symbol and recover a symbol codeword sequence. Additionally, the recovery module 855 may recover underlying data codewords from the symbol codeword sequence.

FIG. 8B illustrates a flowchart of an example method 800 that describes example processes performed by the barcode processing module 752 of FIG. 8A according to an example embodiment of the present disclosure. Although the example processes are described with reference to the flowchart illustrated in FIG. 8B, it will be appreciated that many other methods of performing the acts associated with the method 800 may be used. For example, the order of some of the blocks may be changed, certain blocks may be combined with other blocks, blocks may be repeated, and some of the blocks described are optional. The method 800 may be performed by processing logic that may comprise hardware (circuitry, dedicated logic, etc.), software, or a combination of both.

The example processes illustrated in method 800 include capturing image(s) of a secure indicator 100 (block 810). The barcode processing module 752 may also be configured to construct a scanned pixel map containing optical values in a computer readable indicia, such as a barcode symbol 110 (block 820). The barcode processing module 752 may also process the pixels in the scanned pixel map to assign a binary optical value to each pixel and may form a pixel map, such as a binarised pixel map (block 830). The barcode processing module 752 may identify the computer readable indicia encoding a data codeword in the pixel map (block 840). Additionally, the barcode processing module 752 may decode the identified computer readable indicia, such as the barcode symbol 110, in the pixel map to recover a symbol codeword sequence (block 850). The barcode processing module 752 may also recover underlying data codewords from the symbol codeword sequence (block 860). The barcode processing module 752 may also output computer readable indicia data, such as barcode data (block 870). The barcode data may be associated with other data obtained from one or more of a dynamic indicator, the security portion 150 and any luminescent compounds within the security portion 150.

Figure 9B:
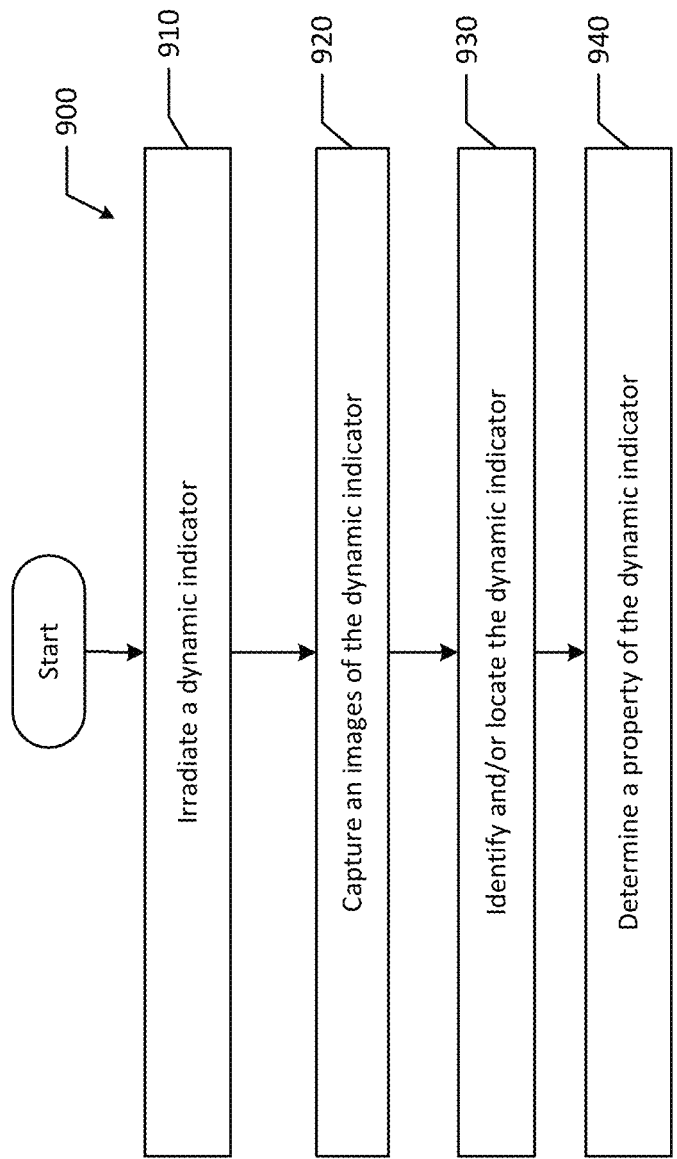
FIG. 9B is flowchart illustrating example processes performed by the dynamic indicator module according to an example embodiment of the present disclosure.
Figure 9A:
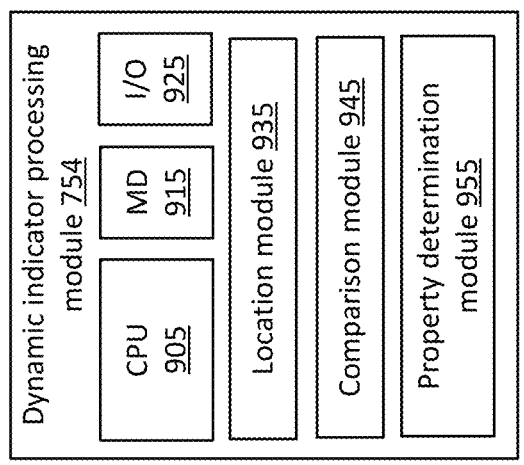
FIG. 9A is a block diagram of an example dynamic indicator module according to an example embodiment of the present disclosure.

As illustrated in FIG. 9A, the dynamic indicator processing module 754 may include a dedicated CPU 905, memory device 915 and input/output device 925. Additionally, the dynamic indicator processing module 754 may include a location module 935, a comparison module 945, and a property determination module 955. The location module 935 may locate or identify a dynamic indicator associated with a barcode symbol or secure indicator 100. The comparison module 945 may compare an initial state to a successive state or end state of the dynamic indicator. Additionally, the property determination module 955 may determine a property of the dynamic indicator. For example, the property determination module 955 may determine a property of the dynamic indicator based on the comparison performed by the comparison module 945.

FIG. 9B illustrates a flowchart of an example method 900 that describes example processes performed by the dynamic indicator processing module 754 of FIG. 9A according to an example embodiment of the present disclosure. Although the example processes are described with reference to the flowchart illustrated in FIG. 9B, it will be appreciated that many other methods of performing the acts associated with the method 900 may be used. For example, the order of some of the blocks may be changed, certain blocks may be combined with other blocks, blocks may be repeated, and some of the blocks described are optional. The method 900 may be performed by processing logic that may comprise hardware (circuitry, dedicated logic, etc.), software, or a combination of both.

The example processes illustrated in method 900 include irradiating a dynamic indicator (block 910). Additionally, the dynamic indicator processing module 754 may be configured to capture image(s) of the dynamic indicator (block 920). The dynamic indicator processing module 754 may also be configured to identify and/or locate the dynamic indicator (block 930). Additionally, the dynamic indicator processing module 754 may determine a property of the dynamic indicator (block 940). For example, the dynamic indicator may have a chemistry that is predictably responsive to a specified environmental condition, such that the chemistry undergoes a chemical or physical state change between an initial state and an end state. The chemical or physical state change may be a continuous state change, causing a continuous change in the state of the dynamic indicator (e.g., a continuous change in an optical property, such as a color, of the dynamic indicator). For example, the dynamic indicator may be an environmental indicator or sensor, such as a temperature monitor, measuring either cumulative heat exposure or passing beyond a set high or low temperature threshold value(s); time, time-temperature product, nuclear radiation exposure monitors; gas or humidity exposure monitors each passing above a cumulative exposure threshold or an instantaneous threshold value. The dynamic indicator may also be a medical indicator or a medical sensor. Examples of medical sensors include recording patient thermometers; threshold assays measuring levels to biological toxins such as aflatoxin or botulism toxin; and includes colorimetric immunoassays for sensing of the presence of biological agents such as prions or biological organisms such as infectious bacteria.

As illustrated in FIG. 10A, the security portion processing module 756 may include a dedicated CPU 1005, memory device 1015 and input/output device 1025. Additionally, the security portion processing module 756 may include a location module 1035, a comparison module 1045, and a property determination module 1055. The location module 1035 may locate or identify a security portion 150 associated with a barcode symbol or secure indicator 100. The comparison module 1045 may compare an initial state to a successive state or end state of the security portion 150. Additionally, the property determination module 1055 may determine a property of the security portion 150 or the security material associated with the security portion 150. For example, the property determination module 1055 may determine a property of the security portion 150 based on the comparison performed by the comparison module 1045.

FIG. 10B illustrates a flowchart of an example method 1000 that describes example processes performed by the security portion processing module 756 of FIG. 10A according to an example embodiment of the present disclosure. Although the example processes are described with reference to the flowchart illustrated in FIG. 10B, it will be appreciated that many other methods of performing the acts associated with the method 1000 may be used. For example, the order of some of the blocks may be changed, certain blocks may be combined with other blocks, blocks may be repeated, and some of the blocks described are optional. The method 1000 may be performed by processing logic that may comprise hardware (circuitry, dedicated logic, etc.), software, or a combination of both.

The example processes illustrated in method 1000 include exciting a security portion 150 (block 1010). The security portion processing module 756 may be configured to cease excitation of the security portion 150 (block 1020). Additionally, the security portion processing module 756 may be configured to capture image(s) of the security portion at a first time and a second time (block 1030). The security portion processing module 756 may also be configured to identify and/or locate the security portion 150 (block 1040). Additionally, the security portion processing module 756 may determine a property of the security portion (block 1050).

As illustrated in FIG. 11A, the luminescence processing module 758 may include a dedicated CPU 1105, memory device 1115 and input/output device 1125. Additionally, the luminescence processing module 756 may include a location module 1135, a comparison module 1145, and a property determination module 1155. The location module 1135 may locate or identify a security material (e.g., a luminescent material) associated with a barcode symbol or secure indicator 100. The comparison module 1145 may compare an initial state to a successive state or end state of the security material. Additionally, the property determination module 1155 may determine a property of the security material associated with the barcode symbol or secure indicator 100. For example, the property determination module 1155 may determine a property of the security material based on the comparison performed by the comparison module 1145.

FIG. 11B illustrates a flowchart of an example method 1100 that describes example processes performed by the luminescence processing module 758 of FIG. 11A according to an example embodiment of the present disclosure. Although the example processes are described with reference to the flowchart illustrated in FIG. 11B, it will be appreciated that many other methods of performing the acts associated with the method 1100 may be used. For example, the order of some of the blocks may be changed, certain blocks may be combined with other blocks, blocks may be repeated, and some of the blocks described are optional. The method 1100 may be performed by processing logic that may comprise hardware (circuitry, dedicated logic, etc.), software, or a combination of both.

The example processes illustrated in method 1100 include exciting a security material with radiation (e.g., a light) at an excitation wavelength of the security material thereby causing the security material to luminesce (block 1110). The security material may be a luminescent compound, such as a phosphorescent compound or a fluorescent compound. The luminescence processing module 758 may be configured to cease excitation of the security material (block 1120). Additionally, the luminescence processing module 758 may be configured to capture image(s) of a secure indicator (and associated security material) at a first time and a second time (block 1130). The luminescence processing module 758 may also be configured to identify and/or locate the security material (block 1140). In an example, identifying or locating the security material may include processing data codewords of a barcode symbol for identification of the security material. Additionally, the luminescence processing module 758 may determine a property of the security material (block 1150). For example, the luminescence processing module 758 may determine a property or characteristic of the security material based on a decrease of the security material's luminescence between the second time and the first time. The property or characteristic may also be determined based on the data codewords Reader The secure indicator 100 may be read by a smartphone with a corresponding application installed that is configured to read and analyze the secure indicator. In an example, the barcode region 110 may be optically readable by the reader (e.g., smartphone) and a human while the security portion 150 with the corresponding security material (e.g., a luminescent compound such as a phosphorescent compound) may not be human readable. For example, the luminescent compound may only be readable in a spectrum, such as the UV spectrum and therefore unreadable by a human. The secure indicator 100 may be entirely human visible, only the barcode portion 110 may be human visible, or none of the secure indicator may be human visible.

Figure 7:
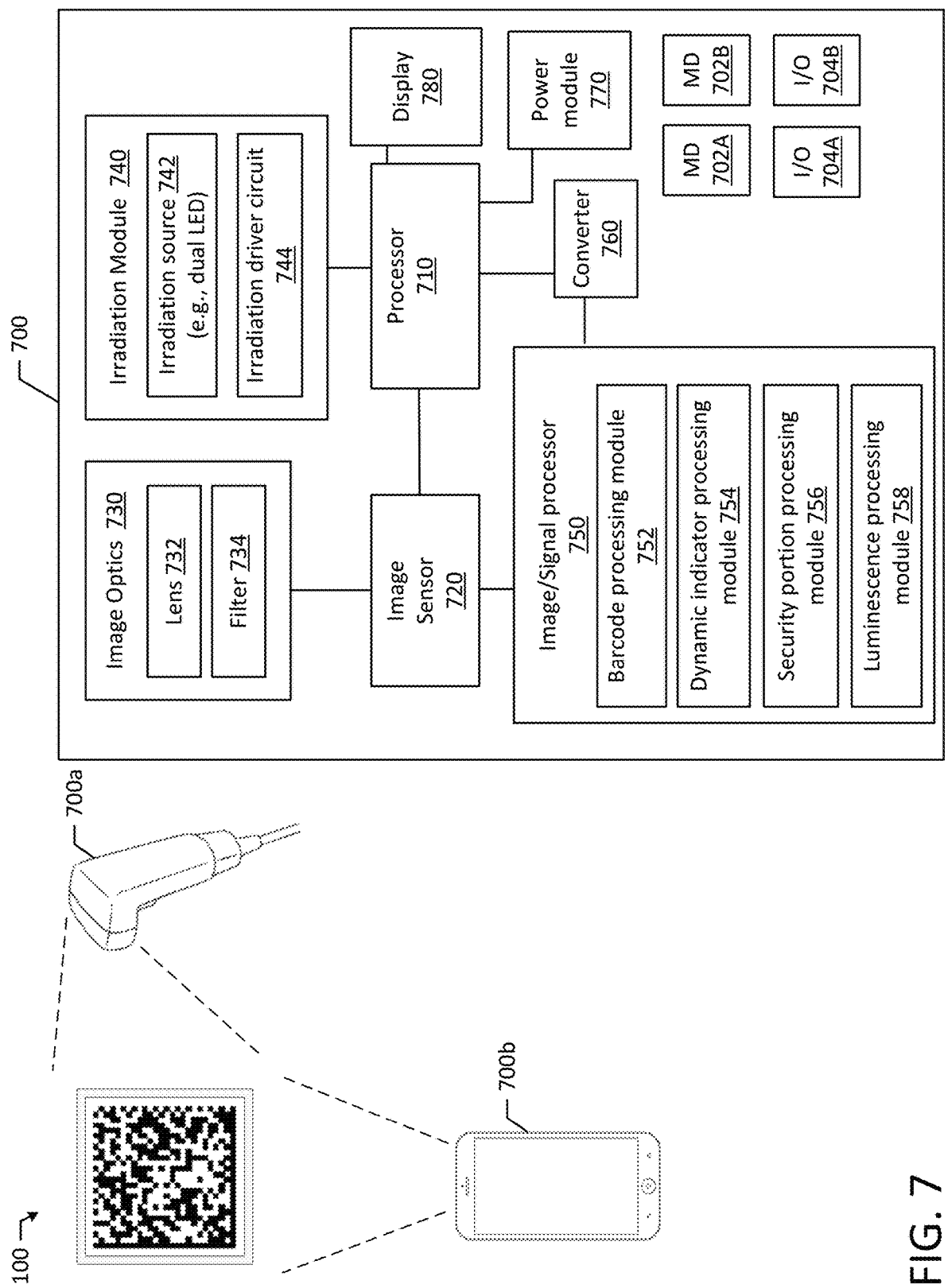
FIG. 7 illustrates an example device for reading a secure indicator according to the present disclosure.

FIG. 7 illustrate example devices 700*a* and 700*b* (referred to herein generally as reader 700) for reading secure indicators 100 according to the present disclosure. In an example, the reader 700 may be a privileged reader or a non-privileged reader. The reader 700 may be a dedicated barcode reader (e.g., reader 700*a*) or an apparatus configured to read secure indicators 100 (e.g., reader 700*b*) such as a mobile device, a personal digital assistant or PDA, a smartphone, a laptop, a tablet computer, or a desktop computer, as well as any other user devices. The reader 700 may be adapted to read barcodes (e.g., 1D and 2D barcodes), may be adapted to read only 2D barcodes, or may be adapted to read other indicia. Additionally, the reader 700 may also transmit, receive, or exchange data with other network devices via a communication network. A network device may be a computer, a different reader 700, or any other device accessible via a communication network. Certain data may be stored in the reader 700, which may also be stored on a server within the network, either temporarily or permanently, for example in memory or a storage device (e.g., memory devices 702A-B). The network connection may be any type of network connection, such as a cellular or wireless connection, an Ethernet connection, digital subscriber line, telephone line, coaxial cable, etc. Access to a reader 700 or image data obtained by the reader 700 may be controlled by appropriate security software or security measures. An individual users' access may be defined by reader 700 and limited to certain data and/or actions.

The reader may include housing, a processor 710, such as a microprocessor, that is communication with memory (e.g., memory devices 702A-B) and input/output devices 704A-B.

The processor 710 may also communicate with an image sensor 720, image optics 730, an irradiation module 740, a power module 770 and display 780. The image sensor 720 may receive light from image optics 730, which may include a lens 732 and a filter 734. The image sensor may pass the received light to an image or signal processor 750, which may send the signal to a converter 760 before sending the information to processor 710. The image or signal processor 750 may include a barcode processing module 752, a dynamic indicator processing module 754, a security portion processing module 756, and a luminescence processing module 758 (e.g., a phosphorescence module). The processor 710, image/signal processor 750 and the various processing modules may be generally referred to as a controller. In another example, the reader 700 may include a separate controller that controls and sends instructions to the various processors and modules.

The processor 710 may be an integrated circuit microprocessor, such as a programmable logic or gate array. In an example, processor 710 may provide control inputs to control circuits (e.g., the irradiation driver circuit 744) as well as other control circuits (not pictured). For example, the processor 710 may also provide control inputs for the image sensor 720 such as timing inputs as well as the irradiation module 740 regarding the excitation frequency of the radiation or irradiation source 742, the duration of excitation or irradiation, etc. Additionally, the image sensor 720 may be controlled to obtain image data (e.g., specific quantity of images) during a specific interval, etc.

The image sensor 720 may be a sensor array. The image sensor 720 may be configured to sense or detect light at a specific wavelength (e.g., visible wavelengths, non-visible wavelengths, etc.) or specific wavelengths. In an example, the image sensor 720 may be a CMOS based image sensor array. In another example, the image sensor 720 may be a CCD based image sensor array. The image sensor may include a two-dimensional array of pixels that each includes a photosensitive sensitive region. The image sensor 720 may also be controlled by a sensor control module (not pictured), which may send control signals to the image sensor 720.

The image optics 730 may include lens 732 and a filter 734. It should be appreciated that the image optics 730 may include multiple lenses 732 and/or filters 734. Additionally, the image optics 730 and irradiation module 740 may include a variety of optical technologies to achieve irradiating the secure indicator 100 including the barcode 110 and any corresponding security material as well as receiving reflected light from the various portions of the secure indicator 100. As illustrated in FIG. 5, the irradiation module 740 may include a radiation or irradiation source 742 and irradiation driver circuit 744. The radiation or irradiation source 742 may include an LED or bank of LEDs, such as a dual LED flash. In another example, the radiation or irradiation source 742 may also include a laser diode to indicate a scanning region. The radiation or irradiation source is configured to direct light or light energy toward a target object (e.g., a secure indicator or barcode to be scanned). The reflected light or radiation from the target object (e.g., the secure indicator or barcode) may be focused by the image optics 730 (e.g., lens 732) onto the image sensor 720.

In an example, the radiation or irradiation source 742 is configured to provide light of sufficient intensity to allow the image sensor 720 to capture an image of the secure indicator 100 and any associated barcode 110 and security portion 150. In an example, the irradiation driver circuit 744 may cause the radiation or irradiation source 742 to emit light, which may pass through various apertures and lenses before reaching the target object (e.g., the secure indicator 100). In an example, the radiation or irradiation source 742 may produce light at a predetermined wavelength (e.g., 365 nm) or a predetermined wavelength range. In another example, the radiation or irradiation source 742 may be configured to produce light at various predetermined wavelengths.

The image or signal processor 750 may be configured to processing and decode information received and capture by the image sensor 720. For example, the image or signal processor 750 or processor 710 may perform image processing, analysis and/or decoding. The image or signal processor 750 may include a barcode processing module 752, a dynamic indicator processing module 754, a security portion processing module 756 and a luminescence processing module 758. The barcode processing module 752 may be configured to perform image processing, analysis and/or decoding of the portion of the image related to the barcode 110, Similarly, the dynamic indicator processing module 754 may be configured to perform image processing, analysis and/or decoding of the portion of the image related to any other dynamic or environmental indicator(s) associated with the secure indicator 100. The security portion processing module 756 and/or the luminescence processing module 758, such as a phosphorescence module, may be configured to perform image processing, analysis and/or decoding for the portion of the image related to security materials (e.g., luminescent compound such as a phosphorescent compounds).

The various processing modules of the signal processor 750 (e.g., barcode processing module 752, dynamic indicator processing module 754, security portion processing module 756, and luminescence processing module 758), alone or in combination, may be configured to determine pixels in image data corresponding to the security material, which may form a security indicia (e.g., a luminescent indicia or more particularly, phosphorescent indicia). In an example, one or more of the processing modules may determine the pixels based on image features of the barcode or based on data read from the barcode. Additionally, one or more of the processing modules may process pixels in the image data corresponding to the luminescent indicia to determine an optical property of the luminescent indicia. Optical properties (e.g., instantaneous optical properties or average optical properties) may be determined at different times. The processing modules may also determine an optical property for each pixel of the image data corresponding to the luminescent indicia and may combine the optical property values determined at the different times (e.g., by combining optical property values obtained at a first time and a second time). Various instantaneous values may be combined or averaged to generate an average optical property of the luminescent indicia. The processing modules may also compare the optical properties determined at the different times. Additionally, the processing modules may compare data associated with the pixels of the luminescent indicia (e.g., security material in the security portion 150) with data associated with other portions of the barcode or other portions of the secure indicator 100. For example, data associated with pixels of the luminescent indicator may be compared to a calibration patch or reference region 155 of the secure indicator 100.

In an example, the processing modules may locate pixels associated with one or more of the barcode modules or elements 120, luminescent indicia (e.g., security material in the security portion 150) and/or a calibration patch (e.g., reference region 155). The pixels may be processed according to information encoded in and read from the barcode. The processing modules may also provide an output for the secure indicator based on a property of one or more of the barcode modules or elements 120, luminescent indicia (e.g., security material in the security portion 150) and/or a calibration patch (e.g., reference region 155).

Data from the image or signal processor 750 may be passed to a converter 760 before being sent to the processor 710. For example, the converter 760 may be an analog-to-digital converter. In another example, the signal (e.g., analog signal) may be amplified before being converted to a digital signal by converter 760.

The reader 700 may be used to obtain authenticity data. For example, an image sensor 720 of a reader 700, such as a smartphone carrying a secure indicator App reader, may be used to scan the secure indicator and any associated barcodes 110, security portions 150, and any other dynamic or environmental indicator(s). For example, the image may be captured from an image sensor 720, such as the smartphone camera, using a radiation or irradiation source 742 (e.g., camera flash, such as a smartphone white flash). The nominally white flash intensity may overwhelm the ambient light and set the color temperature for image capture by the sRGB sensor of the camera. The image sensor 720 may capture the white incident light reflectance of the pixels, including those of the security portion. For example, the secure indicator 100 may be scanned to determine a property of the label or attached host product based on an instantaneous value or an average value of one or more of the following properties: color, luminescence (e.g., phosphorescence or fluorescence), emission, absorption, intensity, reflectance, color density, and RGB value.

In an example, a filter 734 (e.g., a physical color filter) may be positioned over the camera lens when the sRGB image is captured. Alternatively, a filter 734, such as a digital filter may be applied over the sRGB image pixel map to create a colored light filter effect on the reflectance data. As an example the digital filtel 70r may programmed to process the sRGB image based on an appropriate center wavelength and range, as in a bandpass filter. Then, the filtered color image RGB values may be reduced to a greyscale value (e.g., range 0 to 255) and a greyscale pixel map for the Data Matrix barcode may be created. In an example, the 2D barcode may include encoded data to provide the appropriate inputs and may be used to program a barcode reader for reading color saturation, reflectance and/or density of the security portion(s) 150. For example, through encoded data, data identifiers (DIs) and/or Application Identifiers (AIs), the barcode can automatically program the barcode reader to properly sense an optical property of the security portion(s) 150. The encoded data in the data identifiers (e.g., Application Identifiers) may indicate a size, a location, a time, a rate, a threshold, a type of luminescent present, a state, an expected rate of decrease or decay associated with a security material. The data identifier may also include the appropriate equation parameters such that the reader can determine authenticity for the scanned product. After scanning the secure indicator, the reader 700 may display information about the authenticity as well as any other product data if the associated barcode 110 is authentic. For example, the secure indicator 100 may be scanned to determine a property of the label or attached host product, which may be used to determine authenticity of the label and therefore the host product the label is attached to.

Scanner

Instead of using a reader 700, a scanner may scan the secure indicator 100. The scanner may scan or read the secure indicator 100 and determine differences in optical properties of the secure indicator 100. In an example, the scanner may be configured to capture an image of a field of view comprising the secure indicator 100. The field of view may be large enough to capture a barcode portion 110 of the secure indicator 100 and any associated security portion(s) 150 or reference region(s) 155 that are positioned within or near the barcode portion 110. The scanner may also be configured to process the captured image to identify the barcode 110 within the captured image. Additionally, the scanner may be configured to analyze the barcode 110 to determine or identify modules or elements 120 of the barcode.

The scanner may be configured to process the captured image to identify at least one of a security portion 150 and a reference region 155 within the captured image. In an example, barcode data may be used to identify the security portion 150 or the reference region 155. For example, the barcode data may provide information regarding the size, location, type, characteristics, etc. or the security portion 150 or reference region 155. For example, the barcode data may specify the location of the security portion 150, the type of security material used, the activation or excitation wavelength and a reading or scanning wavelength. Similarly, the barcode data may specify the location of the reference region 155, the type of reference material used, etc.

The scanner may also be configured to determine a property of at least one of the security portion and the reference region. The property may be an instantaneous value or an average value of one or more of the following properties: color, luminescence (e.g., phosphorescence or fluorescence), emission, absorption, intensity, reflectance, color density, and RGB value. The luminescence value may be an intensity value, an emission wavelength ($\lambda$) value, a decay value or a value associated with the spectral signature of the luminescence. In another example, the property may be a change in one of the above values. In yet another example, the property may be a rate of change of one of the above values. Additionally, the scanner may be configured to decode barcode data from the identified barcode and associate the barcode data with the determined property of the security portion 150. After decoding the barcode data and any associated property of the security portion 150, the scanner may be configured to output the associated data.

Examples and Experimental Data

Inks containing phosphorescent pigments were applied to a substrate (e.g., a paper substrate). For example, the phosphorescent ink samples were formulated and coated in a thin layer onto paper substrates. The samples successfully provided a short time-frame reversible visual change when exposed to a UV light source (i.e., 365 nm flashlight). Some of the phosphorescent ink samples were also shown to reversibly change color within seconds using the flash of a smart phone camera as the image is captured.

Specifically, phosphorescent pigments from different suppliers were obtained and formulated into inks for thermal printing (e.g., thermal transfer or direct thermal on a Zebra thermal printer) or for screen printing. The following pigments were incorporated into an ink system to assess whether a clearly visible, unambiguous change was observed 1) with and without UV light and 2) before and after a smartphone camera flash. Inks were made at about 35% solids, containing approximately 18% phosphorescent pigment incorporated into a matrix of Nitrocellulose/IPA or Joncryl 682/Butyl Alcohol.

TABLE 1

Summary of Phosphorescent Ink Samples

| Supplier | Sample ID | Chemical Composition | Particle Size | Appearance in Normal Light | Appearance under UV Light (365 nm) |
| --- | --- | --- | --- | --- | --- |
| UMC, Luminova | 1253-20 A | Strontium Aluminate | 10-40 um | White/Yellow | Bright Green |
| TechnoGlow | 1253-20 C | Strontium Aluminate | <15 um | White | Bright Green |
|  | 1253-20 E | CaS | 35 um | White | Bright Red |
|  | 1253-16 B | ZnS | <50 um | Light Pink | Bright Red |
| Isuo Chemical | 1253-20 D | ZnS | 10-45 um | White | Bright Red |
| LDP LLC, Camera Flash Pigment | 1253-20 B | SiO$_2$ beads | 30-50 um | Colorless | N/A[1] |

In Table 1 above, the camera flash pigment ink appears invisible under normal lighting conditions and a bright white image is captured during flash photography. All of the formulated samples were coated using Byrd bar (1.5 mil, wet) onto 2A Leneta and appear uniform upon drying. Coated sample sheets were used to demonstrate proof of concept and the formulations are currently being assessed for thermal printing capability.

Figure 12A:
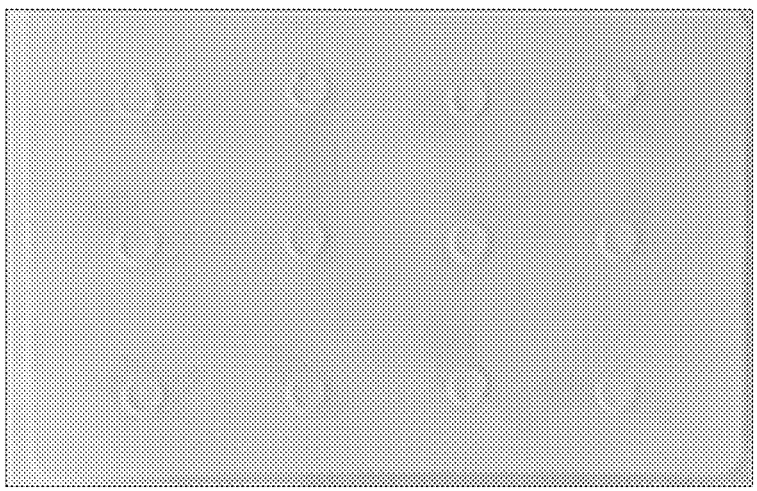
FIGS. 12A, 12B and 12C illustrate experimental results of a security material according to an example embodiment of the present disclosure.
Figure 12B:
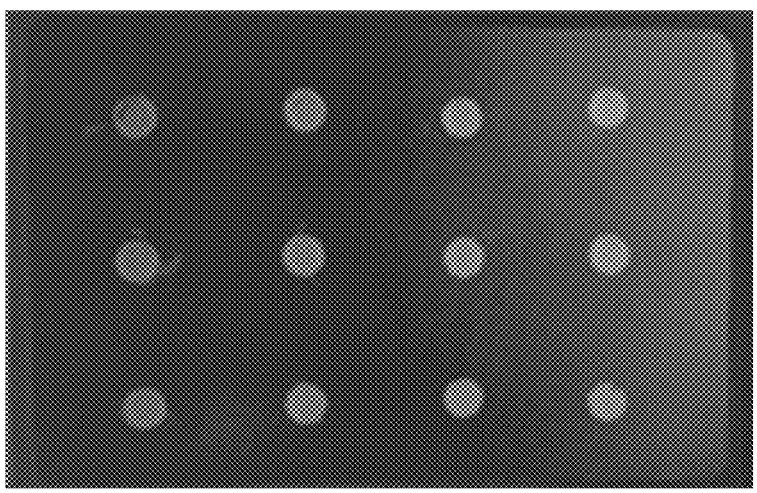
Figure 12C:
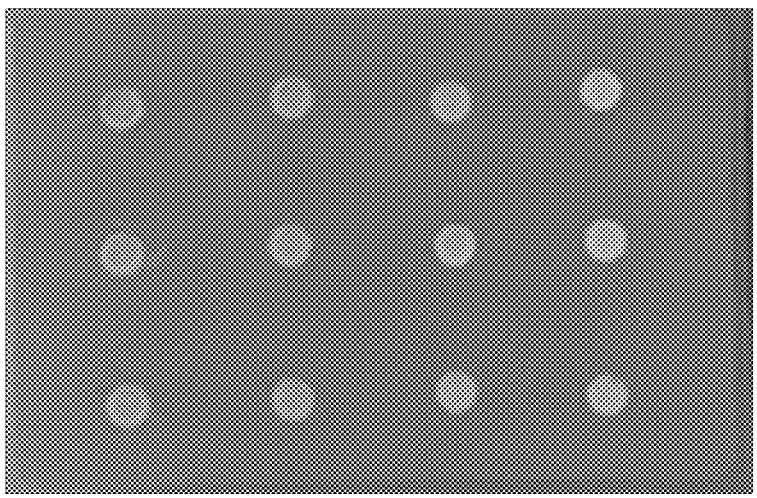

FIGS. 12A, 12B and 12C illustrate the results for a green phosphorescent pigment with and without UV light exposure. Specifically, a 365 nm UV flashlight was used to illuminate the phosphorescent ink coated sheets and the appearance of those sheets were noted in FIGS. 12A, 12B and 12C. Each of the samples appeared white or colorless in normal lighting conditions and when exposed to UV light, all the samples were brightly colored. The color remained for several seconds after the UV light source was removed. For example, FIG. 12A illustrates the samples under normal light conditions without the application of UV light. FIG.

12B illustrates the samples during UV light exposure, and the samples start to exhibit their change in state as they transition from colorless to brightly colored green. FIG. 12C illustrates the samples after the UV light was removed, and the samples exhibit a bright green color.

Figure 13A:
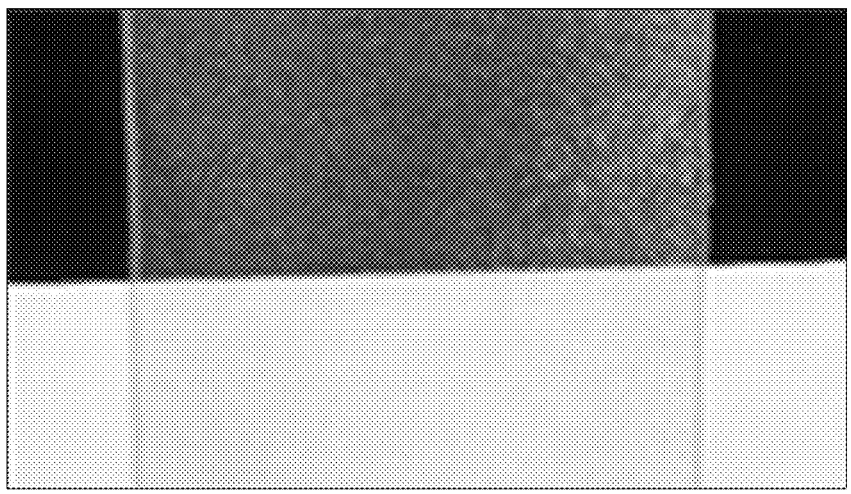
FIGS. 13A, 13B and 13C illustrate experimental results of a security material according to an example embodiment of the present disclosure.
Figure 13B:
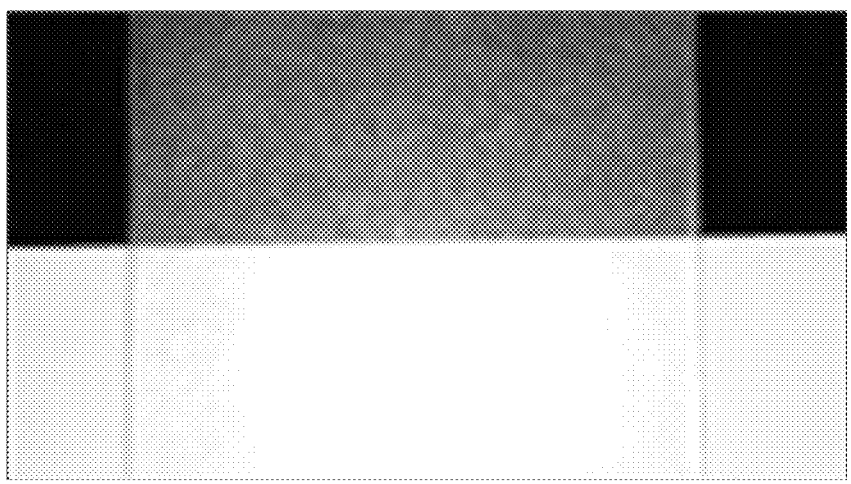
Figure 13C:
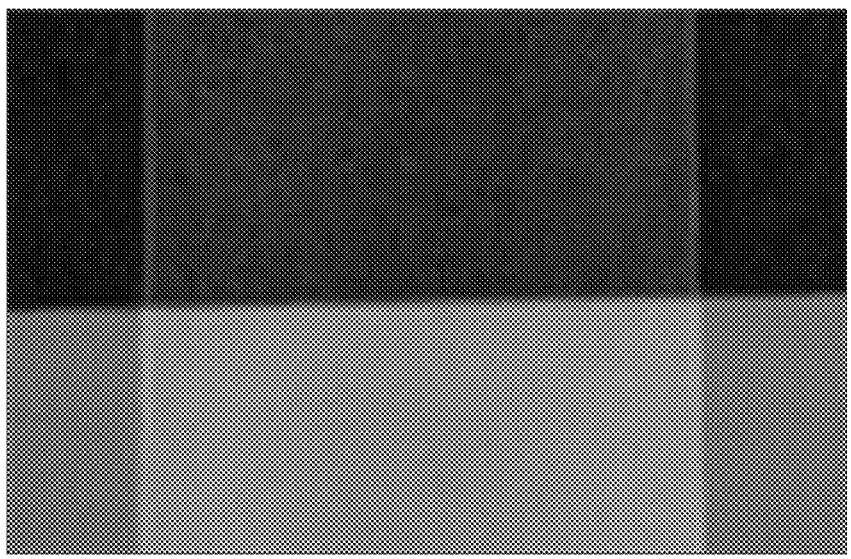

FIGS. 13A, 13B and 13C illustrate the results for a red ZnS phosphorescent pigment with and without a camera flash exposure. Specifically, a smartphone camera flash (i.e., iPhone live photo) was used to illuminate the phosphorescent ink coated sheets and the appearance of those sheets were noted in FIGS. 13A, 13B and 13C. The phosphorescent ink was a red zinc sulfide ink (containing 20% pigment added to a solution of 35% Joncryl in Butyl Alcohol) and appeared light pink in normal indoor lighting conditions, but immediately after the smartphone camera flash, the ink appeared bright red for a few seconds. For example, FIG. 13A illustrates the samples under normal light conditions without the application of a camera flash. FIG. 13B illustrates the samples during camera flash exposure, which appears to wash out the ink. FIG. 13C illustrates the samples immediately after the camera flash exposure, and the samples exhibit a bright red color.

Figure 14A:
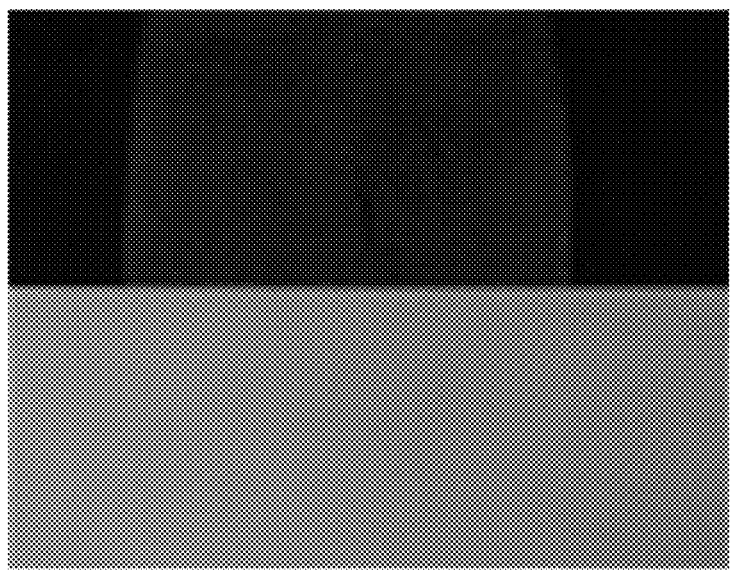
FIGS. 14A, 14B and 14C illustrate experimental results of a security material according to an example embodiment of the present disclosure.
Figure 14B:
Figure 14C:
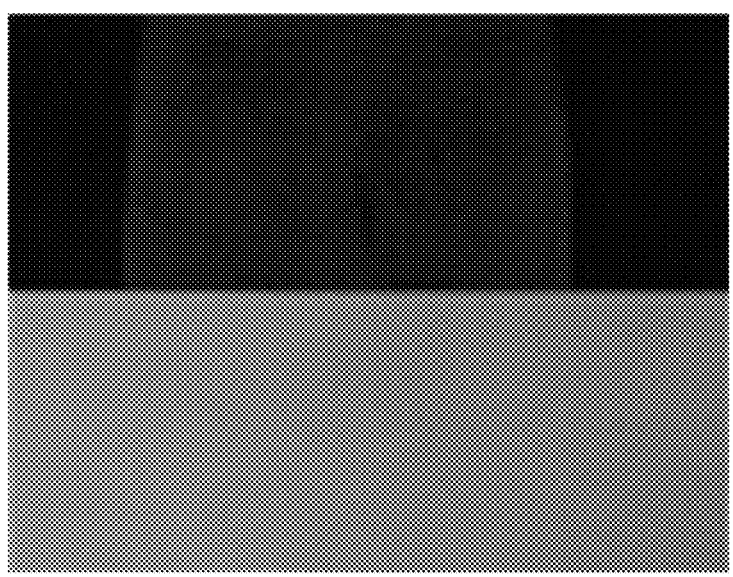

FIGS. 14A, 14B and 14C illustrate the results for a camera flash pigment ink containing $SiO_2$ beads with and without a camera flash exposure. Specifically, a smartphone camera flash (i.e., iPhone live photo) was used to illuminate the camera flash pigment ink coated sheets and the appearance of those sheets were noted in FIGS. 14A, 14B and 14C. The ink appeared transparent or colorless in normal indoor lighting conditions, but during exposure to the smartphone camera flash, the ink appeared bright white. For example, FIG. 14A illustrates the samples under normal light conditions without the application of a camera flash. FIG. 14B illustrates the samples during camera flash exposure, and the sample appears bright white. FIG. 14C illustrates the samples immediately after the camera flash exposure, and the sample again appears transparent or colorless.

Other examples may include a MagnaPrint UV ink that appears brightly colored when illuminated with a UV light and the ink later appears invisible to the naked eye after the UV exposure ceases. For example, during UV exposure, the ink may appear brightly colored and then a fewmoments after UV exposure is removed, the ink may return to its initial, unactivated state, which appears colorless or invisible to the naked eye. Red Photochromic (LCR) ink may appear colorless or invisible to the naked eye before UV exposure. During UV exposure, the red photochromic ink may appear bright colored (e.g., with a purple or red color), then after UV exposure ceases, the color of the ink may gradually fade over time until it again appears colorless or invisible to the naked eye. The color of the red photochromic ink may gradually fade (for approximately 15 minutes) after the UV exposure. Other examples that appear light, colorless or invisible to the naked eye before exposure to UV light and after exposure to the UV light ceases are invisible purple ink (e.g., Technoglow), red-pink CaS pigment (Technoglow), Red ZnS ink, Luminova Green ink, and Kremer Green (Phosphorescent, ZnS) ink.

In a first illustrative example, the security portion(s) 150, which may include a phosphorescent material or phosphorescent indicator, may be positioned within the barcode 110 or proximate to the barcode 110. Light received from the security portion(s) 150 may be in the same wavelength as light received from the barcode modules 120 of the barcode 110. Conversely, light received from the security portion(s) 150 may be in a different wavelength than the light received from the barcode modules 120. The security portion(s) 150 may be read after the barcode 110 is decoded and the combination of the barcode data and the information obtained from the security portion(s) 150 may be used to generate an output associated with the secure indicator 100.

In a second illustrative example, the barcode portion 110 of the secure indicator 100 may be used to read the security portion(s) 150. For example, the barcode 110 may direct a reader or a scanner on how to read the security portion(s) 150, such as a size, location, position, properties, parameters or characteristics of the security portions(s) 150. Similar to the example above, light received from the security portion (s) 150 and from the barcode modules 120 of the barcode 110 may be in the same wavelength or different wavelengths.

In a third illustrative example, the barcode portion 110 of the secure indicator 100 may include or may be associated with a reference region(s) 155, such as a calibration patch. The reference region(s) 155 may be adapted to assist with reading the security portion(s) 150. The security portion(s) 150 may be read after the reference region(s) 155 are used to calibrate the reader or scanner. In another example, the information obtained from the reference region(s) 155 may be compared to the information obtained from the security portion(s) 150. For example, the reference region(s) 155 may serve as a threshold value to compare to the values obtained from the security portion(s) 150. The information obtained from the comparison of the security portion(s) 150 and the reference region(s) 155 may be used to generate an output associated with the secure indicator 100.

In a fourth illustrative example, the security portion(s) 150 may change a result from reading the secure indicator 100 and more specifically the barcode portion 110. For example, the information obtained from the security portion (s) 150 may affect or change the result obtained when reading or scanning the barcode 110 or secure indicator 100.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention is claimed as follows:

1. A secure indicator, comprising:
 a substrate;
 a barcode symbol having a plurality of barcode elements provided on the substrate;
 a security material positioned proximate the barcode symbol on the substrate;
 wherein the security material is configured to be activated by irradiation at one or more predetermined activation wavelengths; and wherein the barcode symbol is configured to be read (i) before the security material is activated and (ii) while the security material is activated.

2. The secure indicator of claim 1, wherein the security material has a chemistry that is configured, responsive to irradiation at the one or more predetermined activation wavelengths, to undergo a chemical or physical state change between an initial state and a successive state, causing a change in an optical property of the security material, wherein the optical property indicates exposure to the irradiation, and wherein the barcode symbol is valid when (i) the security material is in the initial state, (ii) the security material is in the successive state, (iii) the security material is in a fully excited state, and (iv) the security material is undergoing a state change between the initial state and the fully excited state, and wherein the security material is mixed with, positioned under, or positioned over one or more of the plurality of barcode elements.

3. The secure indicator of claim 2, wherein the security material includes at least one phosphor material.

4. A method of scanning a dataform comprising a barcode symbol, the method comprising:
receiving light from the dataform during a time period, wherein the dataform is the secure indicator of claim 1;
capturing at least one image from the received light;
analyzing one of the at least one image to decode data from the barcode symbol;
analyzing one of the at least one image to detect emission light within the received light;
associating a characteristic of the dataform with the detected emission light; and
outputting the associated characteristic with the decoded data.

5. The method of claim 4, further comprising activating the security material of the secure indicator, and
capturing the at least one image occurs after a predetermined time interval after the security material is activated.

6. The method of claim 4, further comprising
activating the security material of the secure indicator, and
ceasing activation of the security material of the secure indicator,
wherein analyzing the one of the at least one image to detect emission light is performed after a predetermined time interval after the security material activation ceases.

7. A system for reading a dataform comprising a barcode symbol, the system comprising:
a housing;
an irradiation module mounted to the housing, the irradiation module having an irradiation source configured to irradiate the dataform at one or more excitation wavelengths of the dataform;
an image capture module mounted to the housing, the image capture module having a two-dimensional detector and configured to capture image data, the image capture module configured to:
receive light from the dataform during a time period, wherein the dataform is the secure indicator of claim 1, and
capture at least one image from the received light; and
a controller configured to:
analyze one of the at least one image to decode data from the barcode symbol,
analyze one of the at least one image to detect emission light within the received light,
associate a characteristic of the dataform with the detected emission light, and
output the associated characteristic with the decoded data.

8. The system of claim 7, wherein the irradiation module is further configured to cease activation of the security material of the secure indicator, and wherein the controller is configured to analyzing the one of the at least one image to detect emission light after a predetermined time interval after the security material activation ceases.

9. The secure indicator of claim 1,
wherein a property of the security material is based at least in part on a change of the security material's luminescence between an initial state and a successive state.

10. The secure indicator of claim 1, wherein the barcode symbol is configured to be read in a first wavelength and the security material is configured to luminesce in the first wavelength.

11. The secure indicator of claim 1,
wherein one or more of the plurality of barcode elements with the security material are dynamic elements and the barcode elements without security material are static elements; and
wherein the static elements are configured to be read at the same wavelength as the dynamic elements when the security material is luminescing.

12. The secure indicator of claim 11, wherein the barcode symbol is configured to produce a first value when read during (i) and a second value when read during (ii).

13. The secure indicator of claim 11, wherein the security material includes at least one phosphor material.

14. The secure indicator of claim 11, wherein the security material transitions from an activated state to an initial state after the security material is irradiated at the one or more predetermined activation wavelengths.

15. The secure indicator of claim 11, wherein the security material has a chemistry that is configured, responsive to irradiation at the one or more predetermined activation wavelengths, to undergo a chemical or physical state change between an initial state and a successive state, causing a change in an optical property of the security material, wherein the optical property indicates exposure to the irradiation.

16. The secure indicator of claim 15, wherein the change between the initial state and the successive state occurs for an interval after irradiation at the one or more predetermined activation wavelengths ceases.

17. A system for reading an indicator including a luminescent indicia, the system comprising:
a housing;
an irradiation module mounted to the housing, the irradiation module having an irradiation source configured to irradiate the indicator at one or more excitation wavelengths of the luminescent indicia;
an image capture module mounted to the housing, the image capture module having a two-dimensional detector and configured to capture image data from radiation emitted by the luminescent indicia; and
a controller configured to:
cause the irradiation module to illuminate for at least a first time interval having a first duration,
cause the image capture module to capture at least one first image of the luminescent indicia at a first time after the first duration and at least one second image of the luminescent indicia at a second time after the first time, and determine a property of the indicator based at least in part on a comparison of the luminescent indicia's luminescence between the at least one second image and the at least one first image.

18. The system of claim 17, wherein the comparison is one of:
a measured decrease of the luminescent indicia's luminescence between the at least one first image and the at least one second image,
a measured increase of the luminescent indicia's luminescence between the at least one second image and the at least one first image,
a rate of decrease of the luminescent indicia's luminescence between the at least one first image and the at least one second image,
a rate of increase of the luminescent indicia's luminescence between the at least one first image and the at least one second image,
a comparison between the luminescent indicia's luminescence at the first time to a first known threshold value, and
a comparison between the luminescent indicia's luminescence at the second time to a second known threshold value.

19. The system of claim 17, further comprising a processing module configured to decode representations of a barcode symbol in the image data captured by the image capture module.

20. The system of claim 19, wherein one of the controller and the processing module is configured to:
determine pixels in the image data corresponding to the luminescent indicia, and
process pixels of the image data corresponding to the luminescent indicia to determine at least one optical property of the luminescent indicia at the first time and the second time.

21. The system of claim 19, wherein the indicator includes a barcode symbol, and wherein one of the controller and the processing module is configured to compare first data of pixels associated with the luminescent indicator with second data associated with other portions of the barcode symbol.

22. The system of claim 19, wherein one of the controller and the processing module is configured to locate the pixels associated with the luminescent indicator or process the pixels based on information encoded in and read from the barcode symbol.

23. The system of claim 19, wherein one of the controller and the processing module is configured provide an output for the indicator based on the property of the indicator based on data obtained from the barcode symbol that is dependent on the luminescent indicia's luminescence.

24. A secure indicator scanner comprising:
a processor;
a memory coupled to the processor; and
an optical input device coupled to the processor, the processor configured to:
cause the optical input device to capture an image of a field of view, the field of view including a secure indicator including a barcode symbol and a security portion,
store the image in the memory,
process the image to identify the barcode symbol within the captured image,
analyze the barcode symbol to determine or identify elements of the barcode symbol,
process the image to identify the security portion,
determine an optical property of the security portion,
decode barcode data from the identified barcode symbol,
associate the barcode data with the determined optical property of the security portion, and
output the associated data.

25. The secure indicator scanner of claim 24, wherein the processor is further configured to:
process the image to identify a reference region within the image.

26. The scanner of claim 25, wherein the processor is further configured to cause an irradiation module to illuminate the secure indicator at an excitation wavelength of the security material for at least a first time interval having a first duration thereby causing the security material to luminesce, and
wherein the processor is further configured to cause the irradiation module to cease excitation.

27. The scanner of claim 26, wherein capturing the image of the field of view includes capturing at least one first image of the field of view at a first time after the first time interval and at least one second image of the field of view at a second time after the first time, the first image is associated with an initial optical property and the second image is associated with a subsequent optical property, and wherein determining the optical property includes comparing the at least one second image to the at least one first image.

28. The scanner of claim 27, wherein the processor is further configured to:
compare the initial optical property to the subsequent optical property, and
determine one of a rate of increase, a rate of decrease, a rate of decay, an increase, a decrease, or a presence of decay between the initial optical property and the subsequent optical property.

29. The scanner of claim 25, wherein the optical property includes at least one of an initial optical property and a subsequent optical property associated with the security portion, and wherein the at least one of the initial optical property and the subsequent optical property is determined based at least partially on data decoded from the barcode symbol.

30. The scanner of claim 29, wherein the processor is further configured to compare the optical property of the security portion to the decoded barcode data.

31. The secure indicator scanner of claim 24, wherein the barcode symbol encodes data configured to be used in locating, reading, determining the state of, interpreting, or evaluating a security portion containing the security material.

32. The secure indicator scanner of claim 24, wherein the encoded data includes at least a first encoded data identifier that indicates at least one of a time, a rate, a threshold, a type of luminescent present, a state, or an expected rate of decrease associated with the security material's luminescence, and wherein the encoded data includes a second encoded data identifier, the second encoded data identifier indicating at least one of size and location of the security material.

33. A system for reading a dataform comprising a barcode symbol, the system comprising:
a housing;
an irradiation module mounted to the housing, the irradiation module having an irradiation source configured to irradiate the dataform at one or more excitation wavelengths of the dataform;
an image capture module mounted to the housing, the image capture module having a two-dimensional detector and configured to capture image data, the image capture module configured to:
  receive light from the dataform during a time period, wherein the dataform is a secure indicator having a barcode symbol with a plurality of barcode elements and a security material positioned proximate the barcode symbol on a substrate wherein the barcode symbol encodes data configured to be used in locating, reading, determining the state of, interpreting, or evaluating a security portion containing the security material,
  capture at least one image from the received light, and
  capture at least one second image from the received light after the data is irradiated; and
a controller configured to:
  analyze one of the at least one image to decode data from the barcode symbol,
  analyze one of the at least one second image to detect emission light within the received light,
  associate a characteristic of the dataform with the detected emission light, and
  output the associated characteristic with the decoded data.

34. The system of claim 33, wherein the controller is configured to analyze one of the at least one image to decode data, wherein the decoded data includes data from at least one encoded data identifier associated with the barcode symbol.

35. The system of claim 34, wherein the at least one encoded data identifier includes a first data identifier that indicates at least one of a time, a rate, a threshold, a type of luminescent present, a state, or an expected rate of decrease associated with the security material's luminescence.

36. The system of claim 35, wherein the barcode symbol includes a second encoded data identifier, the second encoded data identifier indicating at least one of size and location of the security material.

37. A method of auto-calibrating a scanner comprising:
  capturing an image of a secure indicator, the image comprising:
    a computer readable indicia encoding a data codeword,
    a security portion of the secure indicator, and
    a reference region having a known optical property,
    wherein the security portion includes a security material, the security material being at least one of a photochromic material, a luminescent material, a phosphor material, a phosphorescent material, a fluorescent material, a UV-reactive material, and an IR-reactive material;
  decoding data from at least one of the computer readable indicia and the reference region;
  irradiating the security material;
  confirming that the security material luminesces;
  determining an optical property of the security material; and
  calibrating the scanner based on the data and the known optical property.

38. The method of claim 37, further comprising:
  decoding data from the security portion of the secure indicator.

39. The method of claim 37, wherein the optical property is one of a color value, an average color value, a luminescence value, a luminescence decay value, an average luminescence value, a phosphorescence value, an average phosphorescence value, a fluorescence value, a fluorescence decay value, an average fluorescence value, a reflectance value, an average reflectance value, an emission value, an intensity value, a rate of decay value, a color density value, an average color density value, and an RGB value.

40. The method of claim 37, wherein determining the optical property of the security material includes determining a first optical property at a first time, and determining a second optical property at a second time, and comparing the second optical property to the first optical property.

41. An auto-calibration system comprising:
  a scanner;
  an illumination module;
  an image capture module, the image capture module configured to:
    capture an image of a secure indicator, the image comprising:
      a computer readable indicia encoding a data codeword,
      a security portion of the secure indicator, and
      a reference region having a known optical property,
      wherein the security portion includes a security material, the security material being at least one of a photochromic material, a luminescent material, a phosphor material, a phosphorescent material, a fluorescent material, a UV-reactive material, and an IR-reactive material; and
  a controller configured to:
    decode data from at least one of the computer readable indicia and the reference region, and
    calibrate the scanner based on the data and the known optical property.

42. The system of claim 41, wherein the illumination module is an irradiation module, and wherein the irradiation module is configured to:
  irradiate the security material prior to the image capture module capturing the image.

43. The system of claim 41, wherein the optical property is one of a color value, an average color value, a luminescence value, a luminescence decay value, an average luminescence value, a phosphorescence value, an average phosphorescence value, a fluorescence value, a fluorescence decay value, an average fluorescence value, a reflectance value, an average reflectance value, an emission value, an intensity value, a rate of decay value, a color density value, an average color density value, and an RGB value.

* * * * *